United States Patent
Abe et al.

(10) Patent No.: US 11,061,203 B2
(45) Date of Patent: Jul. 13, 2021

(54) ZOOM LENS, AND IMAGE PICKUP APPARATUS AND IMAGE PICKUP SYSTEM INCLUDING THE ZOOM LENS

(71) Applicant: CANON KABUSHIKI KAISHA, Tokyo (JP)

(72) Inventors: Hirofumi Abe, Utsunomiya (JP); Shinji Yamasaki, Utsunomiya (JP); Masakazu Kodaira, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 282 days.

(21) Appl. No.: 16/237,848

(22) Filed: Jan. 2, 2019

(65) Prior Publication Data
US 2019/0212525 A1    Jul. 11, 2019

(30) Foreign Application Priority Data

Jan. 9, 2018 (JP) .............................. JP2018-001101
Jan. 9, 2018 (JP) .............................. JP2018-001102
Jan. 9, 2018 (JP) .............................. JP2018-001103

(51) Int. Cl.
*G02B 9/60* (2006.01)
*H04N 5/232* (2006.01)
(Continued)

(52) U.S. Cl.
CPC .............. *G02B 9/60* (2013.01); *G02B 13/06* (2013.01); *G02B 15/144511* (2019.08); *H04N 5/23238* (2013.01)

(58) Field of Classification Search
CPC . G02B 9/60; G02B 9/34; G02B 13/04; G02B 15/16; G02B 15/144511; H04N 5/23238
See application file for complete search history.

(56) References Cited

U.S. PATENT DOCUMENTS 9,116,330 B2    8/2015 Abe
9,148,575 B2    9/2015 Yamasaki
(Continued)

FOREIGN PATENT DOCUMENTS

CN    102338927 A    2/2012
CN    103576300 A    2/2014
(Continued)

OTHER PUBLICATIONS

Notification of the First Office Action issued by the China National Intellectual Property Administration dated Apr. 2, 2021 in corresponding CN Patent Application No. 201910005933.2, with English translation.

*Primary Examiner* — Alicia M Harrington
(74) *Attorney, Agent, or Firm* — Carter, Deluca & Farrell LLP

(57) ABSTRACT

A zoom lens includes, in order from object side, a negative first unit, a positive second unit, a negative third unit, and a positive fourth unit, wherein, for zooming to telephoto end, the second unit moves toward object side, the third unit moves and an interval between each pair of adjacent units is changed, wherein, at telephoto end as compared to wide angle end, the interval between the first and second units is smaller, the interval between the second and third units is larger, the interval between the third and fourth units is larger, and the fourth unit is positioned closer to image side, wherein the third unit consists of a single optical element, wherein the fourth unit includes plural lenses arranged at intervals, and wherein focal lengths of the third and fourth units and the interval between the third and fourth units at telephoto end are appropriately set.

24 Claims, 23 Drawing Sheets

(51) Int. Cl.
*G02B 13/06* (2006.01)
*G02B 15/14* (2006.01)

(56) References Cited

U.S. PATENT DOCUMENTS

| | | |
|---|---|---|
| 9,250,426 B2 | 2/2016 | Abe |
| 9,350,919 B2 | 5/2016 | Yamasaki |
| 9,575,296 B2 | 2/2017 | Kimura et al. |
| 9,588,323 B2 | 3/2017 | Tatenuma et al. |
| 9,651,762 B2 | 5/2017 | Abe |
| 9,715,090 B2 | 7/2017 | Abe |
| 9,952,446 B2 | 4/2018 | Abe |
| 10,120,171 B2 | 11/2018 | Yamasaki |
| 10,197,778 B2 | 2/2019 | Sudo et al. |
| 2012/0327276 A1 | 12/2012 | Ono et al. |
| 2014/0028891 A1* | 1/2014 | Otake ............... G02B 15/14 348/335 |
| 2015/0281588 A1* | 10/2015 | Izuhara ......... G02B 15/144511 348/240.3 |
| 2016/0124199 A1 | 5/2016 | Sanjo et al. |
| 2017/0168274 A1* | 6/2017 | Inoue ................ G02B 13/04 |
| 2018/0011301 A1 | 1/2018 | Kodaira |
| 2018/0143412 A1 | 5/2018 | Sakamoto et al. |
| 2018/0157014 A1 | 6/2018 | Yamasaki |
| 2018/0246303 A1 | 8/2018 | Kodaira |
| 2019/0107731 A1 | 4/2019 | Yamasaki |
| 2019/0113722 A1 | 4/2019 | Kodaira et al. |

FOREIGN PATENT DOCUMENTS

| | | |
|---|---|---|
| CN | 104423025 A | 3/2015 |
| CN | 105190394 A | 12/2015 |
| CN | 105785559 A | 7/2016 |
| JP | 2004151552 A | 5/2004 |
| JP | 2008309897 A | 12/2008 |
| JP | 2009069298 A | 4/2009 |
| JP | 2010160276 A | 7/2010 |
| JP | 2010160277 A | 7/2010 |
| JP | 2015031829 A | 2/2015 |

\* cited by examiner

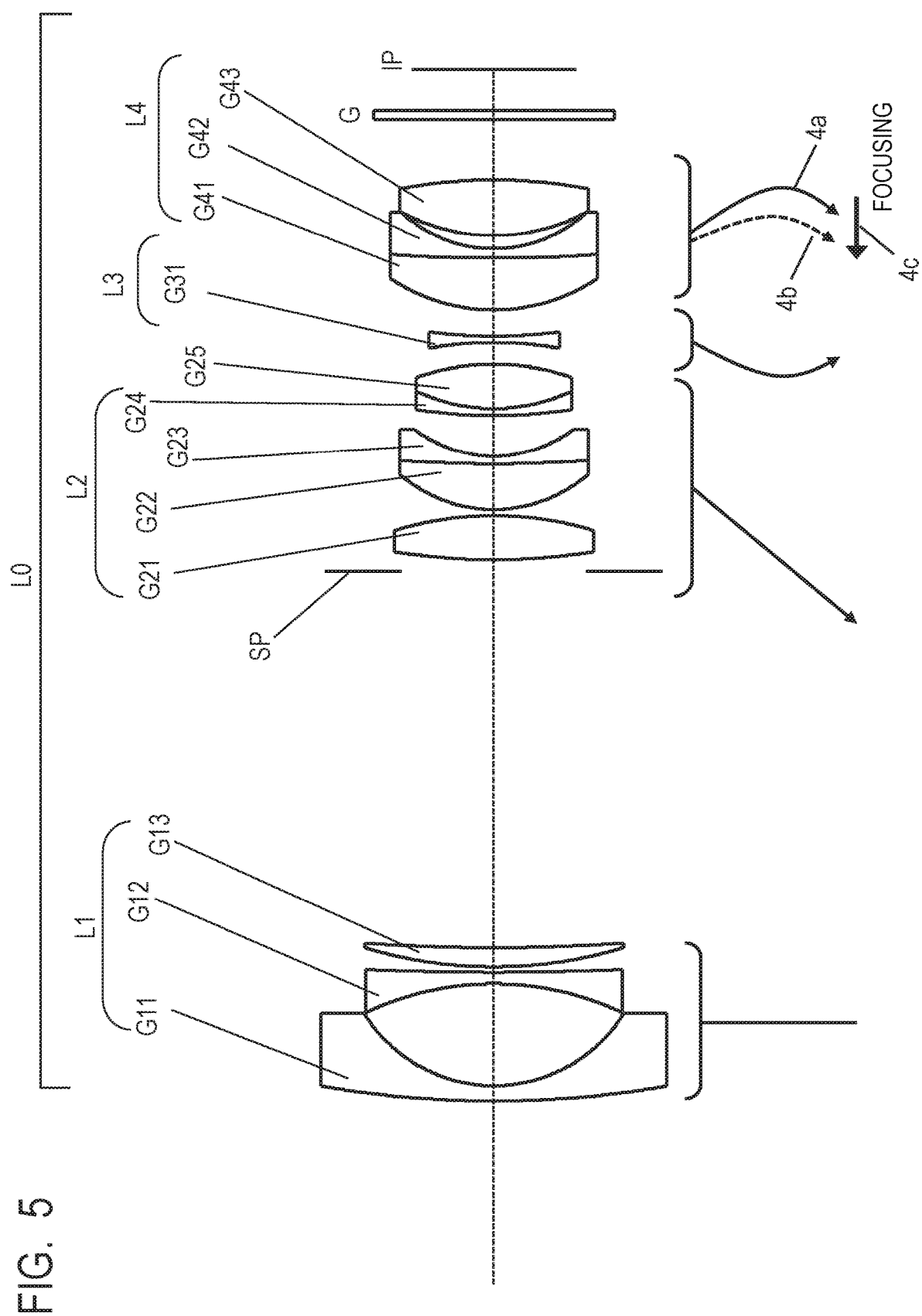

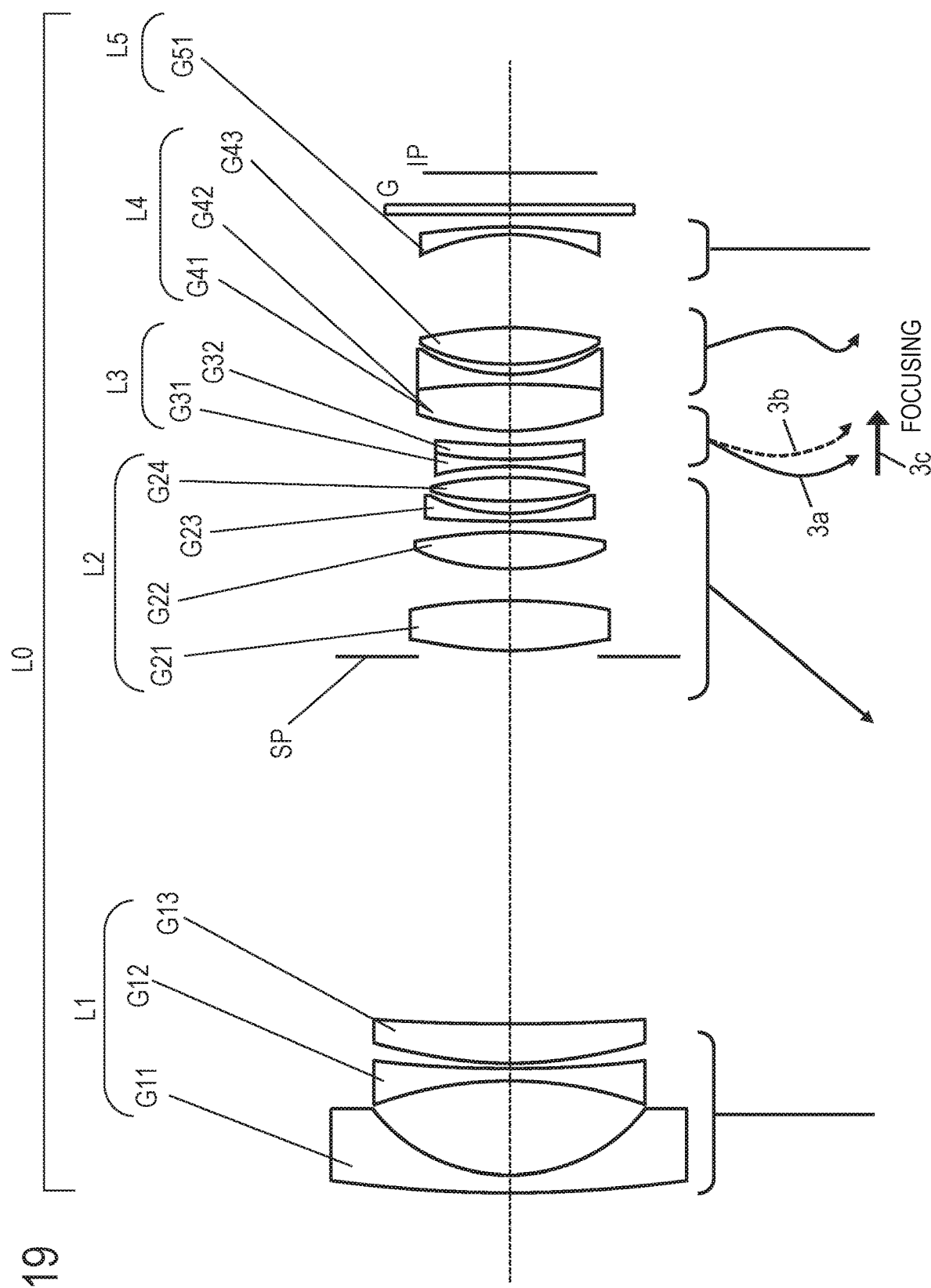

ZOOM LENS, AND IMAGE PICKUP APPARATUS AND IMAGE PICKUP SYSTEM INCLUDING THE ZOOM LENS

BACKGROUND OF THE INVENTION

Field of the Invention

The present invention relates to a zoom lens, and more particularly, to a zoom lens suitable as an image pickup optical system for use in an image pickup apparatus, such as a monitoring camera, a digital camera, a video camera, and a broadcasting camera.

Description of the Related Art

A zoom lens serving as an image pickup optical system for use in an image pickup apparatus is desired to have high optical performance, a wide angle of view, and a high zoom ratio, and is also desired to be downsized in the entire system of the zoom lens. As a zoom lens satisfying those demands, there is known a negative-lead type zoom lens, in which a lens unit having a negative refractive power is arranged closest to an object side.

In Japanese Patent Application Laid-Open Nos. 2010-160276, 2015-031829, 2004-151552, 2008-309897, and 2009-69298, there is disclosed a four-unit zoom lens including, in order from an object side to an image side, a first lens unit to a fourth lens unit having negative, positive, negative, and positive refractive powers, respectively. In the zoom lens, an interval between each pair of adjacent lens units is changed during zooming. In Japanese Patent Application Laid-Open Nos. 2008-309897 and 2009-69298, there is disclosed a five-unit zoom lens including, in order from an object side to an image side, a lens unit having a negative refractive power and at least three lens units configured to move during zooming. In the zoom lens, an interval between each pair of adjacent lens units is changed during zooming.

In the negative-lead type zoom lens, in order to further downsize the entire system of the zoom lens while satisfying the above-mentioned demands, it is important to appropriately set, for example, a lens configuration of each lens unit and a movement condition during zooming.

SUMMARY OF THE INVENTION

The present invention has an object to provide a downsized zoom lens having a wide angle of view, a high zoom ratio, and high optical performance over the entire zoom range, and to provide an image pickup apparatus including the zoom lens.

According to one embodiment of the present invention, there is provided a zoom lens including a plurality of lens units, the plurality of lens units including, in order from an object side to an image side, a first lens unit having a negative refractive power, a second lens unit having a positive refractive power, a third lens unit having a negative refractive power, and a fourth lens unit having a positive refractive power, in which the second lens unit is configured to move toward the object side for zooming from a wide angle end to a telephoto end, in which the third lens unit is configured to move for zooming from the wide angle end to the telephoto end, in which an interval between each pair of adjacent lens units is changed for zooming from the wide angle end to the telephoto end, in which, at the telephoto end as compared to the wide angle end, the interval between the first lens unit and the second lens unit is smaller, the interval between the second lens unit and the third lens unit is larger, the interval between the third lens unit and the fourth lens unit is larger, and the fourth lens unit is positioned closer to the image side, in which the third lens unit consists of a single optical element, in which the fourth lens unit includes a plurality of lenses arranged at intervals, and in which the following conditional expressions are satisfied:

$$0.8 < |f3/f4| < 3.0; \text{ and}$$

$$2.5 < |f3/L34t| < 5.0,$$

where f3 represents a focal length of the third lens unit, f4 represents a focal length of the fourth lens unit, and L34t represents an interval between the third lens unit and the fourth lens unit at the telephoto end.

Further features of the present invention will become apparent from the following description of exemplary embodiments with reference to the attached drawings.

BRIEF DESCRIPTION OF THE DRAWINGS

FIG. 5 is a cross-sectional view of a zoom lens of Example 3 of the present invention at a wide angle end.

FIG. 19 is a cross-sectional view of a zoom lens of Example 10 of the present invention at a wide angle end.

DESCRIPTION OF THE EMBODIMENTS

Exemplary embodiments of the present invention are now described with reference to the accompanying drawings.

FIG. 1, FIG. 3, FIG. 5, FIG. 7, FIG. 9, FIG. 11, FIG. 13, FIG. 15, FIG. 17, and FIG. 19 are cross-sectional views of zoom lenses of Examples 1 to 10 of the present invention, respectively, at a wide angle end. Each cross-sectional view of the zoom lens is a cross-sectional view at the wide angle end (shortest focal length).

Figure 1:
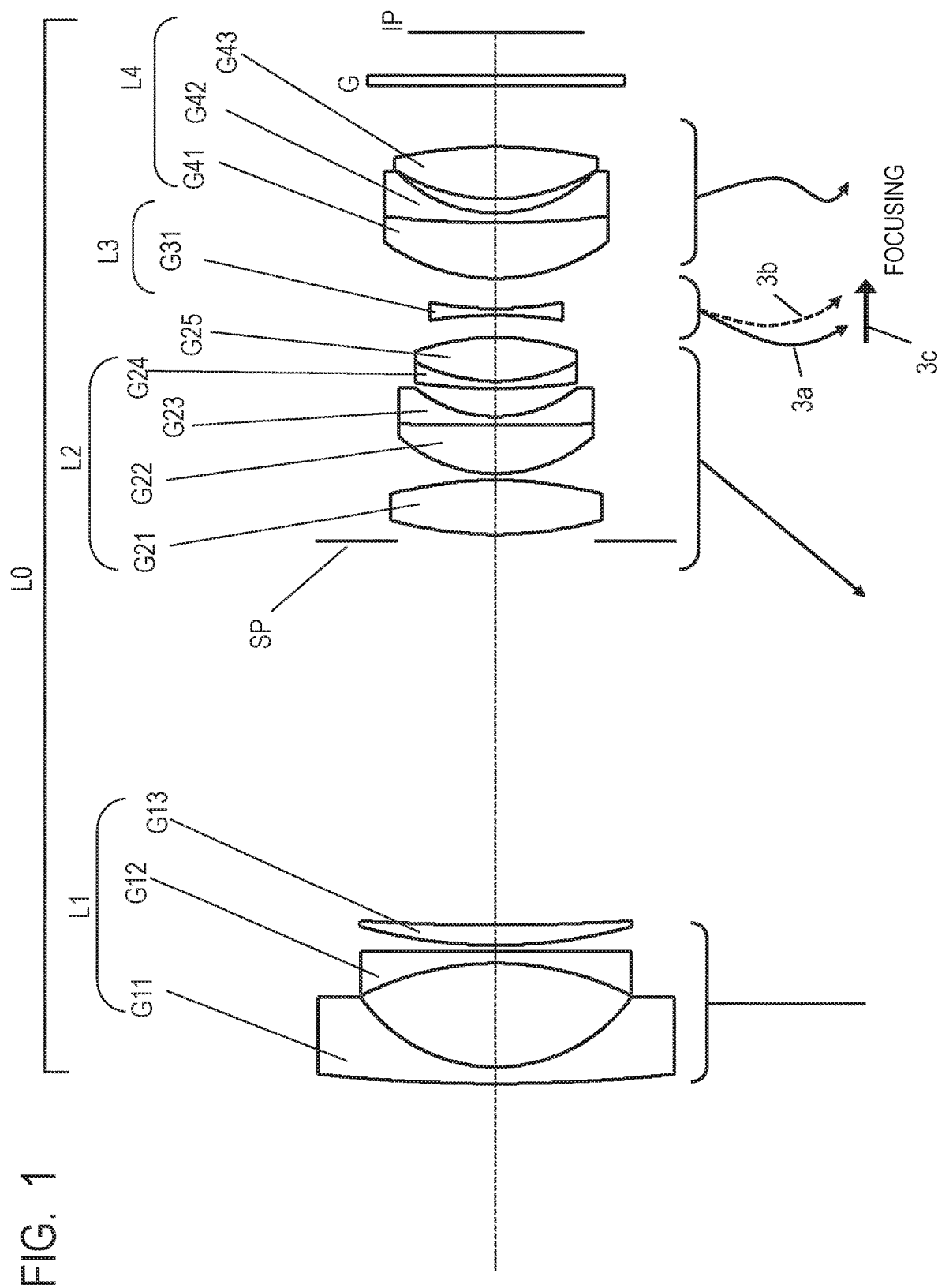
FIG. 1 is a cross-sectional view of a zoom lens of Example 1 of the present invention at a wide angle end.
Figure 2A:
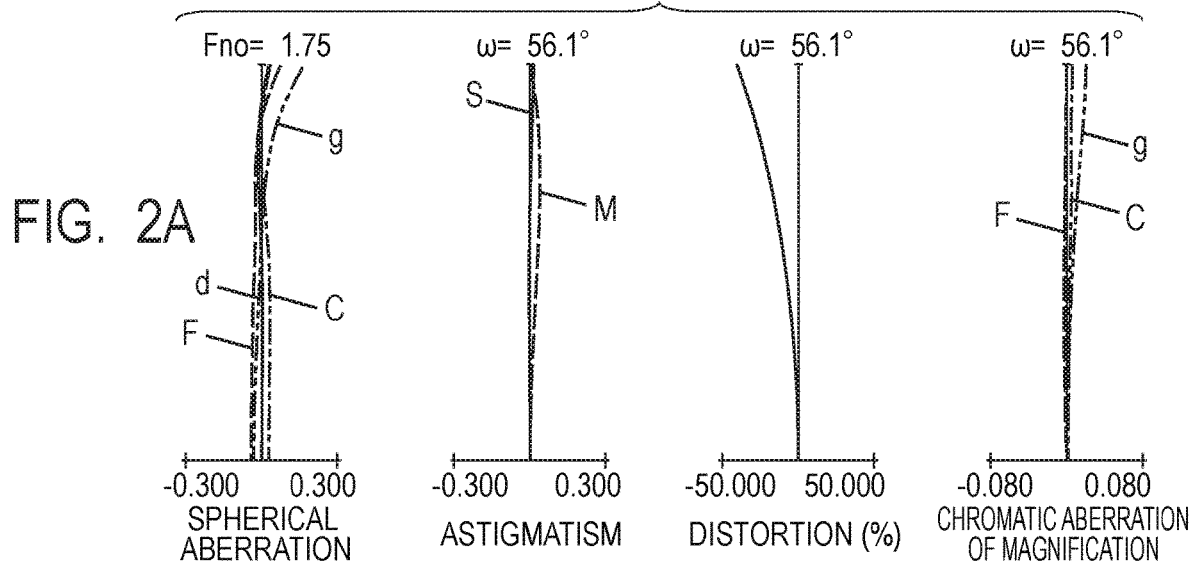
FIG. 2A is an aberration diagram of the zoom lens of Example 1 at the wide angle end.
Figure 2B:
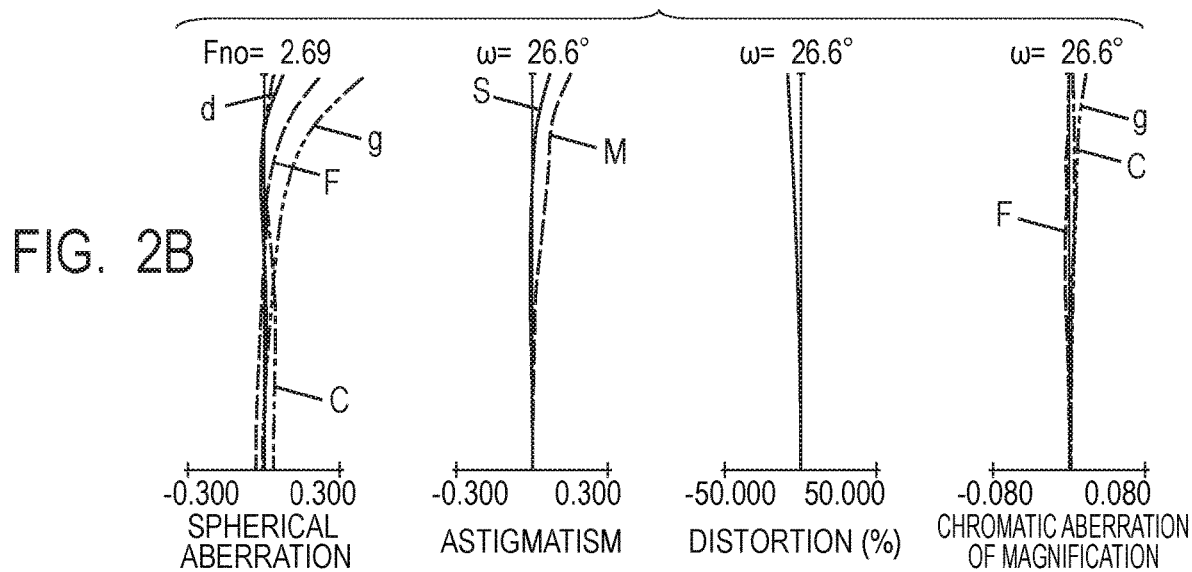
FIG. 2B is an aberration diagram of the zoom lens of Example 1 at an intermediate zoom position.
Figure 2C:
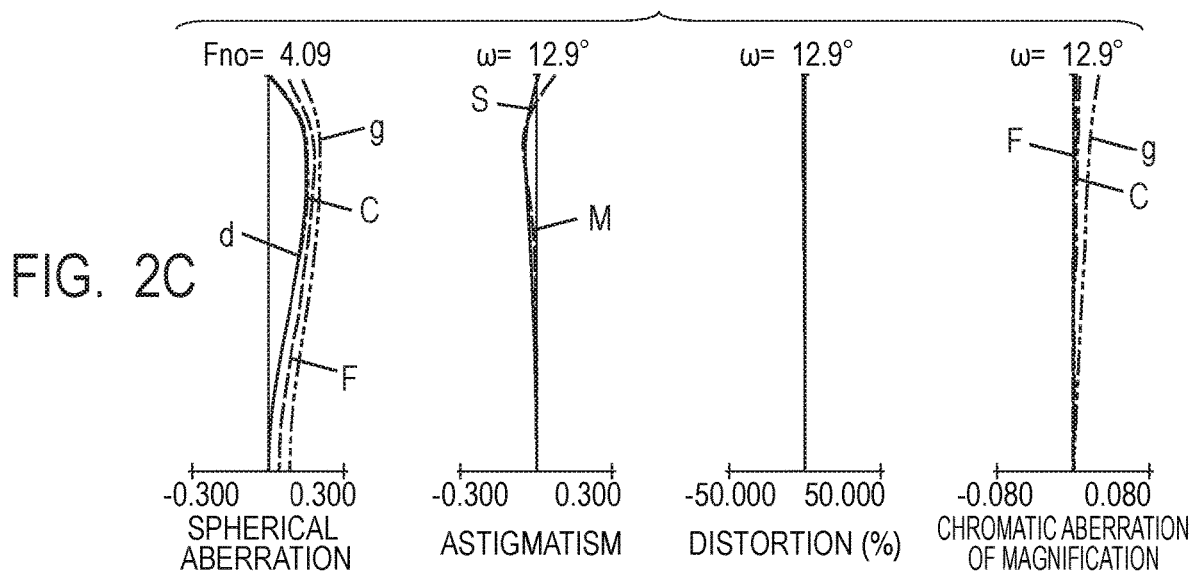
FIG. 2C is an aberration diagram of the zoom lens of Example 1 at a telephoto end.
Figure 3:
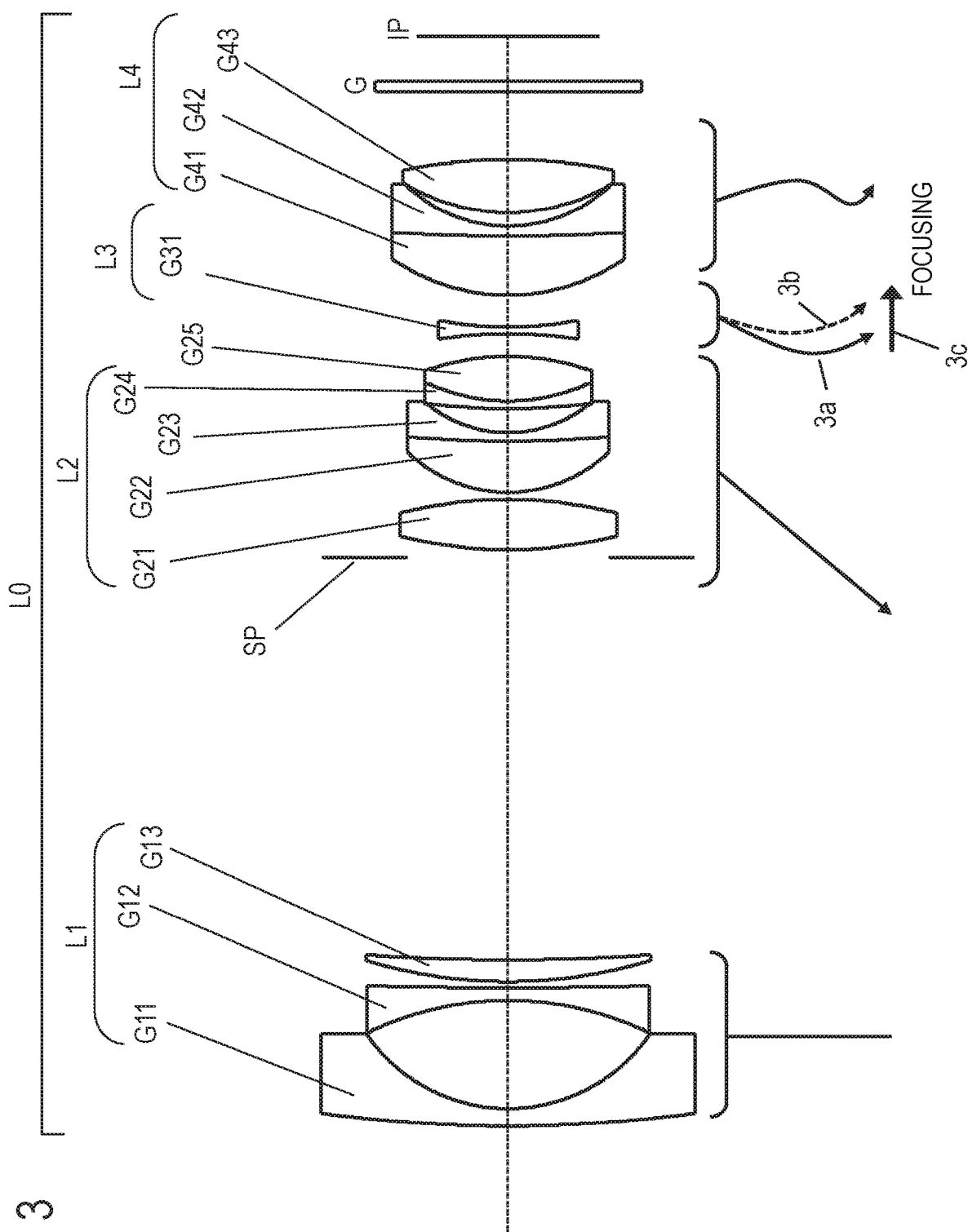
FIG. 3 is a cross-sectional view of a zoom lens of Example 2 of the present invention at a wide angle end.
Figure 4A:
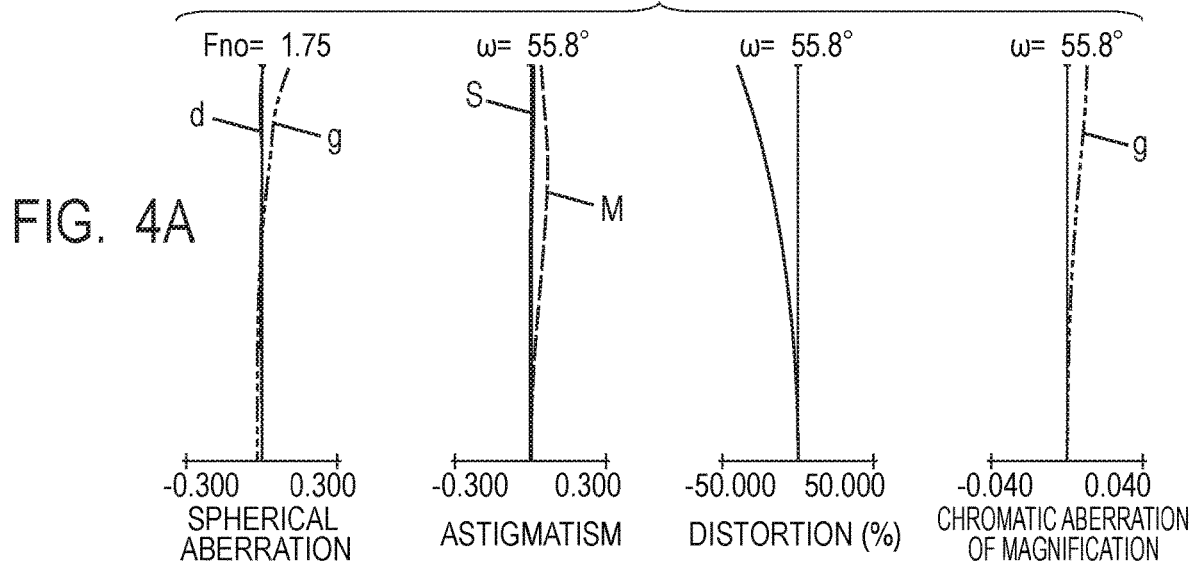
FIG. 4A is an aberration diagram of the zoom lens of Example 2 at the wide angle end.
Figure 4B:
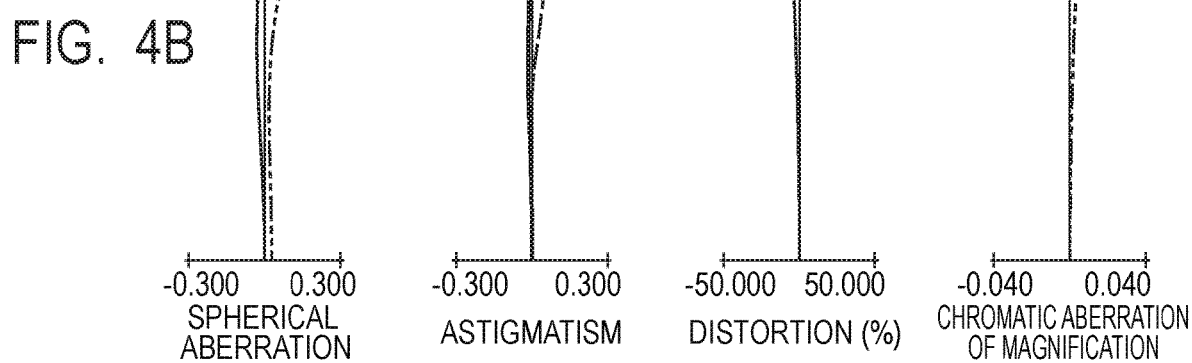
FIG. 4B is an aberration diagram of the zoom lens of Example 2 at an intermediate zoom position.
Figure 4C:
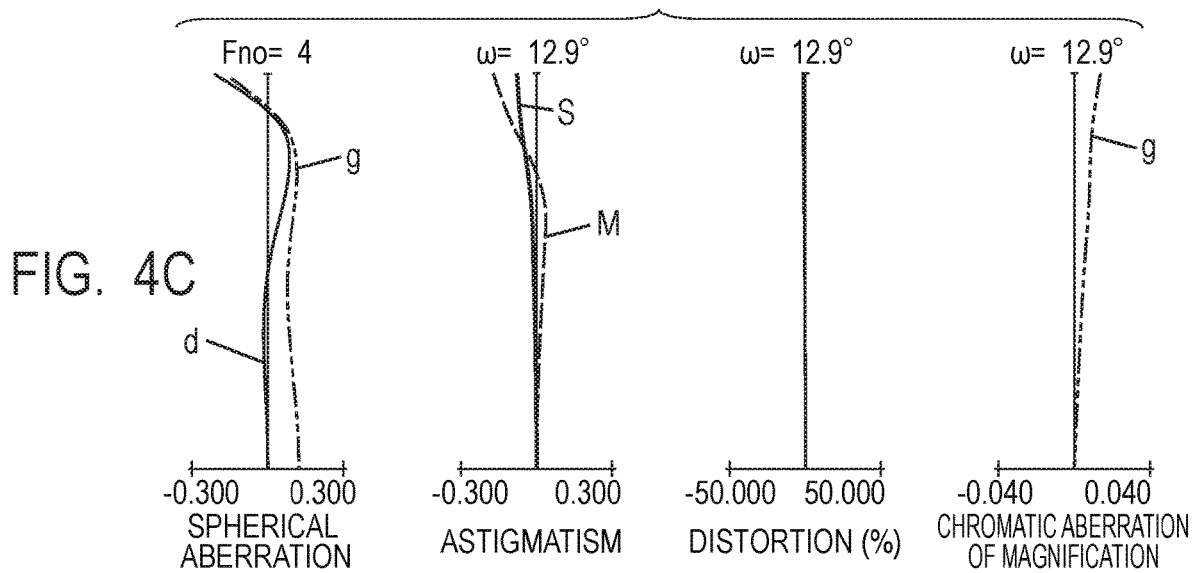
FIG. 4C is an aberration diagram of the zoom lens of Example 2 at a telephoto end.
Figure 6A:
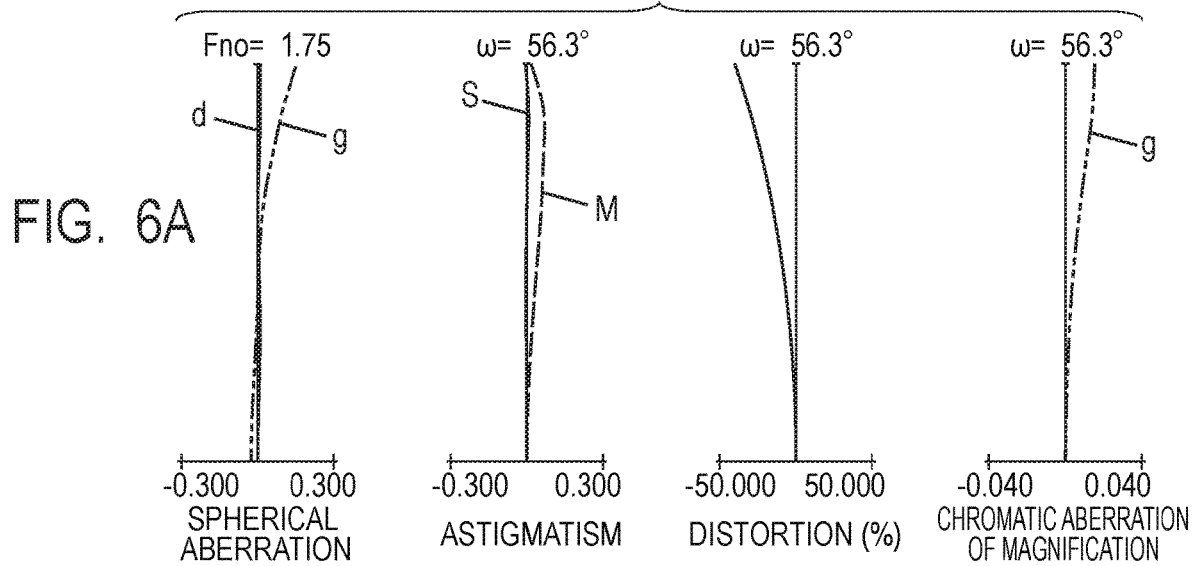
FIG. 6A is an aberration diagram of the zoom lens of Example 3 at the wide angle end.
Figure 6B:
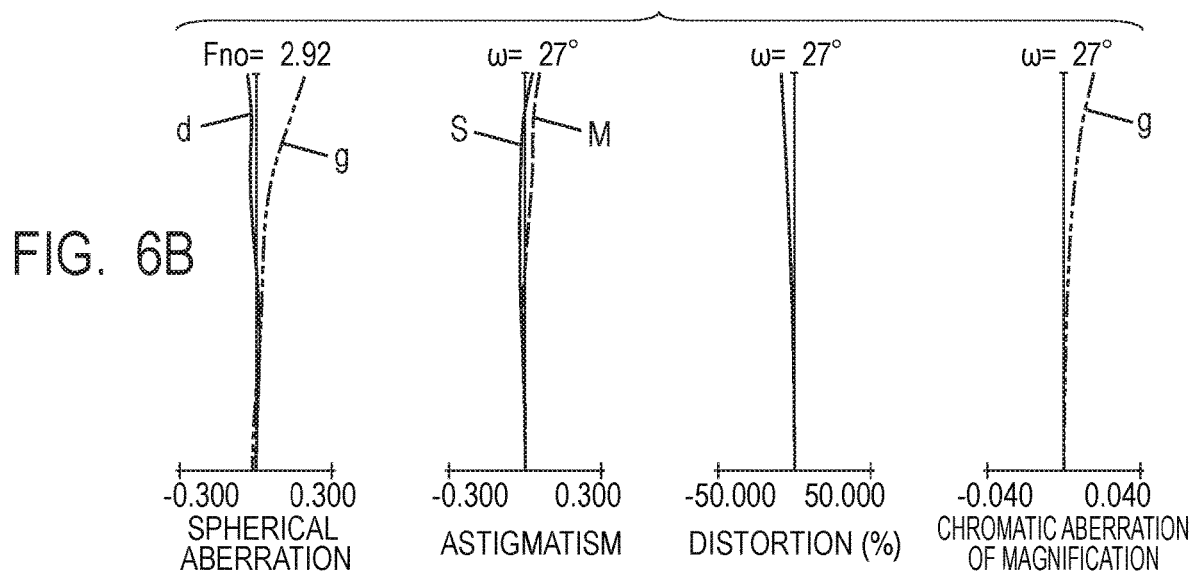
FIG. 6B is an aberration diagram of the zoom lens of Example 3 at an intermediate zoom position.
Figure 6C:
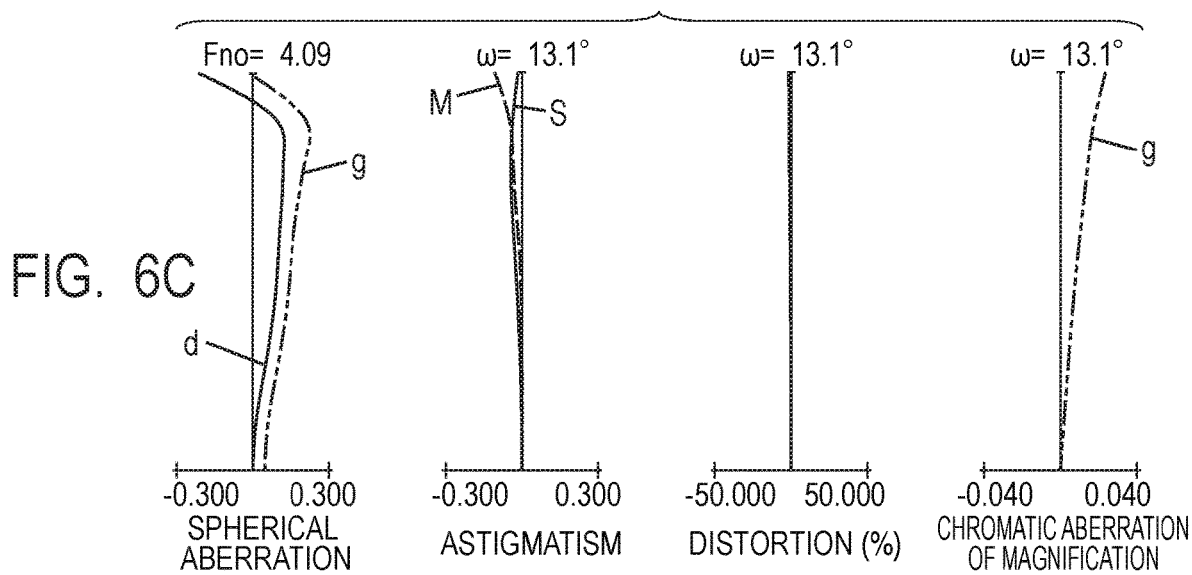
FIG. 6C is an aberration diagram of the zoom lens of Example 3 at a telephoto end.
Figure 7:
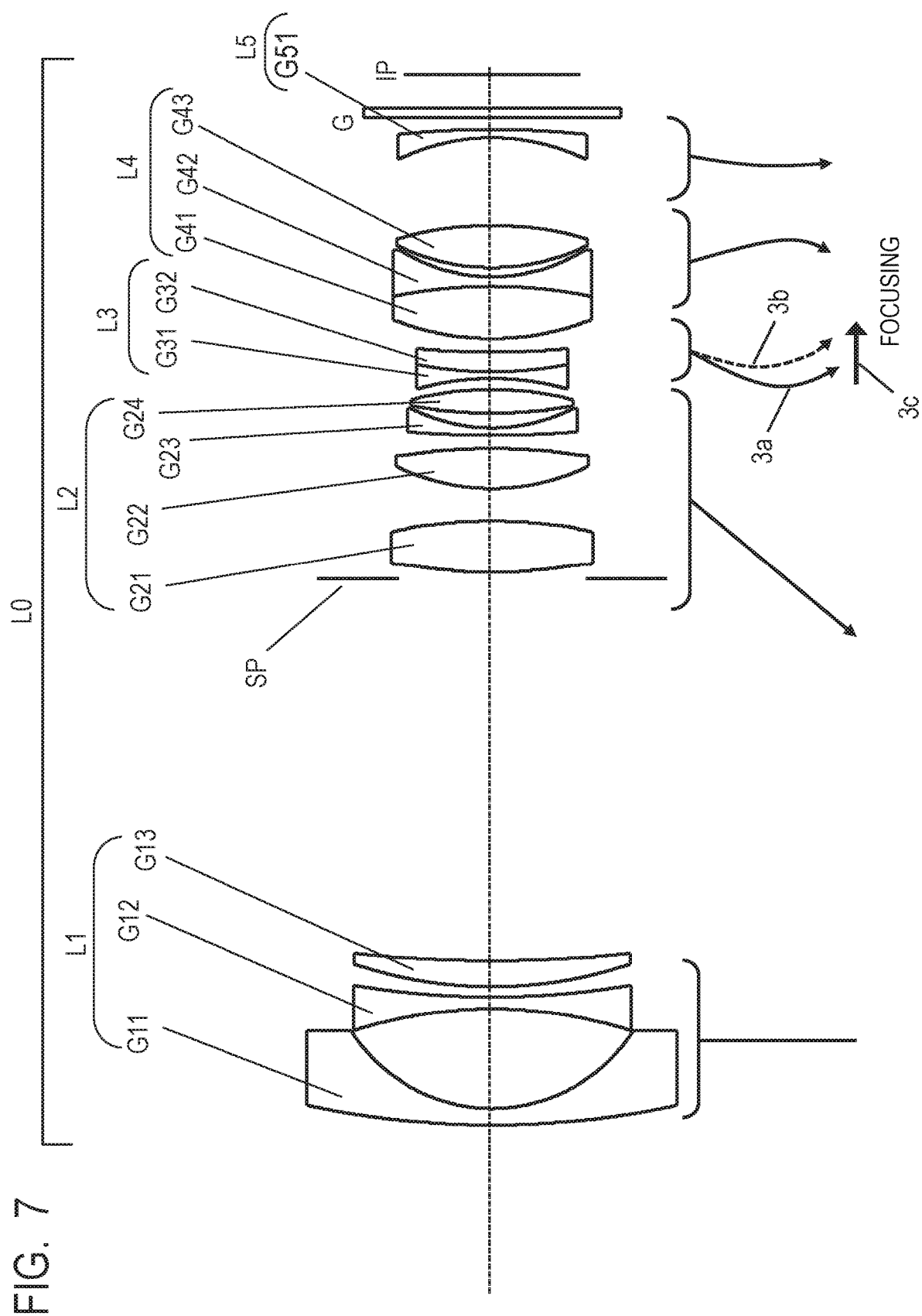
FIG. 7 is a cross-sectional view of a zoom lens of Example 4 of the present invention at a wide angle end.
Figure 8A:
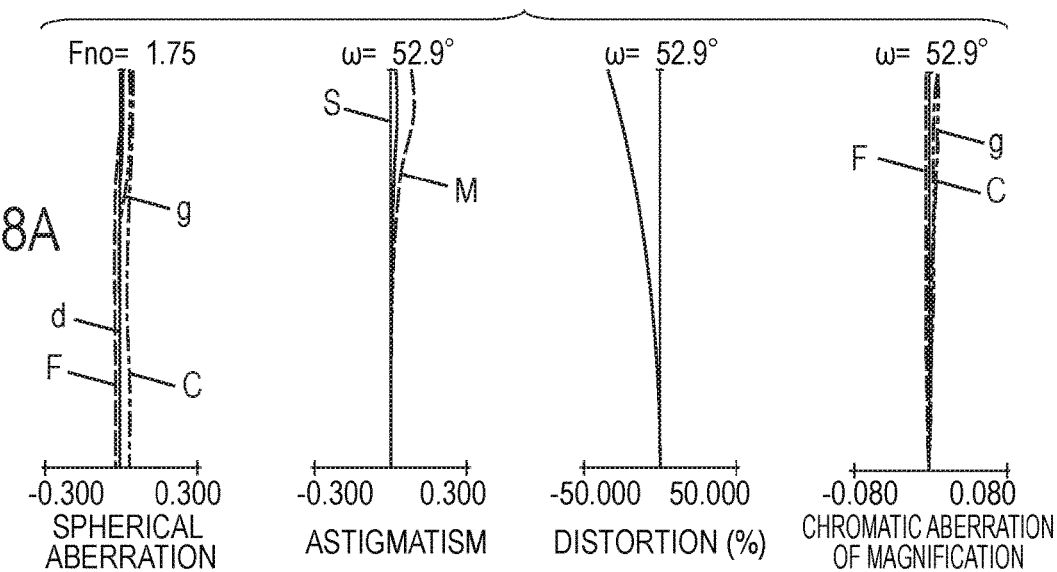
FIG. 8A is an aberration diagram of the zoom lens of Example 4 at the wide angle end.
Figure 8B:
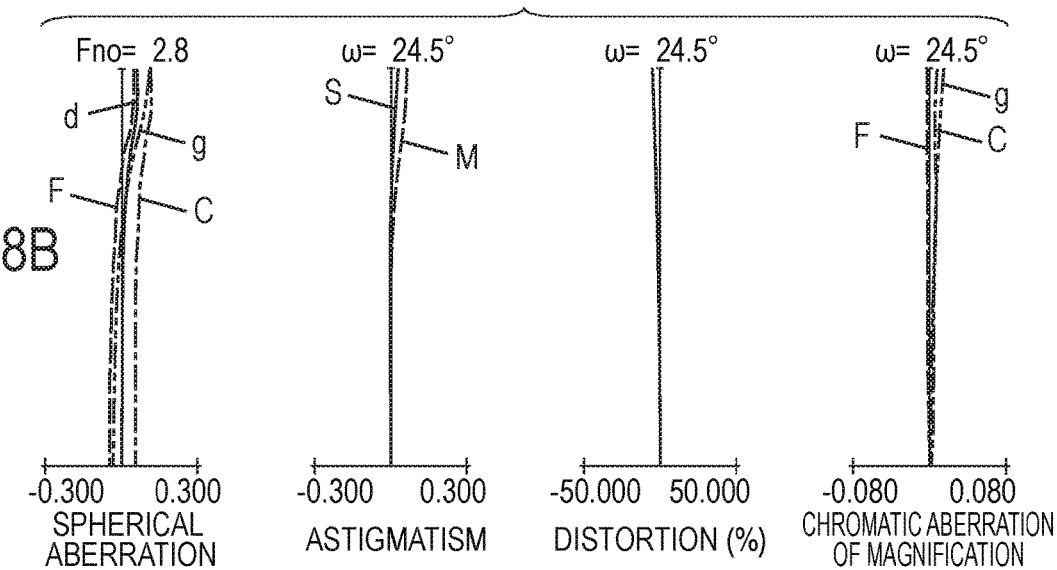
FIG. 8B is an aberration diagram of the zoom lens of Example 4 at an intermediate zoom position.
Figure 8C:
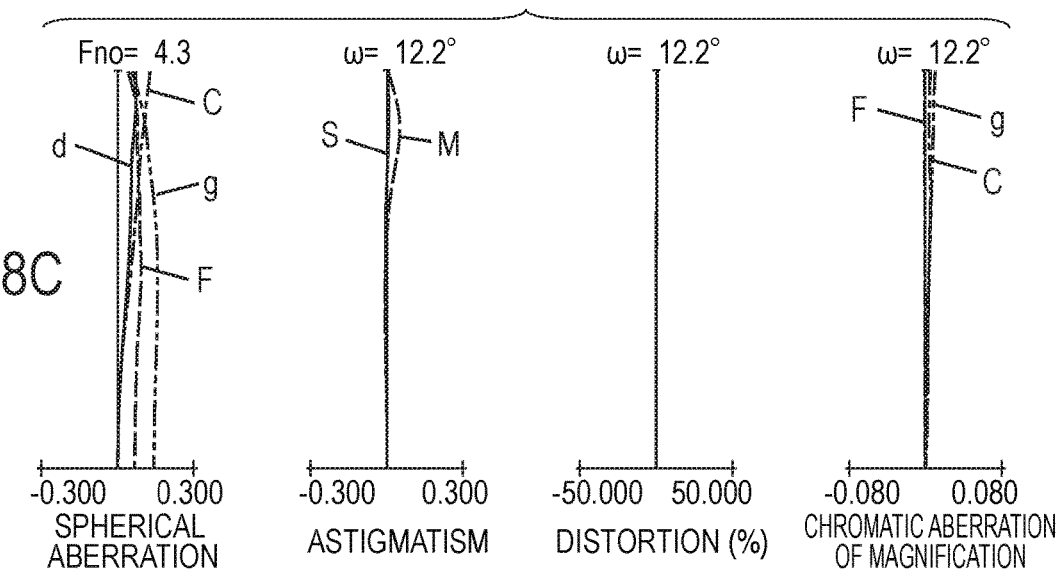
FIG. 8C is an aberration diagram of the zoom lens of Example 4 at a telephoto end.
Figure 9:
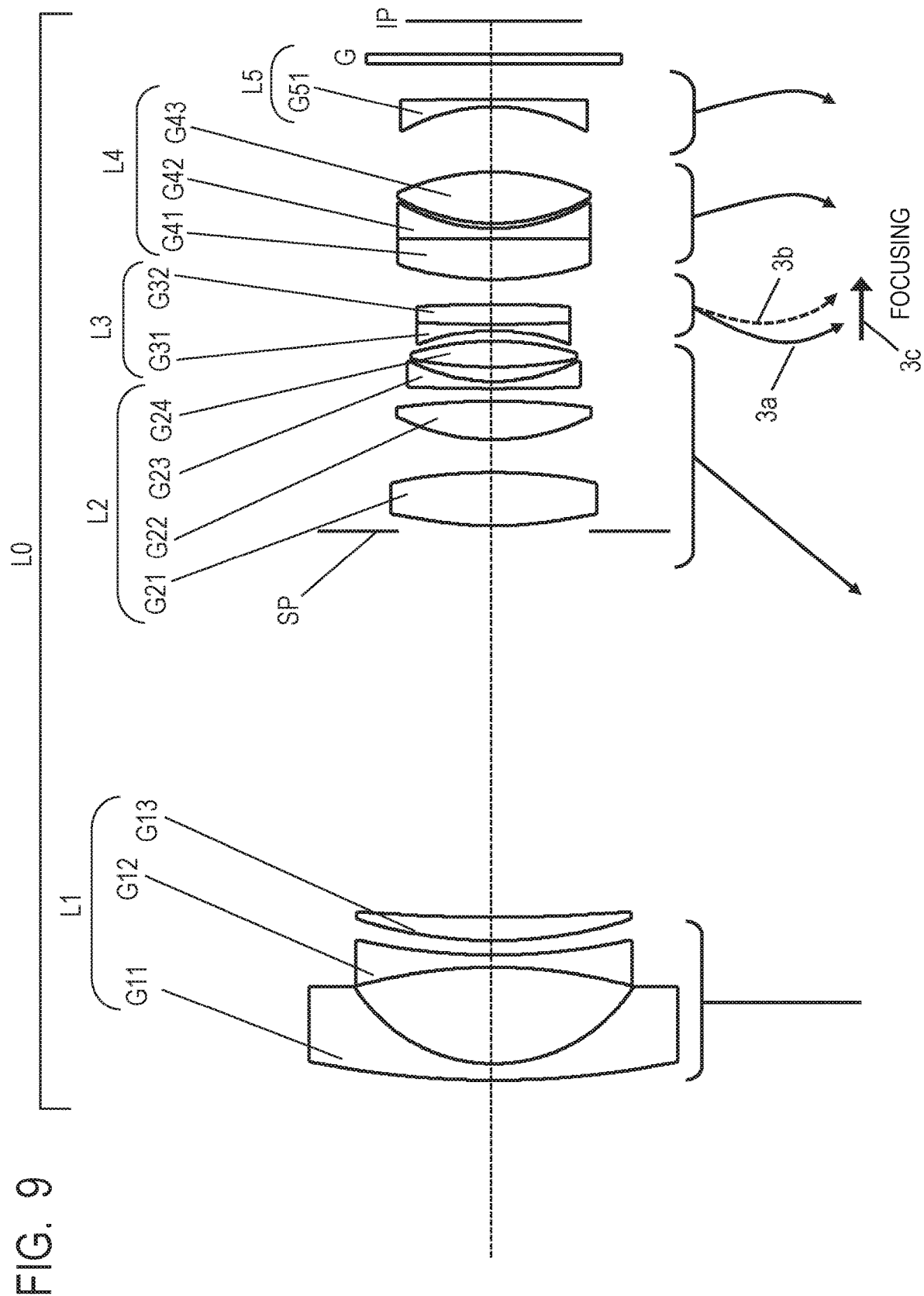
FIG. 9 is a cross-sectional view of a zoom lens of Example 5 of the present invention at a wide angle end.
Figure 10A:
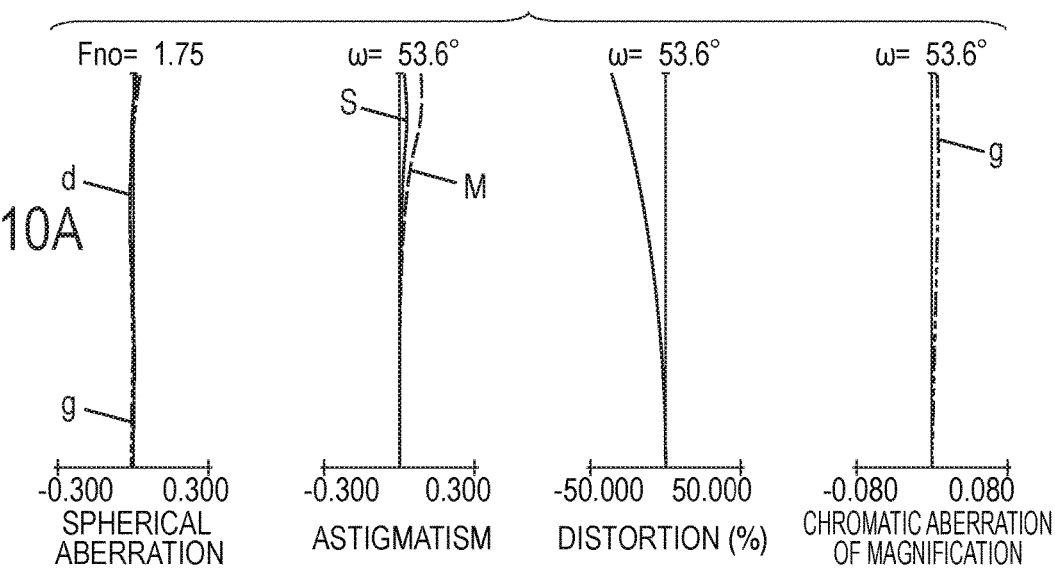
FIG. 10A is an aberration diagram of the zoom lens of Example 5 at the wide angle end.
Figure 10B:
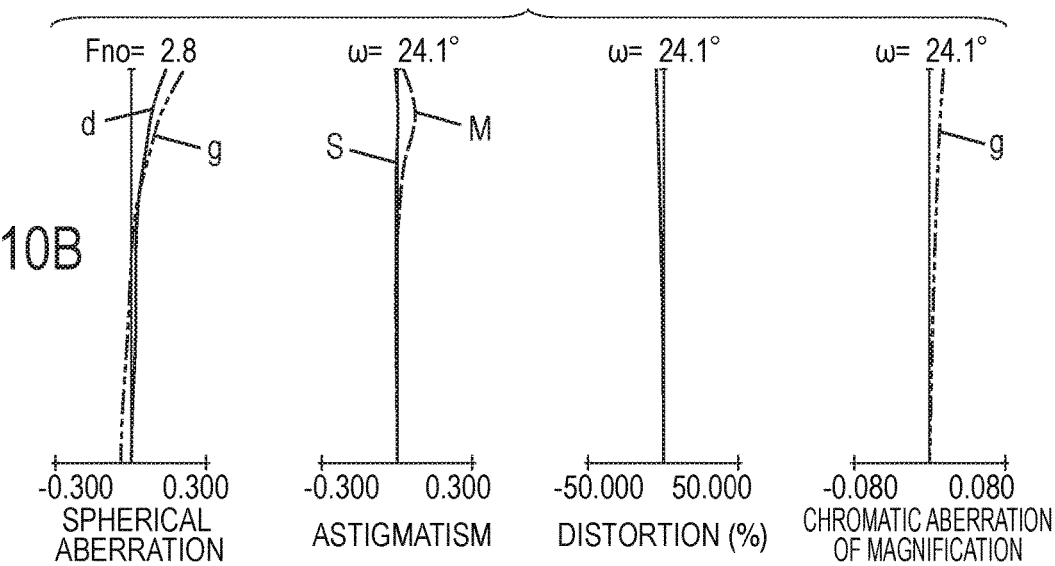
FIG. 10B is an aberration diagram of the zoom lens of Example 5 at an intermediate zoom position.
Figure 10C:
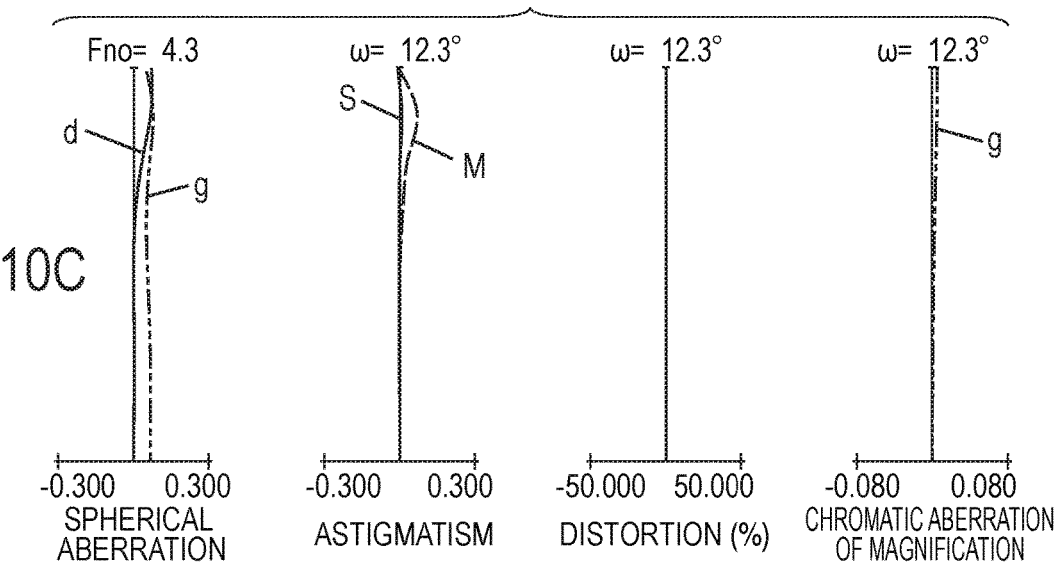
FIG. 10C is an aberration diagram of the zoom lens of Example 5 at a telephoto end.
Figure 11:
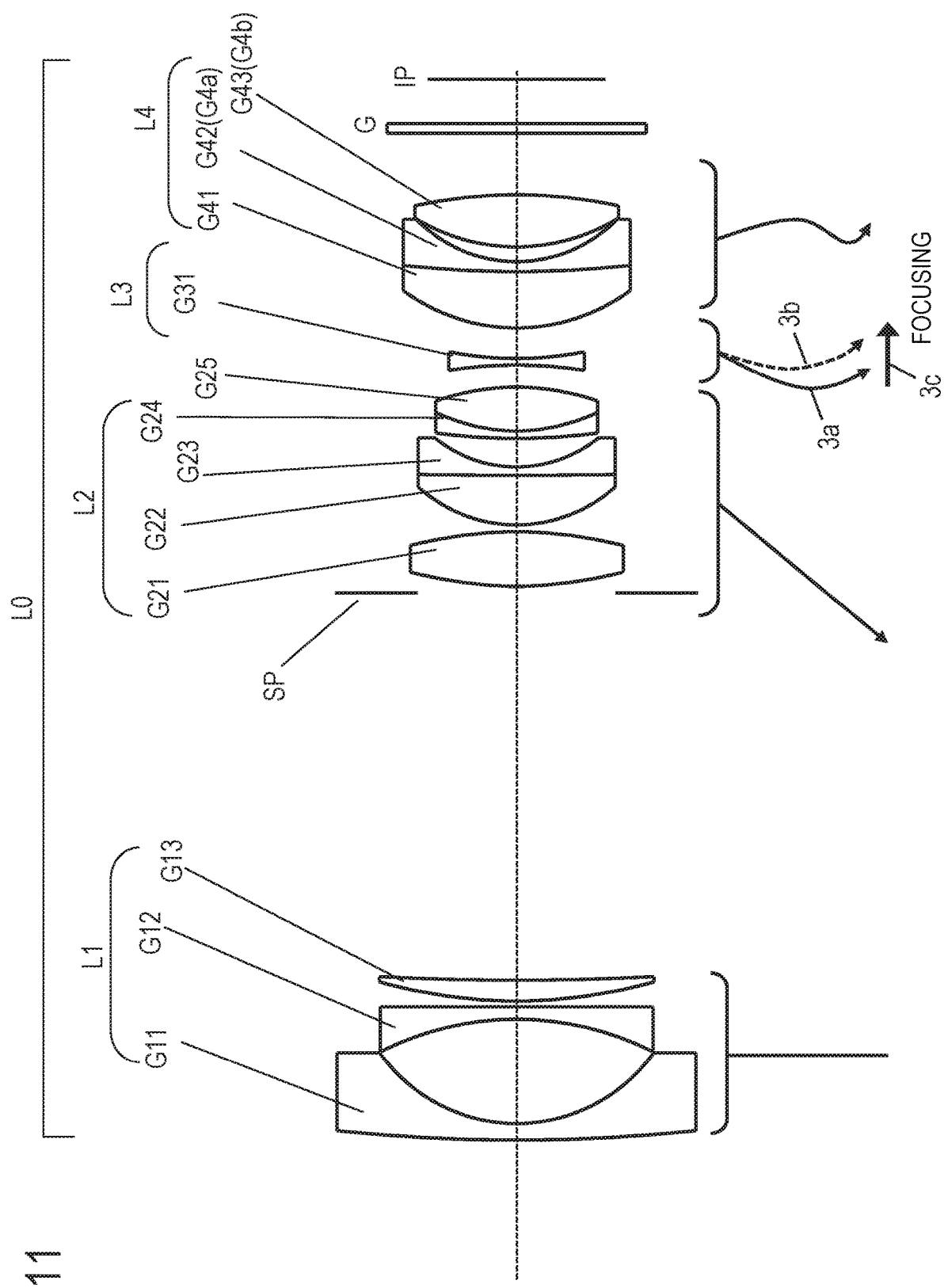
FIG. 11 is a cross-sectional view of a zoom lens of Example 6 of the present invention at a wide angle end.
Figure 12A:
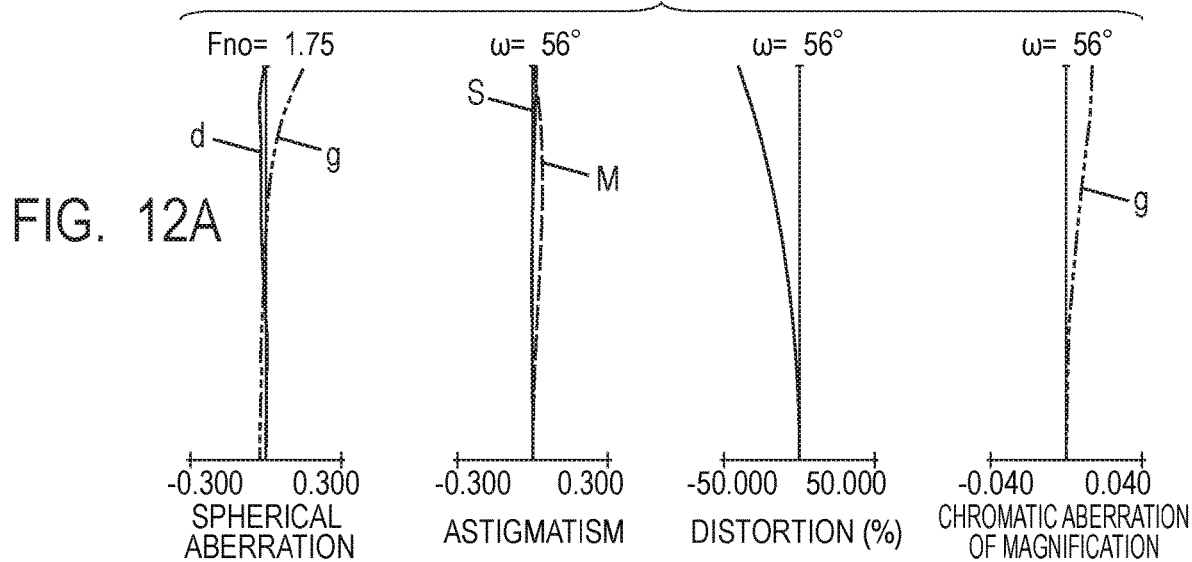
FIG. 12A is an aberration diagram of the zoom lens of Example 6 at the wide angle end.
Figure 12B:
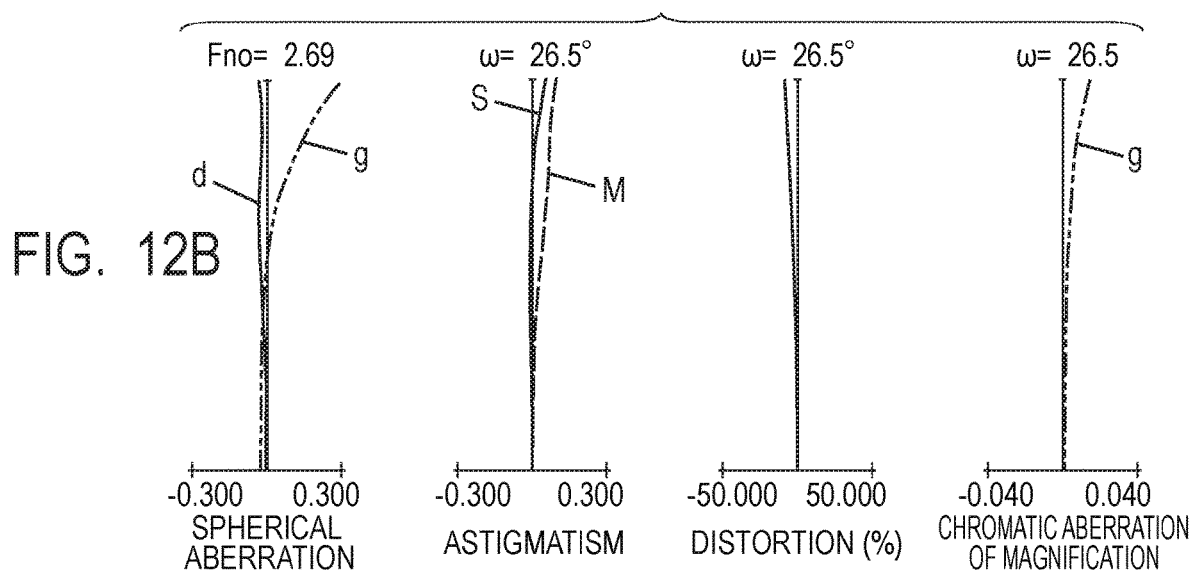
FIG. 12B is an aberration diagram of the zoom lens of Example 6 at an intermediate zoom position.
Figure 12C:
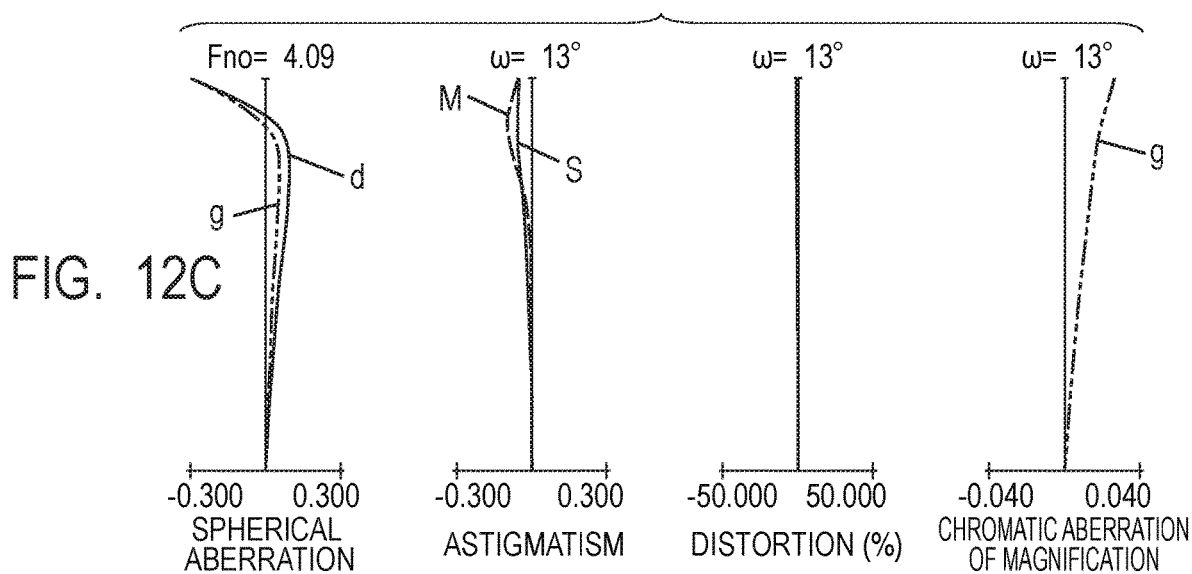
FIG. 12C is an aberration diagram of the zoom lens of Example 6 at a telephoto end.
Figure 13:
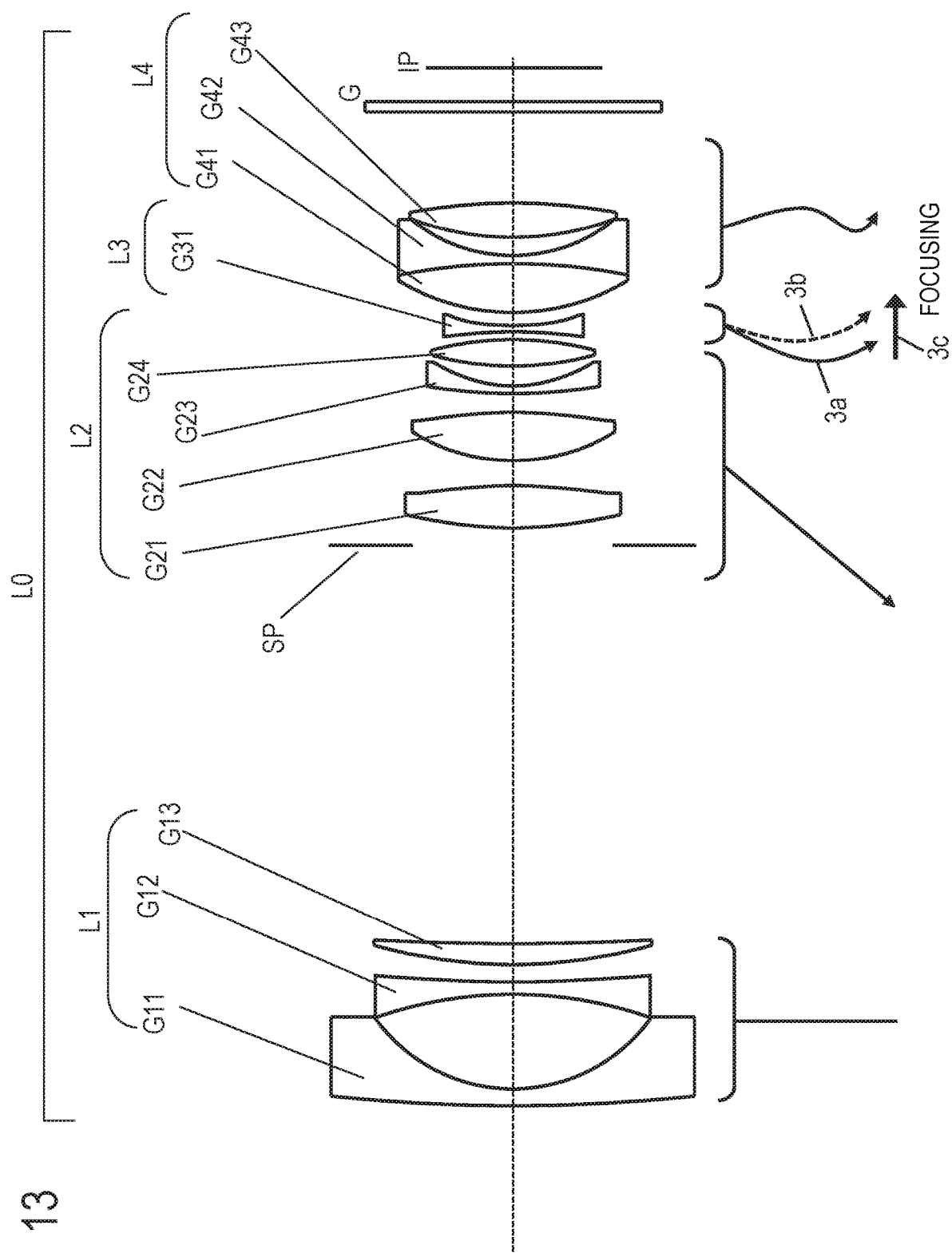
FIG. 13 is a cross-sectional view of a zoom lens of Example 7 of the present invention at a wide angle end.
Figure 14A:
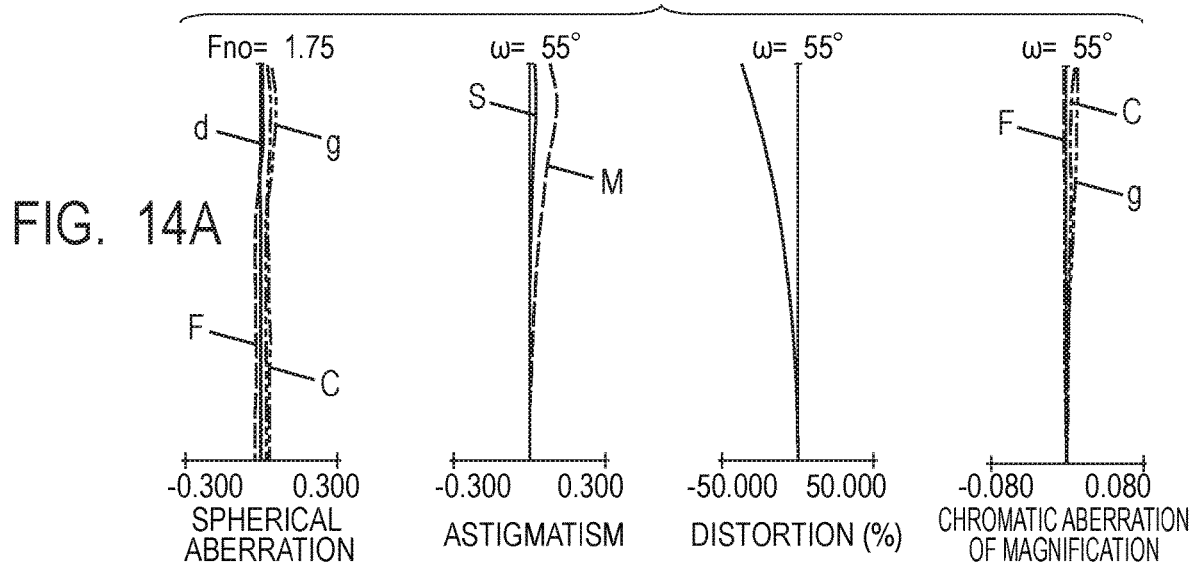
FIG. 14A is an aberration diagram of the zoom lens of Example 7 at the wide angle end.
Figure 14B:
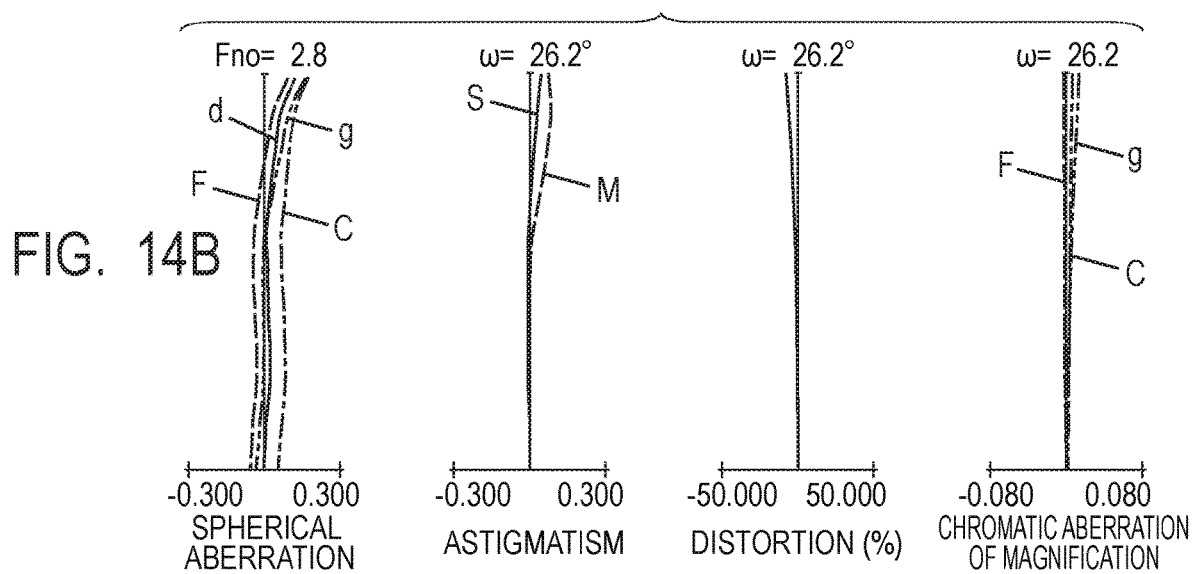
FIG. 14B is an aberration diagram of the zoom lens of Example 7 at an intermediate zoom position.
Figure 14C:
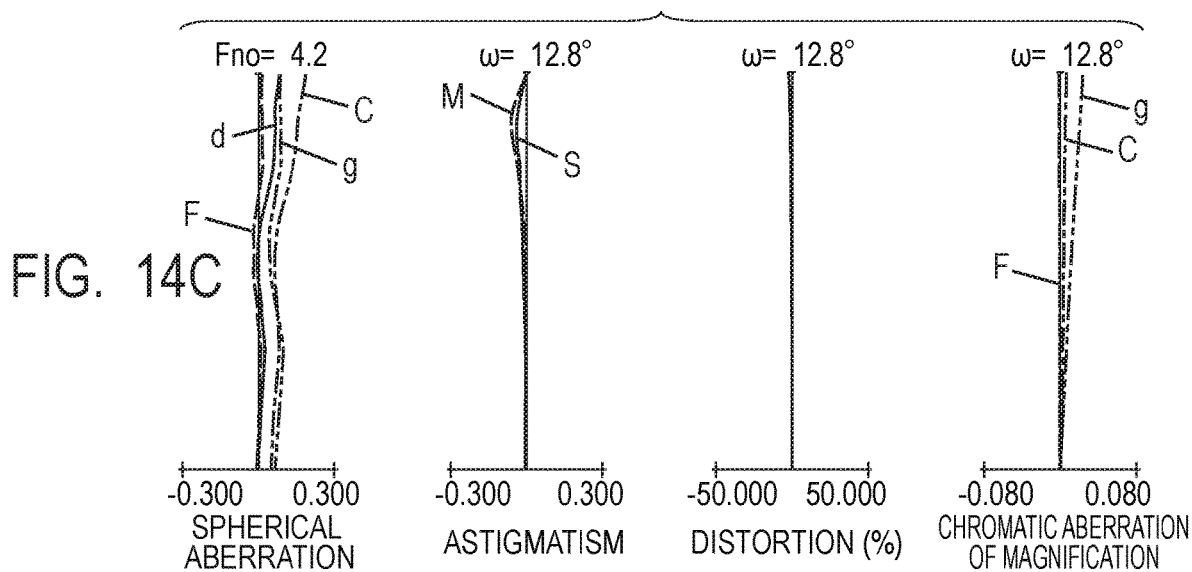
FIG. 14C is an aberration diagram of the zoom lens of Example 7 at a telephoto end.
Figure 15:
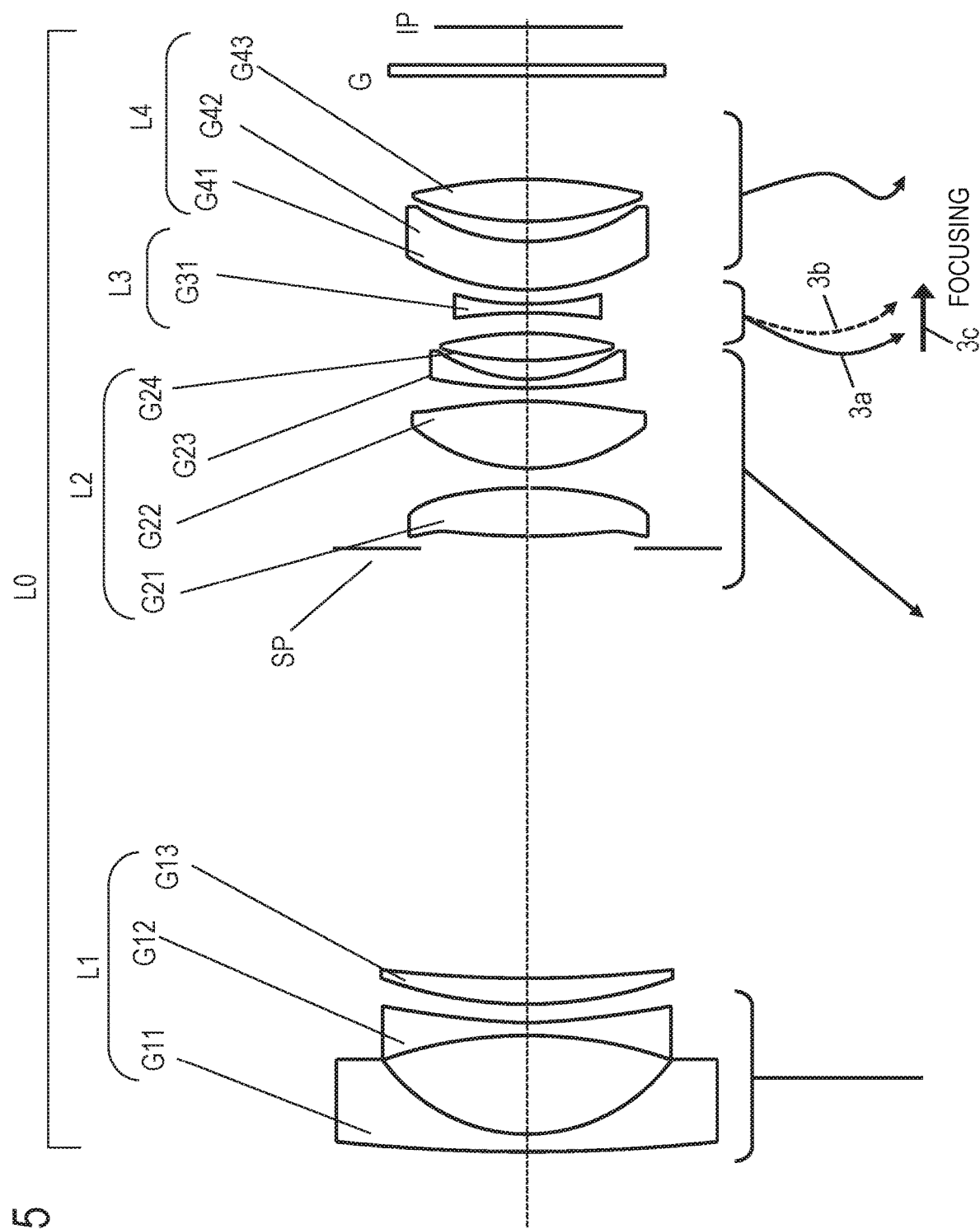
FIG. 15 is a cross-sectional view of a zoom lens of Example 8 of the present invention at a wide angle end.
Figure 16A:
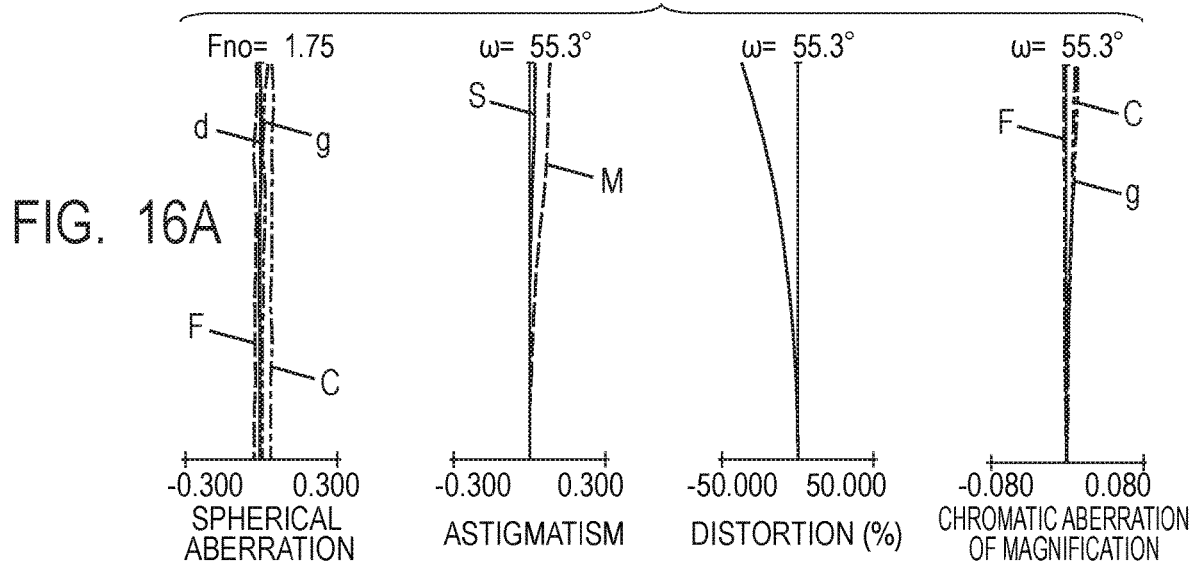
FIG. 16A is an aberration diagram of the zoom lens of Example 8 at the wide angle end.
Figure 16B:
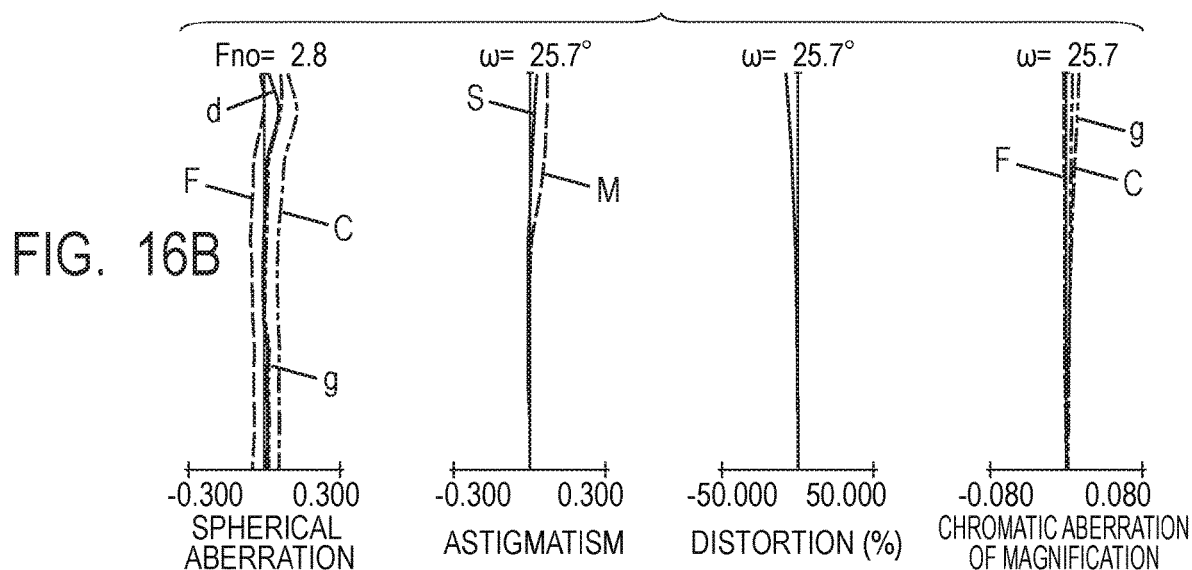
FIG. 16B is an aberration diagram of the zoom lens of Example 8 at an intermediate zoom position.
Figure 16C:
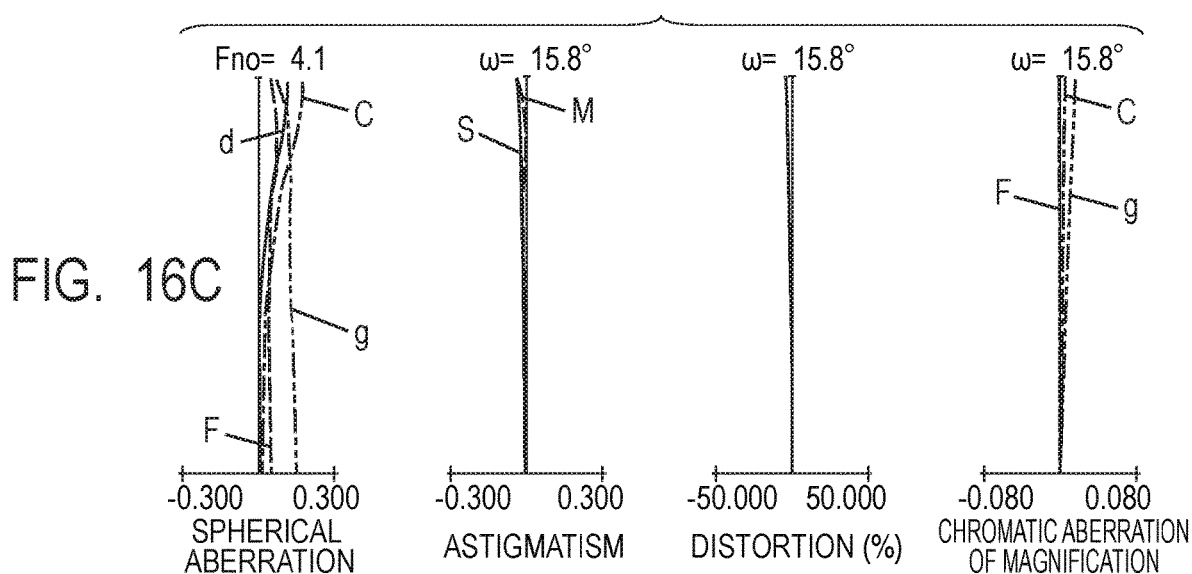
FIG. 16C is an aberration diagram of the zoom lens of Example 8 at a telephoto end.
Figure 17:
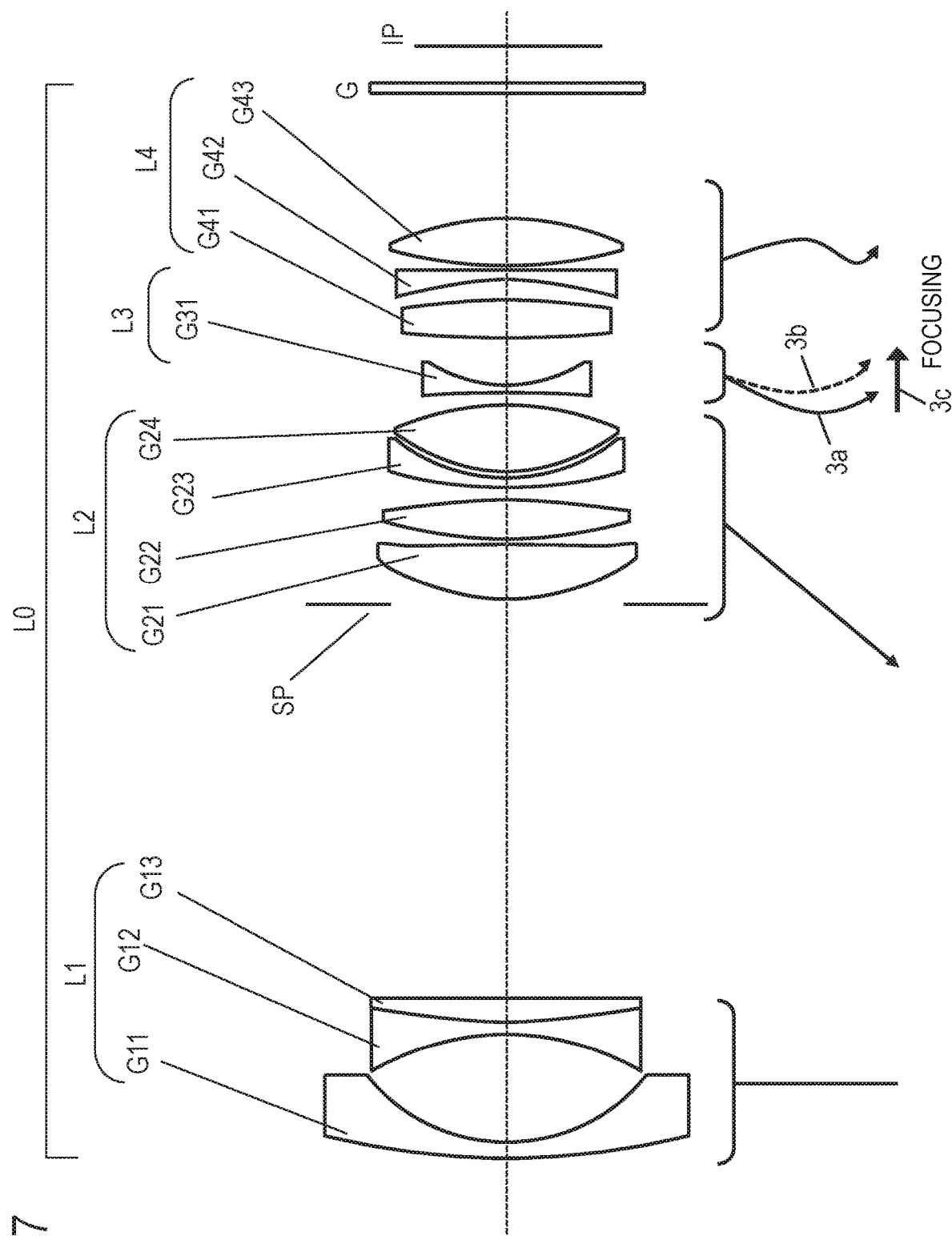
FIG. 17 is a cross-sectional view of a zoom lens of Example 9 of the present invention at a wide angle end.
Figure 18A:
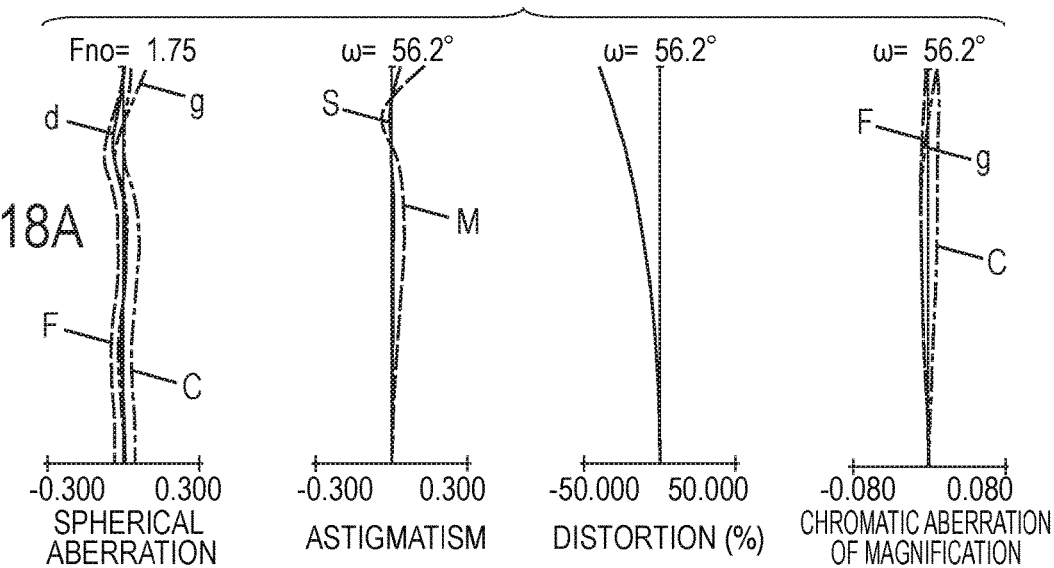
FIG. 18A is an aberration diagram of the zoom lens of Example 9 at the wide angle end.
Figure 18B:
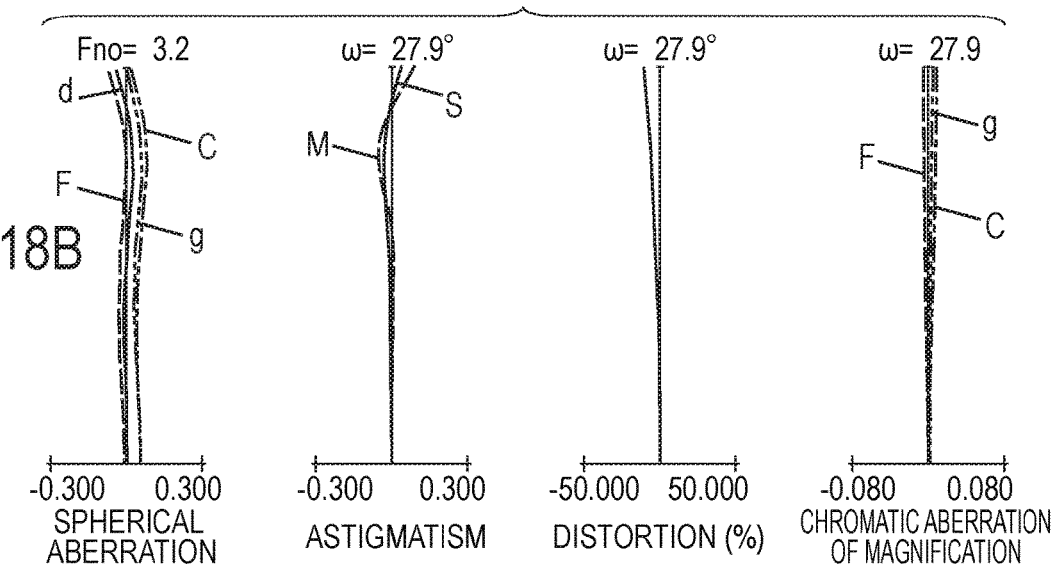
FIG. 18B is an aberration diagram of the zoom lens of Example 9 at an intermediate zoom position.
Figure 18C:
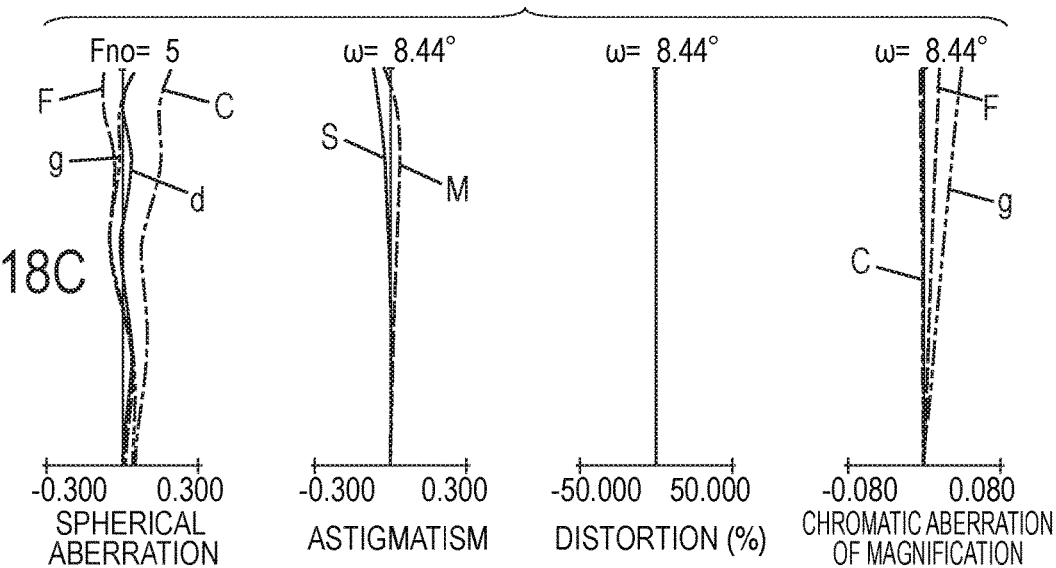
FIG. 18C is an aberration diagram of the zoom lens of Example 9 at a telephoto end.
Figure 20A:
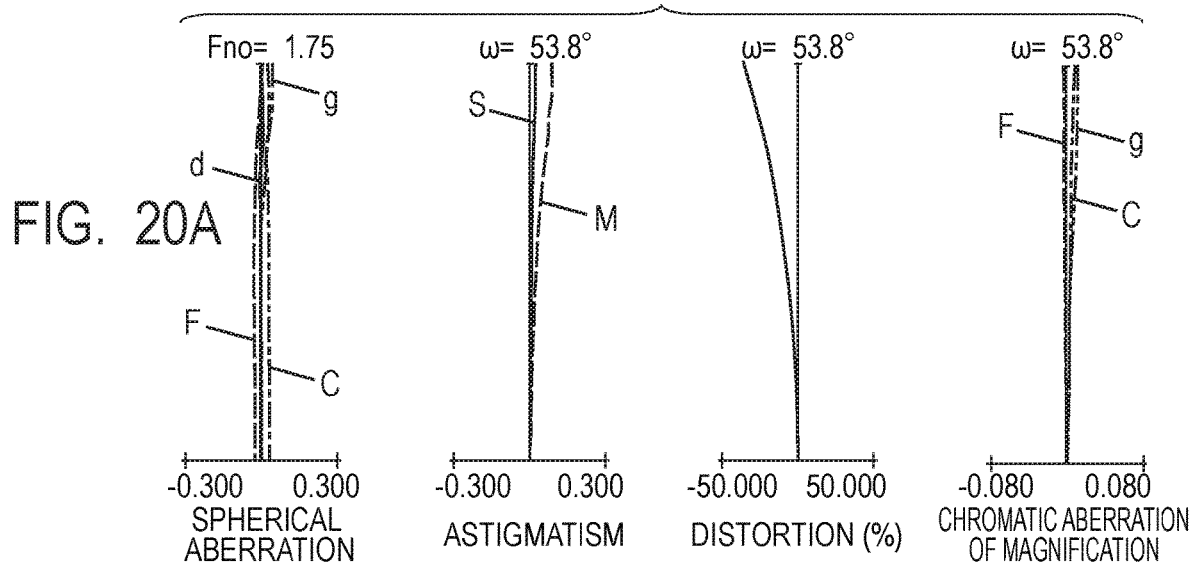
FIG. 20A is an aberration diagram of the zoom lens of Example 10 at the wide angle end.
Figure 20B:
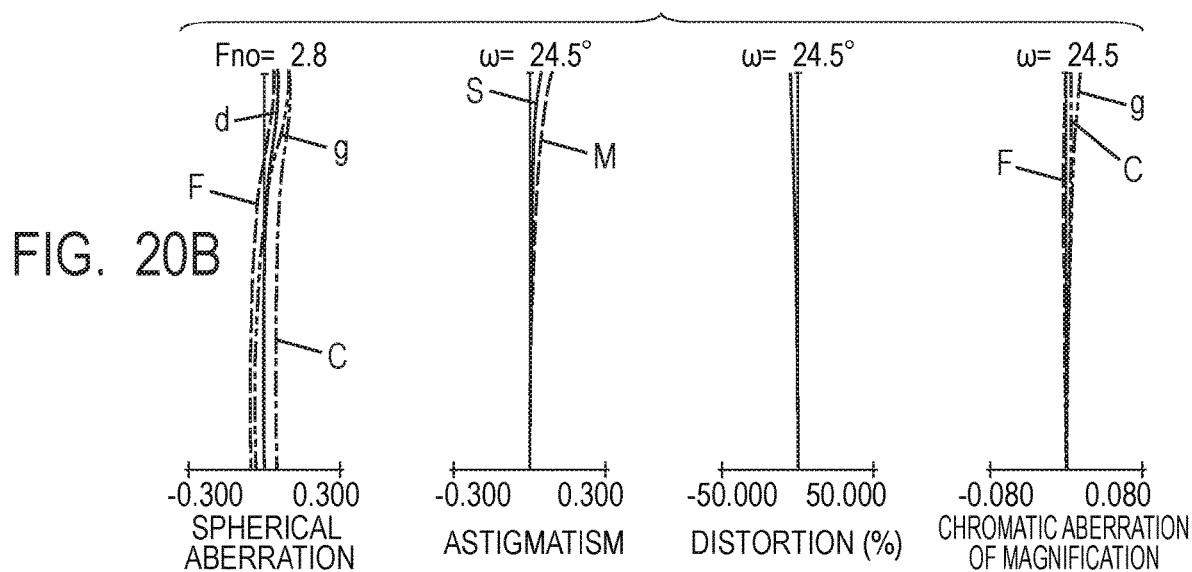
FIG. 20B is an aberration diagram of the zoom lens of Example 10 at an intermediate zoom position.
Figure 20C:
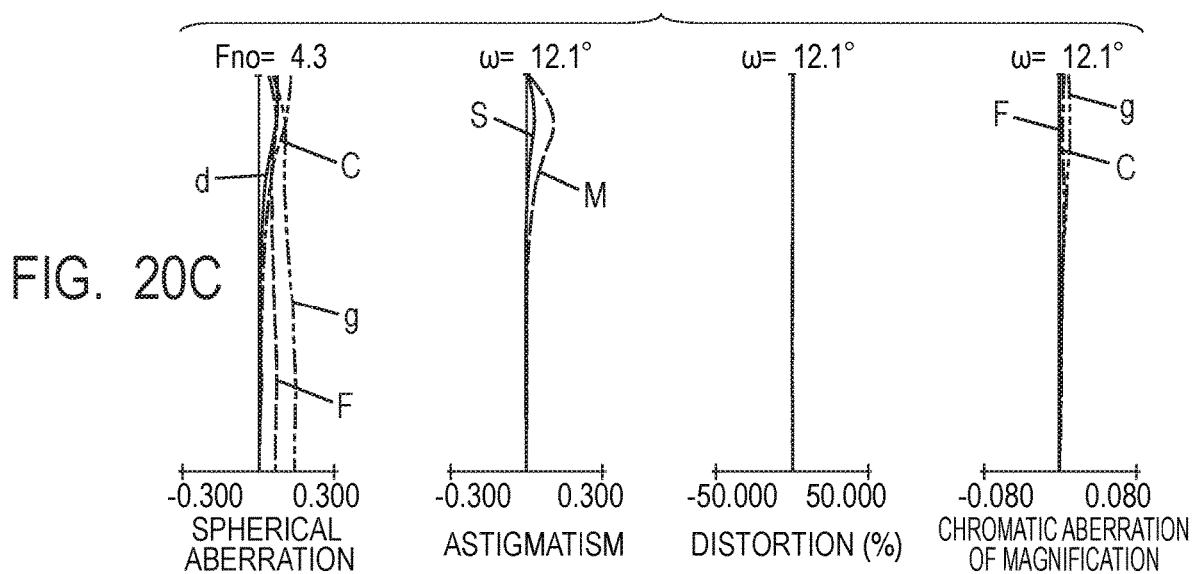
FIG. 20C is an aberration diagram of the zoom lens of Example 10 at a telephoto end.

FIG. 2A, FIG. 2B, and FIG. 2C are aberration diagrams of the zoom lens of Example 1 at the wide angle end, an intermediate zoom position, and a telephoto end (longest focal length), respectively. FIG. 4A, FIG. 4B, and FIG. 4C are aberration diagrams of the zoom lens of Example 2 at the wide angle end, an intermediate zoom position, and a telephoto end (longest focal length), respectively. FIG. 6A, FIG. 6B, and FIG. 6C are aberration diagrams of the zoom lens of Example 3 at the wide angle end, an intermediate zoom position, and a telephoto end (longest focal length), respectively. FIG. 8A, FIG. 8B, and FIG. 8C are aberration diagrams of the zoom lens of Example 4 at the wide angle end, an intermediate zoom position, and a telephoto end (longest focal length), respectively. FIG. 10A, FIG. 10B, and FIG. 10C are aberration diagrams of the zoom lens of Example 5 at the wide angle end, an intermediate zoom position, and a telephoto end (longest focal length), respectively. FIG. 12A, FIG. 12B, and FIG. 12C are aberration diagrams of the zoom lens of Example 6 at the wide angle end, an intermediate zoom position, and a telephoto end (longest focal length), respectively. FIG. 14A, FIG. 14B, and FIG. 14C are aberration diagrams of the zoom lens of Example 7 at the wide angle end, an intermediate zoom position, and a telephoto end (longest focal length), respectively. FIG. 16A, FIG. 16B, and FIG. 16C are aberration diagrams of the zoom lens of Example 8 at the wide angle end, an intermediate zoom position, and a telephoto end (longest focal length), respectively. FIG. 18A, FIG. 18B, and FIG. 18C are aberration diagrams of the zoom lens of Example 9 at the wide angle end, an intermediate zoom position, and a telephoto end (longest focal length), respectively. FIG. 20A, FIG. 20B, and FIG. 20C are aberration diagrams of the zoom lens of Example 10 at the wide angle end, an intermediate zoom position, and a telephoto end (longest focal length), respectively.

Example 1 represents a zoom lens having a zoom ratio of 3.90 and an F-number of from 1.75 to 4.09. Example 2 represents a zoom lens having a zoom ratio of 3.90 and an F-number of from 1.75 to 4.00. Example 3 represents a zoom lens having a zoom ratio of 3.90 and an F-number of from 1.75 to 4.09. Example 4 represents a zoom lens having a zoom ratio of 4.00 and an F-number of from 1.75 to 4.30. Example 5 represents a zoom lens having a zoom ratio of 4.00 and an F-number of from 1.75 to 4.30. Example 6 represents a zoom lens having a zoom ratio of 3.90 and an F-number of from 1.75 to 4.09. Example 7 represents a zoom lens having a zoom ratio of 4.00 and an F-number of from 1.75 to 4.20. Example 8 represents a zoom lens having a zoom ratio of 3.30 and an F-number of from 1.75 to 4.10. Example 9 represents a zoom lens having a zoom ratio of 6.00 and an F-number of from 1.75 to 5.00. Example 10 represents a zoom lens having a zoom ratio of 4.00 and an F-number of from 1.75 to 4.30.

Figure 21A:
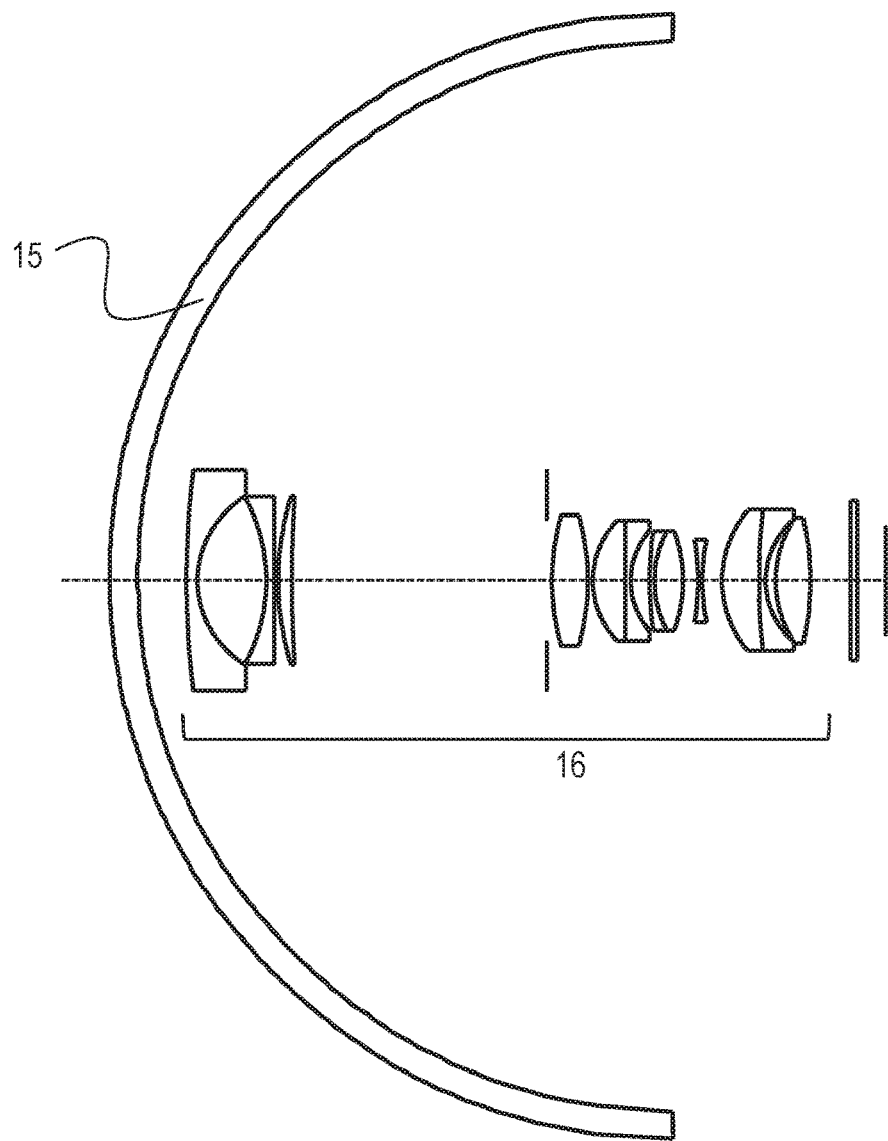
FIG. 21A is a cross-sectional view of the zoom lens of Example 1 and a dome cover.
Figure 21B:
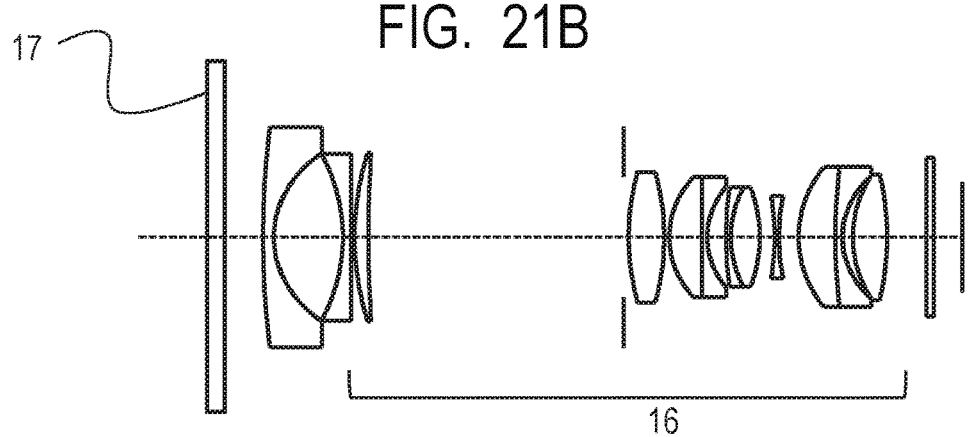
FIG. 21B is a cross-sectional view of the zoom lens of Example 1 and a protection cover.
Figure 22A:
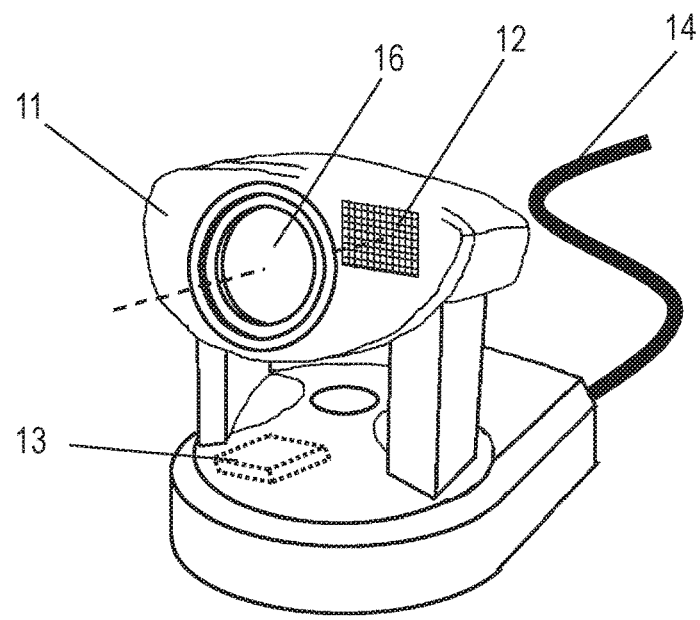
FIG. 22A is an illustration of a monitoring camera and a usage example thereof in an embodiment of the present invention.
Figure 22B:
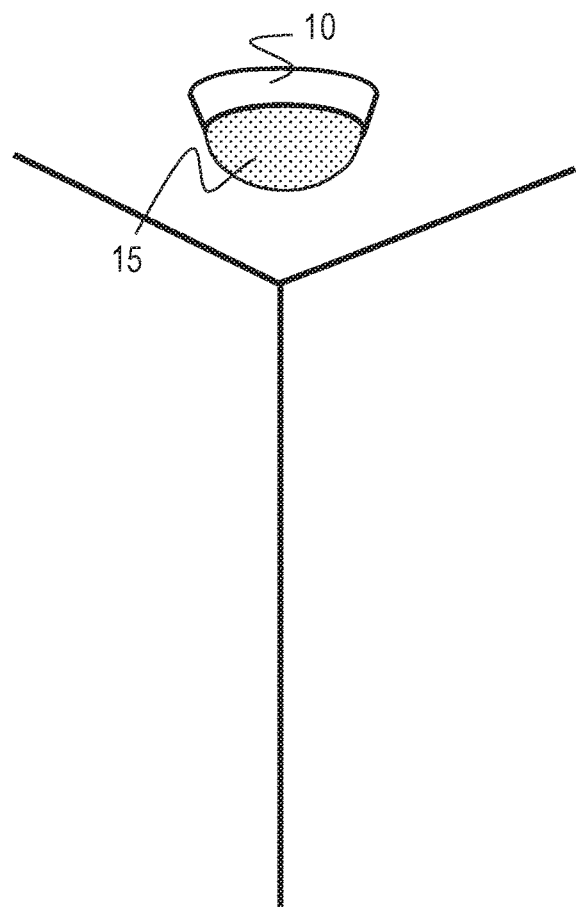
FIG. 22B is an illustration of the monitoring camera and a usage example thereof in an embodiment of the present invention.
Figure 23:
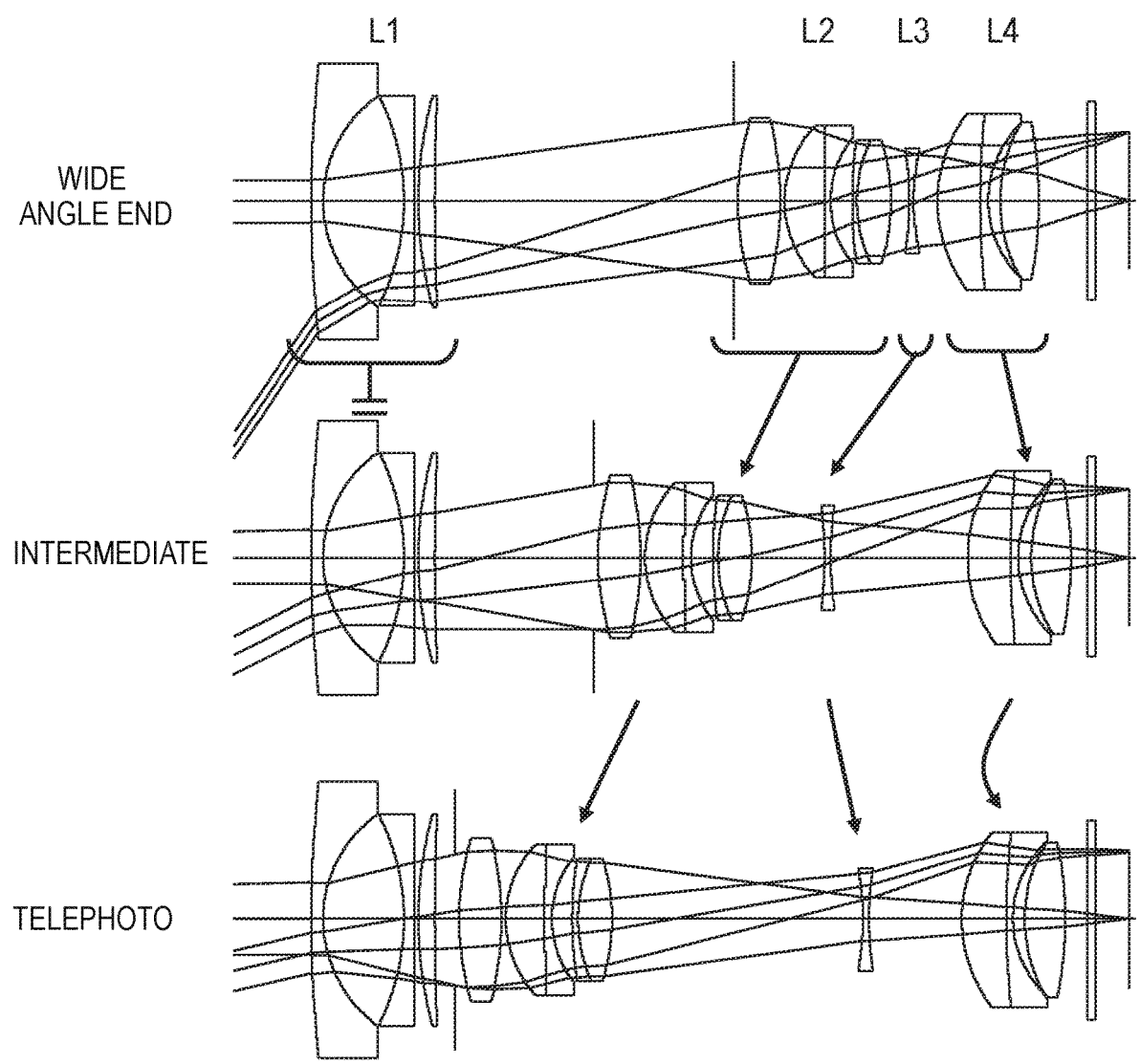
FIG. 23 is an explanatory view of zoom loci of the zoom lens of Example 1.

FIG. 21A is a schematic view of a main part at the time when a dome cover is mounted to a zoom lens according to an embodiment of the present invention. FIG. 21B is a schematic view of a main part at the time when a protection cover is mounted to a zoom lens according to an embodiment of the present invention. FIG. 22A and FIG. 22B are each a schematic view of a main part of a monitoring camera (image pickup apparatus) including a zoom lens according to an embodiment of the present invention. FIG. 23 is an illustration of loci (zoom loci) of movement of respective lens units during zooming of the zoom lens of Example 1.

The zoom lens in each Example is an image pickup optical system used for a monitoring camera. The zoom lens in each Example may also be used for an image pickup apparatus such as a video camera, a digital camera, a silver-halide film camera, or a television (TV) camera.

In the cross-sectional views, the left side is the object side (front), and the right side is the image side (rear). A zoom lens L0 is illustrated in each of the cross-sectional views. When the order of a lens unit from the object side is represented by "i", the i-th lens unit is represented by Li. An aperture stop SP and an optical block G, for example, a filter are also illustrated. An image plane IP corresponds to an image pickup surface of a solid-state image pickup element (photoelectric conversion element) such as a CCD sensor or a CMOS sensor when the zoom lens is used as an image pickup optical system for a digital camera, a video camera, or a monitoring camera.

In the zoom lens of each Example, the interval between each pair of adjacent lens units is changed during zooming. The arrows indicate movement loci of the respective lens units during zooming from the wide angle end to the telephoto end. Similarly, the arrow regarding "focusing" indicates a movement direction of the lens unit during focusing from infinity to a close distance.

In the spherical aberration diagram, a solid line "d" indicates a d-line (wavelength: 587.6 nm), and a two-dot chain line "g" indicates a g-line (wavelength: 435.8 nm). In the astigmatism diagram, a dotted line M indicates a meridional image plane for the d-line, and a solid line S indicates a sagittal image plane for the d-line. Distortion is shown as a value at the d-line. A lateral chromatic aberration is shown as a value at the g-line. A half angle of view (in degrees) is represented by "ω", and an F-number is represented by Fno. In each Example, the wide angle end and the telephoto end refer to zoom positions when a lens unit for varying magnification is positioned at respective ends of a range in which the lens unit is movable on an optical axis. In FIG. 2A, FIG. 2B, FIG. 2C, FIG. 8A, FIG. 8B, FIG. 8C, FIG. 14A, FIG. 14B, FIG. 14C, FIG. 16A, FIG. 16B, FIG. 16C, FIG. 18A, FIG. 18B, FIG. 18C, FIG. 20A, FIG. 20B, and FIG. 20C, a C-line (wavelength: 656.3 nm) and an F-line (wavelength: 486.1 nm) are also shown. Specifically, in the spherical aberration diagrams and the diagrams of lateral chromatic aberration, a long dashed short dashed line C indicates the C-line, and a dotted line F indicates the F-line.

The zoom lens of each Example includes, in order from the object side to the image side, a first lens unit L1 having a negative refractive power, a second lens unit L2, a third lens unit L3, and a fourth lens unit L4. The zoom lens may further include a fifth lens unit L5 arranged adjacent to the image side of the fourth lens unit L4. At least one lens unit may be further arranged on the image side of the fifth lens unit L5.

In each Example, the aperture stop SP is arranged on the object side of the second lens unit L2, and is configured to move along the same locus as that of the second lens unit L2 during zooming. An aperture diameter of the aperture stop SP may be constant during zooming, or may be changed during zooming. When the aperture diameter of the aperture stop SP is changed, lower ray coma flare, which is greatly caused by an off-axial beam at the telephoto end, can be cut, and thus more satisfactory optical performance can be obtained.

First, Examples 1 to 5 are described.

Examples 1 to 3 represent a four-unit zoom lens. The four-unit zoom lens includes, from the object side to the image side, the first lens unit L1 having a negative refractive power, the second lens unit L2 having a positive refractive power, the third lens unit L3 having a negative refractive power, and the fourth lens unit L4 having a positive refractive power. The first lens unit L1 is configured not to move during zooming, and the second lens unit L2, and the third lens unit L3, and the fourth lens unit L4 are configured to move along the loci indicated by the arrows during zooming.

Examples 4 and 5 represent a five-unit zoom lens. The five-unit zoom lens includes, from the object side to the image side, the first lens unit L1 having a negative refractive power, the second lens unit L2 having a positive refractive power, the third lens unit L3 having a negative refractive power, the fourth lens unit L4 having a positive refractive power, and the fifth lens unit L5 having a negative refractive power. The first lens unit L1 is configured not to move during zooming, and the second lens unit L2, and the third lens unit L3, the fourth lens unit L4, and the fifth lens unit L5 are configured to move along the loci indicated by the arrows during zooming.

The third lens unit L3 or the fourth lens unit L4 is responsible for focusing. In Examples 1, 2, 4, and 5, the focusing is performed by moving the third lens unit L3 on the optical axis. When the focusing is to be performed from infinity to a close distance at the telephoto end, the third lens unit L3 is retreated toward the image side as indicated by an arrow 3c in the cross-sectional views.

A curve 3a in the drawings indicates a movement locus for correcting image plane variations accompanying zooming from the wide angle end to the telephoto end when the focus is at infinity. A curve 3b indicates a movement locus for correcting image plane variations accompanying zooming from the wide angle end to the telephoto end when the focus is at a close distance.

In Example 3, the fourth lens unit L4 is moved so that image plane variations accompanying magnification varying are corrected and focusing is performed. A solid-line curve 4a and a dotted-line curve 4b related to the fourth lens unit L4 are movement loci for correcting the image plane variations accompanying magnification varying when the focuses are at infinity and a close distance, respectively. Further, the focusing from the infinity to the close distance is performed by advancing the fourth lens unit L4 forward as indicated by an arrow 4C. The focusing may be performed by moving, in place of the third lens unit L3 or the fourth lens unit L4, a part or all of the lenses of the second lens unit L2 on the optical axis.

A method of moving each lens unit during zooming is described with reference to FIG. 23, which is cross-sectional views of the four-unit zoom lens of Example 1 at the wide angle end, the intermediate zoom position, and the telephoto end. During zooming from the wide angle end to the telephoto end, the second lens unit L2, the third lens unit L3, and the fourth lens unit L4 are independently moved (along different loci) as indicated by the arrows.

Specifically, the second lens unit L2 is configured to monotonically move from the image side toward the object side to perform magnification varying. The third lens unit L3 is configured to simultaneously move along a convex locus toward the object side. That is, the third lens unit L3 is configured to move toward the object side, and then move toward the image side. The fourth lens unit L4 is configured to move along a locus having at least one inflection point. In order to form such movement loci of the lens units, at the wide angle end, an interval between each pair of lens units among the second lens unit L2, the third lens unit L3, and the fourth lens unit L4 is appropriately secured so that the zoom ratio can be easily increased. Further, the first lens unit L1 is formed to have a negative refractive power so that the angle of view can be easily increased.

The first lens unit L1 of the zoom lens having a wide angle of view has a large effective diameter, and hence is increased in weight. Thus, it is difficult for the first lens unit L1 to perform rapid following during zooming. In each Example, there is employed a configuration in which the lenses of the second lens unit L2 and the lens subsequent thereto, which have small weights, are driven during zooming so that rapid zooming is facilitated.

It is important to reduce variations in optical performance due to focusing and to reduce variations in incident angle of off-axial rays to the image pickup element during zooming while coping with the upsizing of the image pickup element. Therefore, in each Example, the configurations of the third lens unit L3 and the fourth lens unit L4, the refractive powers, and the interval between the third lens unit L3 and the fourth lens unit L4 at the telephoto end are defined.

In addition, the variations in optical performance due to focusing are reduced, and the variations in incident angle of the off-axial rays to the image pickup element during zooming are reduced. Therefore, each lens unit is configured as described above.

Further, the third lens unit L3 consists of a single optical element. The single optical element herein includes not only a single lens but also a cemented lens obtained by cementing a plurality of lenses to each other. The fourth lens unit L4 includes a plurality of lenses arranged at intervals. A focal length of the third lens unit L3 is represented by f3, a focal length of the fourth lens unit L4 is represented by f4, and an interval between the third lens unit L3 and the fourth lens unit L4 at the telephoto end is represented by L34$t$. At this time, the following conditional expressions are satisfied.

$$0.8<|f3/f4|<3.0 \qquad (1)$$

$$2.5<|f3/L34t|<5.0 \qquad (2)$$

Next, the technical meaning of each of the conditional expressions given above is described.

Conditional Expression (1) defines a ratio between the refractive power of the third lens unit L3 and the refractive power of the fourth lens unit L4. Conditional Expression (1) is an expression for reducing variations in optical performance due to focusing. When the ratio exceeds the upper limit of Conditional Expression (1) and the positive refractive power of the fourth lens unit L4 is increased, the change in angle of the off-axial rays due to the fourth lens unit L4 is increased, and the variations in incident angle of the off-axial rays to the image pickup element during zooming are disadvantageously increased.

When the ratio falls below the lower limit of Conditional Expression (1) and the negative refractive power of the third lens unit L3 is increased (absolute value of the negative refractive power is increased), the variations in optical performance during focusing are increased, and in particular, the variations in curvature of field and astigmatism at the wide angle end are disadvantageously increased.

Conditional Expression (2) defines a ratio between the negative refractive power of the third lens unit L3 and the interval between the third lens unit L3 and the fourth lens unit L4 at the telephoto end. Conditional Expression (2) is an expression for coping with the upsizing of the image pickup element. At the telephoto end, at which the focal length of the entire system of the zoom lens is increased, the off-axial beams are caused to diverge by the third lens unit L3 having a negative refractive power. In this manner, a height of incidence of the rays is efficiently increased, and the upsized image pickup element is coped with.

When the ratio exceeds the upper limit of Conditional Expression (2) and the interval between the third lens unit L3 and the fourth lens unit L4 at the telephoto end is decreased, the effect of increasing the height of incidence of the off-axial beams by the third lens unit L3 becomes disadvantageously insufficient. When the ratio falls below the lower limit of Conditional Expression (2) and the negative refractive power of the third lens unit L3 is increased, the image height can be easily increased (image pickup plane can be easily increased), but the variations in curvature of field and astigmatism due to focusing at the wide angle end are disadvantageously increased.

In each Example, it is preferred to set the numerical value ranges of Conditional Expressions (1) and (2) as follows.

$$1.0<|f3/f4|<2.5 \qquad (1a)$$

$$2.8<|f3/L34t|<4.5 \qquad (2a)$$

It is more preferred to set the numerical value ranges of Conditional Expressions (1a) and (2a) as follows.

$$1.1<|f3/f4|<2.2 \qquad (1b)$$

$$3.0<|f3/L34t|<4.2 \qquad (2b)$$

With the above-mentioned configuration, there is obtained the zoom lens in which the variations in optical performance due to focusing are reduced and the variations in incident angle of the off-axial rays to the image pickup element during zooming are reduced while the upsizing of the image pickup element is coped with.

Further, in each Example, the fourth lens unit L4 includes at least two positive lenses and at least one negative lens. A lens surface closest to the object side of the fourth lens unit L4 has a shape convex toward the object side. Among lenses arranged at intervals in the fourth lens unit L4, a lens surface R4$a$ on the image side of a lens 4$a$ on the object side has a shape concave toward the image side, and a lens surface R4$b$ on the object side of a lens 4$b$ on the image side has a shape convex toward the object side. An absolute value of a curvature radius of the lens surface R4$a$ is smaller than an absolute value of a curvature radius of the lens surface R4$b$.

The fourth lens unit L4 having a positive refractive power has a role of converging the off-axial beams caused to diverge by the third lens unit L3 having a negative refractive power, suitably collecting the rays onto the surface of the image pickup element, and guiding the rays so as to form an image. That is, in the zoom lens of each Example, the lens configuration of the fourth lens unit L4 is important to suitably correct aberrations of the off-axial beams.

In view of this, the fourth lens unit L4 consists of a plurality of lenses including at least two positive lenses and at least one negative lens so that various aberrations, mainly, an astigmatism and a chromatic aberration, are suitably corrected. Further, in order to facilitate control of an incident angle of the off-axial beams caused to diverge by the third lens unit L3 to the surface of the image pickup element, the lens surface closest to the object side of the fourth lens unit L4 is convex toward the object side.

Further, as a shape of an air lens formed by lens surfaces on the object side and the image side of the fourth lens unit L4, which corresponds to an interval formed in the lens unit, the lens surface on the object side has a shape concave toward the image side, and the lens surface on the image side has a shape convex toward the object side. Further, an absolute value of a curvature radius of the lens surface on the object side is smaller than an absolute value of a curvature radius of the lens surface on the image side.

With such a configuration, a meniscus air lens having a convex surface directed toward the object side is formed in the fourth lens unit L4. The air lens having such a shape is formed in the fourth lens unit L4 so that the variations in incident angle of the off-axial rays to the image pickup element during zooming are reduced while an astigmatism and a comatic aberration due to the off-axial beams are suitably corrected.

The third lens unit L3 is configured to move along a locus convex toward the object side during zooming from the wide angle end to the telephoto end, and is positioned on the object side at the telephoto end as compared to a position at the wide angle end. The second lens unit L2 is configured to move from the image side toward the object side during zooming from the wide angle end to the telephoto end.

In view of this, with use of a space formed when the second lens unit L2 is moved from the image side toward the object side, the third lens unit L3 is moved so as to draw a locus convex toward the object side. In this manner, the entire lens length is reduced by effectively using the space in the optical system. Further, the third lens unit L3 is configured to move so as to be positioned on the object side at the telephoto end as compared to a position at the wide angle end. With this movement, at the telephoto end, at which the focal length of the entire system of the zoom lens is increased, the third lens unit L3 having a negative refractive power causes the off-axial beams to diverge. In this manner, the height of incidence of the rays is efficiently increased, and thus the upsized image pickup element is coped with.

The second lens unit L2 has an aspherical surface, and includes a positive lens arranged closest to the object side. The second lens unit L2 includes a plurality of lenses arranged at intervals. Among the lenses arranged at intervals in the second lens unit L2, a lens surface R2a on the image side of a lens 2a on the object side has a shape concave toward the image side, and a lens surface R2b on the object side of a lens 2b on the image side has a shape convex toward the object side. An absolute value of a curvature radius of the lens surface R2a is smaller than an absolute value of a curvature radius of the lens surface R2b.

With such a configuration, a meniscus air lens having a convex surface directed toward the object side is formed in the second lens unit L2. The second lens unit L2 having a positive refractive power converges axial beams caused to diverge by the first lens unit L1 having a negative refractive power, and causes convergence beams to enter the third lens unit L3.

The second lens unit L2 has the aspherical surface and includes the positive lens arranged closest to the object side so that a spherical aberration, which occurs when the axial beams are converged, is suitably corrected. Further, the air lens having the above-mentioned shape is formed in the second lens unit L2 so that a curvature of field and an astigmatism are suitably corrected. Further, in each Example, it is preferred to satisfy at least one of the following conditional expressions.

A focal length of the first lens unit L1 is represented by f1. A distance (lens unit thickness) from a lens surface closest to the object side to a lens surface closest to the image side of the fourth lens unit L4 is represented by D4. A distance (lens unit thickness) from a lens surface closest to the object side to a lens surface closest to the image side of the first lens unit L1 is represented by D1.

At this time, it is preferred to satisfy at least one of the following conditional expressions.

$$1.5 < f4/L34t < 5.0 \quad (3)$$

$$1.5 < f3/f1 < 3.0 \quad (4)$$

$$1.0 < |f4/f1| < 2.0 \quad (5)$$

$$2.0 < f4/D4 < 4.0 \quad (6)$$

$$1.0 < |f1/D1| < 2.0 \quad (7)$$

Next, the technical meaning of each of the conditional expressions given above is described.

Conditional Expression (3) defines a ratio between the refractive power of the fourth lens unit L4 and the interval between the third lens unit L3 and the fourth lens unit L4 at the telephoto end. Conditional Expression (3) is an expression for reducing variations in incident angle of the off-axial beams to the surface of the image pickup element while coping with the upsized image pickup element. When the ratio exceeds the upper limit of Conditional Expression (3) and the interval between the third lens unit L3 and the fourth lens unit L4 at the telephoto end is decreased, the effect of increasing the height of incidence of the off-axial beams by the third lens unit L3 becomes disadvantageously insufficient.

When the ratio falls below the lower limit of Conditional Expression (3) and the positive refractive power of the fourth lens unit L4 is increased, the change in angle of the off-axial rays by the fourth lens unit L4 is increased, and it becomes difficult to reduce the variations in incident angle of the off-axial rays to the image pickup element during zooming.

Conditional Expression (4) defines a ratio between the refractive power of the third lens unit L3 and the refractive power of the first lens unit L1. When the ratio exceeds the upper limit of Conditional Expression (4) and the negative refractive power of the first lens unit L1 is excessively increased, correction of distortion and a curvature of field at the wide angle end becomes disadvantageously insufficient. When the ratio falls below the lower limit of Conditional Expression (4) and the negative refractive power of the third lens unit L3 is excessively increased, the variations in optical performance due to focusing, in particular, the variations in curvature of field and astigmatism at the wide angle end are disadvantageously increased.

Conditional Expression (5) defines a ratio between the positive refractive power of the fourth lens unit L4 and the negative refractive power of the first lens unit L1. When the ratio exceeds the upper limit of Conditional Expression (5) and the negative refractive power of the first lens unit L1 is excessively increased, correction of distortion and a curvature of field at the wide angle end becomes disadvantageously insufficient. When the ratio falls below the lower limit of Conditional Expression (5) and the positive refractive power of the fourth lens unit L4 is excessively increased, the change in angle of the off-axial rays due to the fourth lens unit L4 is increased, and it becomes difficult to reduce the variations in incident angle of the off-axial rays to the image pickup element during zooming.

Conditional Expression (6) defines a ratio between the positive refractive power of the fourth lens unit L4 and the lens unit thickness of the fourth lens unit L4 in the optical axis direction. When the ratio exceeds the upper limit of Conditional Expression (6) and the positive refractive power of the fourth lens unit L4 is excessively decreased, it becomes disadvantageously difficult to control the incident angle of the off-axial beams caused to diverge by the third lens unit L3 to the surface of the image pickup element. When the ratio falls below the lower limit of Conditional Expression (6) and the lens unit thickness of the fourth lens unit L4 in the optical axis direction is excessively increased, it becomes difficult to reduce the entire lens length.

Conditional Expression (7) defines a ratio between the negative refractive power of the first lens unit L1 and the lens unit thickness of the first lens unit L1 in the optical axis direction. When the ratio exceeds the upper limit of Conditional Expression (7) and the negative refractive power of the first lens unit L1 is decreased (absolute value of the negative refractive power is decreased), it becomes difficult to secure a wide image pickup angle of view at the wide angle end. When the ratio falls below the lower limit of Conditional Expression (7) and the lens unit thickness of the first lens unit L1 in the optical axis direction is increased, it becomes difficult to reduce the entire lens length. Further, the effective diameter of the lens closest to the object side in the entire system of the zoom lens is increased, and the entire system of the zoom lens is upsized.

In each Example, for the purpose of correcting the aberrations, it is more preferred to set the numerical ranges of Conditional Expressions (3) to (7) as follows.

$$1.7 < f4/L34t < 4.0 \qquad (3a)$$

$$1.7 < f3/f1 < 2.8 \qquad (4a)$$

$$1.1 < |f4/f1| < 1.8 \qquad (5a)$$

$$2.2 < f4/D4 < 3.5 \qquad (6a)$$

$$1.1 < |f1/D1| < 1.7 \qquad (7a)$$

In each Example, it is still more preferred to set the numerical value ranges of Conditional Expressions (3a) to (7a) as follows.

$$1.9 < f4/L34t < 3.2 \qquad (3b)$$

$$1.8 < f3/f1 < 2.7 \qquad (4b)$$

$$1.2 < |f4/f1| < 1.7 \qquad (5b)$$

$$2.4 < f4/D4 < 3.2 \qquad (6b)$$

$$1.2 < |f1/D1| < 1.5 \qquad (7b)$$

Next, Examples 1, 2, 3, and 6 are described.

The zoom lens of each Example consists of the first lens unit L1 having a negative refractive power, the second lens unit L2 having a positive refractive power, the third lens unit L3 having a negative refractive power, and the fourth lens unit L4 having a positive refractive power, which are arranged in order from the object side to the image side. The first lens unit L1 is configured not to move during zooming, and the second lens unit L2 to the fourth lens unit L4 are configured to move during zooming.

The zoom lens of each Example has a four-unit configuration, which is a configuration suitable for obtaining high optical performance over the entire zoom range from the wide angle end to the telephoto end while achieving downsizing of the entire system of the zoom lens and a small F-number. Further, the first lens unit L1 has a negative refractive power, and hence the angle of view can be easily increased.

In each Example, the fourth lens unit L4 includes at least two lenses. A focal length of the second lens unit L2 is represented by f2, and a focal length of the entire system of the zoom lens at the wide angle end is represented by "fw". An amount of movement of the second lens unit L2 during zooming from the wide angle end to the telephoto end is represented by M2, and an amount of movement of the fourth lens unit L4 during zooming from the wide angle end to the telephoto end is represented by M4. At this time, the following conditional expressions are satisfied.

$$1.0 < f2/fw < 3.5 \qquad (8)$$

$$-20.0 < M2/M4 < -5.0 \qquad (9)$$

In this case, the amount of movement of the lens unit during zooming from the wide angle end to the telephoto end refers to a difference between a position of the lens unit on the optical axis at the wide angle end and a position of the lens unit on the optical axis at the telephoto end. The sign of the amount of movement is positive when the lens unit is positioned on the image side at the telephoto end as compared to a position at the wide angle end, and is negative when the lens unit is positioned on the object side at the telephoto end as compared to the a position at wide angle end.

Next, the technical meaning of each of the conditional expressions given above is described. Conditional Expression (8) is an expression for obtaining a high zoom ratio while downsizing the entire system of the zoom lens. When a ratio exceeds the upper limit of Conditional Expression (8), the positive power (refractive power) of the second lens unit L2 is excessively decreased, and the amount of movement for obtaining a desired zoom ratio is increased. Thus, it becomes difficult to downsize the entire system of the zoom lens.

When the ratio falls below the lower limit of Conditional Expression (8), the positive power of the second lens unit L2 is excessively increased, and a spherical aberration is increased along with the increase in aperture ratio (to obtain a small Fno). Thus, it becomes difficult to obtain a high resolution.

Conditional Expression (9) is an expression for appropriately setting a relationship between the amounts of movement during zooming of the second lens unit L2 and the fourth lens unit L4, which are configured to act as magnification-varying lens units. The second lens unit L2 serves as a main magnification-varying lens unit. The second lens unit L2 is configured to move from the image side toward the object side during zooming from the wide angle end to the telephoto end so as to obtain a magnification-varying effect.

Further, the fourth lens unit L4 is configured to move from the object side toward the image side during zooming from the wide angle end to the telephoto end so as to secure the magnification-varying ratio. That is, both of the second lens unit L2 and the fourth lens unit L4, with which it is easy to obtain the magnification-varying effect, are simultaneously driven so that the magnification-varying ratio is efficiently obtained.

When a ratio exceeds the upper limit of Conditional Expression (9), the amount of movement of the fourth lens unit L4 is excessively increased, and it becomes difficult to secure a predetermined length of back focus at the telephoto end. Thus, the entire lens length is increased, and it becomes difficult to downsize the entire system of the zoom lens. When the ratio falls below the lower limit of Conditional Expression (9), the amount of movement of the fourth lens unit L4 is decreased, and it becomes difficult to obtain a sufficient magnification-varying effect. Thus, it becomes difficult to increase the zoom ratio.

It is preferred to set the numerical value ranges of Conditional Expressions (8) and (9) as follows.

$$1.5 < f2/fw < 3.2 \qquad (8a)$$

$$-15.0 < M2/M4 < -6.0 \qquad (9a)$$

In each Example, it is preferred to satisfy at least one of the following conditional expressions. The fourth lens unit L4 consists of a positive lens, a negative lens, and a positive lens, which are arranged in order from the object side to the image side. A focal length of a positive lens G4b arranged closest to the image side of the fourth lens unit L4 is represented by f4p, and the focal length of the fourth lens unit L4 is represented by f4. A difference in lens unit interval between the third lens unit L3 and the fourth lens unit L4 at the wide angle end and the telephoto end is represented by D34wt, and the focal length of the third lens unit L3 is represented by f3.

The positive lens G4b arranged closest to the image side and a lens G4a adjacent to the object side of the positive lens G4b of the fourth lens unit L4 are arranged at intervals. A curvature radius of a lens surface on the image side of the lens G4a is represented by Ra, and a curvature radius of a lens surface on the object side of the positive lens G4b is represented by Rb. The third lens unit L3 consists of one negative lens, and the third lens unit L3 is configured to move along a locus convex toward the object side during zooming from the wide angle end to the telephoto end. An Abbe number of a material of the negative lens included in the third lens unit L3 is represented by ν3d.

The second lens unit L2 includes, in order from the object side to the image side, a positive lens having an aspherical surface, and a first cemented lens, which is adjacent to the positive lens, and is obtained by cementing a positive lens and a negative lens to each other in order from the image side. The positive lens and the negative lens are made of materials different from each other. The second lens unit L2 further includes a second cemented lens obtained by cementing a negative lens and a positive lens to each other. The negative lens and the positive lens are made of materials different from each other. A focal length of the first cemented lens is represented by f2a, and a focal length of the second cemented lens is represented by f2b.

When the zoom lens of each Example is used in an image pickup apparatus including an image pickup element, the maximum value of an half angle of view at the wide angle end is represented by "ωw", and the maximum value of an half angle of view at the telephoto end is represented by "ωt". A lateral magnification of the second lens unit L2 at the wide angle end is represented by β2w, and a lateral magnification of the second lens unit L2 at the telephoto end is represented by β2t.

At this time, it is preferred to satisfy at least one of the following conditional expressions.

$$0.65 < f4p/f4 < 1.30 \quad (10)$$

$$0.45 < f2/f4 < 1.00 \quad (11)$$

$$-7.0 < f3/D34wt < -3.0 \quad (12)$$

$$-0.40 < (Ra-Rb)/(Ra+Rb) < -0.05 \quad (13)$$

$$73 < \nu 3d < 100 \quad (14)$$

$$0.00 \leq |f2b/f2a| < 0.60 \quad (15)$$

$$0.60 < (\tan \omega w/\tan \omega t)/(\oplus 2t/\beta 2w) < 0.90 \quad (16)$$

Next, the technical meaning of each of the conditional expressions given above is described. Conditional Expression (10) defines the power of the positive lens G4b forming the fourth lens unit L4. In this case, the fourth lens unit L4 is configured to satisfactorily correct distortion in the entire zoom range by appropriately defining the power of the positive lens G4b closest to the image side while performing aberration correction.

When a ratio exceeds the upper limit of Conditional Expression (10), the focal length of the positive lens G4b closest to the image side is increased (that is, the power is decreased), and hence the distortion is disadvantageously increased greatly in the positive direction. When the ratio falls below the lower limit of Conditional Expression (10), the power of the positive lens G4b closest to the image side is increased, and hence the distortion is disadvantageously increased greatly in the negative direction.

Conditional Expression (11) defines a ratio between the power of the second lens unit L2 and the power of the fourth lens unit L4. The second lens unit L2 and the fourth lens unit L4 are the two magnification-varying lens units. When the ratio exceeds the upper limit of Conditional Expression (11), the focal length of the second lens unit L2 is increased, and the positive power is decreased. Thus, it is required to increase the amount of movement of the second lens unit L2 for magnification varying, and it becomes difficult to downsize the entire system of the zoom lens. When the ratio falls below the lower limit of Conditional Expression (11), the positive power of the second lens unit L2 is excessively increased, and various aberrations, in particular, a spherical aberration is increased. Thus, the optical performance at the time when the F-number is decreased is decreased.

Conditional Expression (12) defines a relationship between the amounts of movement of the third lens unit L3 and the fourth lens unit L4 during zooming. The difference D34wt in interval represents a difference in position at the wide angle end and the telephoto end of the third lens unit L3 and the fourth lens unit L4. The third lens unit L3 is a movable lens unit having a role of a focusing lens unit, and the fourth lens unit L4 is the magnification-varying lens unit. Therefore, the rays are required to pass through both of the third lens unit L3 and the fourth lens unit L4 made of a glass material so as to have as small an outer diameter as possible.

When a ratio exceeds the upper limit of Conditional Expression (12), the third lens unit L3 and the fourth lens unit L4 are moved along loci having large amounts of movement. In this case, the rays are bounced up by the third lens unit L3 having a negative refractive power, and thus the ray diameter is required to be increased when the rays enter the fourth lens unit L4. Therefore, it becomes difficult to downsize the entire system of the zoom lens. When the ratio falls below the lower limit of Conditional Expression (12), it becomes difficult to sufficiently secure the amounts of movement of the third lens unit L3 and the fourth lens unit L4, and the power of each lens unit is required to be increased. Thus, a curvature of field and a lateral chromatic aberration are disadvantageously increased.

Conditional Expression (13) is an expression for satisfactorily correcting, in particular, a comatic aberration, with use of an effect as an air lens positioned closest to the image side of the fourth lens unit L4. When a ratio exceeds the upper limit of Conditional Expression (13), power as the air lens becomes insufficient, and the effect of correcting various aberrations is decreased. When the ratio falls below the lower limit of Conditional Expression (13), the power as the air lens is excessively increased, and various aberrations are disadvantageously corrected excessively.

Conditional Expression (14) defines the material of the negative lens forming the third lens unit L3 serving as the focusing lens unit. In order to suppress variations in chromatic aberration during focusing from the close distance to a far distance, it is preferred to use a material having as low dispersion as possible. Further, in order to achieve rapid focusing and downsizing, it is preferred that the third lens unit L3 consist of one lens. When a value exceeds the upper limit of Conditional Expression (14), the number of materials satisfying the above-mentioned condition is disadvantageously decreased. When the value falls below the lower limit of Conditional Expression (14), a chromatic aberration is increased, and variations in lateral chromatic aberration during focusing are increased.

Conditional Expression (15) defines refractive powers of the two cemented lenses included in the second lens unit L2. In each of the cemented lenses, a positive lens and a negative lens made of materials different from each other are bonded to each other so that the cemented lens can have an effect of correcting a chromatic aberration. Further, when a plurality of materials are used without securing an interval, a chromatic aberration can be corrected while the zoom lens is downsized.

In each Example, this effect is focused on, and at least two cemented lenses are employed to correct the chromatic aberration in the second lens unit L2 having wide F-number (Fno) beams. The powers of those cemented lenses are appropriately set.

When a ratio exceeds the upper limit of Conditional Expression (15), the refractive power of the first cemented lens is likely to increase. In this case, the Fno beams of the first cemented lens are increased as compared to the second cemented lens. Thus, the first cemented lens is more susceptible to power, and a spherical aberration is disadvantageously increased. The lower limit of Conditional Expression (15) means that the power of the first cemented lens is infinity (non-power). Even when the lens unit has no power, power at a cemented lens surface can be secured when different glass materials are used. Therefore, a chromatic aberration can be easily corrected.

The positive lens and the negative lens forming the cemented lens may be arranged in any order. Further, the cemented lens is not limited to two lenses cemented to each other, and may be three lenses cemented to each other.

Conditional Expression (16) defines a relationship of change in image pickup angle of view during magnification varying of the second lens unit L2 serving as the main magnification-varying lens unit. The image pickup angle of view "ωw" at the wide angle end and the image pickup angle of view "ωt" at the telephoto end are angles of view representing ranges for allowing image pickup including distortion. When a ratio exceeds the upper limit of Conditional Expression (16), distortion is increased at the wide angle end, and deformation and compression of the shape of an object after the image pickup are disadvantageously increased. When the ratio falls below the lower limit of Conditional Expression (16), it becomes difficult to obtain the change in angle of view (increase in zoom ratio) due to zooming.

It is more preferred to set the numerical value ranges of Conditional Expressions (10) to (16) as follows.

$$0.78 < f4p/f4 < 1.10 \tag{10a}$$

$$0.60 < f2/f4 < 0.90 \tag{11a}$$

$$-6.2 < f3/D34wt < -3.8 \tag{12a}$$

$$-0.30 < (Ra-Rb)/(Ra+Rb) < -0.10 \tag{13a}$$

$$80 < v3d < 96 \tag{14a}$$

$$0.02 \leq |f2b/f2a| < 0.45 \tag{15a}$$

$$0.68 < (\tan \omega w/\tan \omega t)/(\beta 2t/\beta 2w) < 0.85 \tag{16a}$$

As described above, according to each Example, it is possible to obtain a zoom lens having an half angle of view of 40 degrees or more, a zoom ratio of 3 or more, and an F-number at the wide angle end of less than 2.0, and being capable of sufficiently supporting an image pickup element having the number of pixels for 4K. It is also possible to obtain an image pickup apparatus including the zoom lens.

Next, Examples 1, 4, and 7 to 10 are described.

Examples 1 and 7 to 9 are each a four-unit configuration zoom lens. The four-unit configuration zoom lens consists of the first lens unit L1 having a negative refractive power, the second lens unit L2 having a positive refractive power, the third lens unit L3 having a negative refractive power, and the fourth lens unit L4 having a positive refractive power, which are arranged in order from the object side to the image side. The first lens unit L1 is configured not to move during zooming. The second lens unit L2, the third lens unit L3, and the fourth lens unit L4 are configured to independently move along loci different from each other as indicated by the arrows during zooming.

Examples 4 and 10 are each a five-unit configuration zoom lens. The five-unit configuration zoom lens consists of the first lens unit L1 having a negative refractive power, the second lens unit L2 having a positive refractive power, the third lens unit L3 having a negative refractive power, the fourth lens unit L4 having a positive refractive power, and the fifth lens unit L5 having a negative refractive power, which are arranged in order from the object side to the image side.

The first lens unit L1 is configured not to move during zooming. The second lens unit L2, the third lens unit L3, and the fourth lens unit L4 are configured to independently move along loci different from each other as indicated by the arrows during zooming. The fifth lens unit L5 is configured not to move or to move.

In each Example, the aperture stop SP is arranged on the object side of the second lens unit L2, and is configured to move along the same locus as that of the second lens unit L2 during zooming. The aperture diameter of the aperture stop SP may be constant during zooming, or may be changed during zooming.

When the aperture diameter of the aperture stop SP is changed, lower beam coma flare, which is greatly caused by an off-axial beam at the telephoto end, can be cut, and thus more satisfactory optical performance can be obtained. Focusing is performed by moving the third lens unit L3 on the optical axis. When focusing is to be performed from infinity to a close distance at the telephoto end, the third lens unit L3 is retreated toward the image side as indicated by the arrow 3c in the lens cross-sectional views.

The curve 3a in the drawings indicates a movement locus for correcting image plane variations accompanying zooming from the wide angle end to the telephoto end when the focus is at infinity. The curve 3b indicates a movement locus for correcting image plane variations accompanying zooming from the wide angle end to the telephoto end when the focus is at a close distance. The focusing may be performed by moving, in place of the third lens unit L3, a part or all of the lenses of the second lens unit L2 or a part or all of the lenses of the fourth lens unit L4 on the optical axis.

When variations in chromatic aberration occur during zooming, it becomes difficult to correct a chromatic aberration in the entire zoom range. Therefore, in each Example, a material to be used for the movable lens unit is appropriately set so that the correction of the chromatic aberration during zooming is facilitated.

The zoom lens of each Example includes, in order from the object side, the first lens unit L1 having a negative refractive power and being configured not to move during zooming, and at least three lens units subsequent to the first lens unit L1, specifically, the second lens unit L2, the third lens unit L3, and the fourth lens unit L4, which are configured to move during zooming.

Each of the second lens unit L2, the third lens unit L3, and the fourth lens unit L4 includes at least one lens "α" made of a material satisfying the following conditional expressions.

$$65 < vd < 100 \tag{17}$$

$$0.52 < \theta gF < 0.56 \tag{18}$$

where "vd" represents an Abbe number of the material, and θgF represents a partial dispersion ratio of the material.

Next, the technical meaning of each of the conditional expressions given above is described.

Conditional Expression (17) defines the Abbe number of the material of each movable lens unit, and is an expression for reducing the variations in chromatic aberration during zooming. When a value falls below the lower limit of Conditional Expression (17), the variations in chromatic aberration during zooming are disadvantageously increased. When the value exceeds the upper limit of Conditional Expression (17), the chromatic aberration is disadvantageously corrected excessively.

Conditional Expression (18) defines the partial dispersion ratio of the material of each movable lens unit, and is an expression for reducing variations in chromatic aberration at a plurality of wavelengths during zooming. Conditional Expression (18) defines a numerical range of an anomalous partial dispersion material of the movable lens unit. When a chromatic aberration is to be corrected in a wide wavelength band, in many cases, the chromatic aberration remains for wavelengths other than specific two wavelengths. In each Example, in order to reduce this remaining chromatic aberration (18th order spectrum), an anomalous partial dispersion material is used.

In general, in many optical materials, a substantially linear relationship is established between the partial dispersion ratio and the Abbe number. Meanwhile, materials at positions departed from the linear relationship are called anomalous partial dispersion materials, which are often used when the secondary spectrum is to be reduced. The Abbe number "vd" and the partial dispersion ratio θgF of the material are expressed as follows.

$$vd = (nd-1)/(nF-nC)$$

$$\theta gF = (ng-nF)/(nF-nC)$$

In this case, nF, nd, nC, and ng represent refractive indices at the F-line (486.1 nm), the d-line (587.6 nm), the C-line (656.3 nm), and the g-line (435.8 nm) of the Fraunhofer lines, respectively.

When a value exceeds the upper limit of Conditional Expression (18), variations in secondary spectrum of the chromatic aberration during zooming are excessively corrected. When the value falls below the lower limit of Conditional Expression (18), the variations in secondary spectrum of the chromatic aberration during zooming become insufficient.

It is more preferred to set the numerical value ranges of Conditional Expressions (17) and (18) as follows.

$$70 < vd < 96 \tag{17a}$$

$$0.53 < \theta gF < 0.55 \tag{18a}$$

The sign of the refractive power of the lens "α", which is included in each of the second lens unit L2, the third lens unit L3, and the fourth lens unit L4, and is made of a material satisfying Conditional Expressions (17) and (18), is the same as the sign of the refractive power of the lens unit including the lens "α". In this case, the refractive power (power) refers to a reciprocal of the focal length, and the refractive power is increased as the focal length is decreased. The sign of the refractive power of the lens "α", which is included in the lens unit having a positive refractive power (second lens unit L2 and fourth lens unit L4), and is made of a material satisfying Conditional Expressions (17) and (18), is positive.

A lens that is responsible for the positive refractive power of the lens unit having a positive refractive power is the positive lens. When an anomalous partial dispersion material is used for the positive lens, variations in chromatic aberration at a plurality of wavelengths during zooming are effectively reduced.

The sign of the refractive power of the lens "α", which is included in the lens unit having a negative refractive power (third lens unit L3), and is made of a material satisfying Conditional Expressions (17) and (18), is negative. A lens that is responsible for the negative refractive power of the lens unit having a negative refractive power is the negative lens. When an anomalous partial dispersion material is used for the negative lens, variations in chromatic aberration at a plurality of wavelengths during zooming are effectively reduced.

In each Example, the first lens unit L1 has a relatively large weight, and hence the first lens unit L1 is configured not to move during zooming so that the followability during zooming is facilitated. The second lens unit L2 is configured to move from the image side toward the object side as the main magnification-varying lens unit during zooming from the wide angle end to the telephoto end so that a high magnification-varying effect is obtained.

The third lens unit L3 is configured to move along a locus convex toward the object side. The third lens unit L3 further has a function as the focusing lens unit. In order for the third lens unit L3 to obtain high followability during focusing, the entire system of the zoom lens is desired to be downsized. The third lens unit L3 is desired to be a single optical element from the viewpoint of reducing weight. In this case, the optical element means a single lens or a cemented lens.

Further, the fourth lens unit L4 is configured to move from the object side toward the image side to secure the magnification-varying ratio. That is, the second lens unit L2 and the fourth lens unit L4, which are lens units responsible for the magnification-varying effect, are simultaneously driven so that the magnification-varying ratio is efficiently obtained.

Next, in each Example, it is preferred to satisfy at least one of the following conditional expressions. The focal length of the second lens unit L2 is represented by f2, and the focal length of the entire system of the zoom lens at the wide angle end is represented by "fw". The focal length of the third lens unit L3 is represented by f3. The focal length of the fourth lens unit L4 is represented by f4. The second lens unit L2 includes at least one positive lens, and a focal length of one positive lens (lens "α") included in the second lens unit L2 is represented by f2p.

The third lens unit L3 includes at least one negative lens, and a focal length of one negative lens (lens "α") included in the third lens unit L3 is represented by f3n. The fourth lens unit L4 includes at least one positive lens, and a focal length of one positive lens (lens "α") included in the fourth lens unit L4 is represented by f4p. The lateral magnification of the second lens unit L2 at the wide angle end is represented by β2w, and the lateral magnification of the second lens unit L2 at the telephoto end is represented by β2t.

At this time, it is preferred to satisfy at least one of the following conditional expressions.

$$-5.5 < f3/fw < -1.0 \qquad (19)$$

$$2.0 < f4/fw < 5.0 \qquad (20)$$

$$0.4 < f2p/f2 < 2.0 \qquad (21)$$

$$0.5 < f3n/f3 < 2.0 \qquad (22)$$

$$0.4 < f4p/f4 < 2.0 \qquad (23)$$

$$2.0 < \beta 2t/\beta 2w < 6.0 \qquad (24)$$

Conditional Expression (19) defines the focal length of the third lens unit L3. Conditional Expression (19) is an expression for reducing variations in axial chromatic aberration during zooming. When a ratio exceeds the upper limit of Conditional Expression (19) and the negative refractive power of the third lens unit L3 is increased (absolute value of the negative refractive power is increased) with respect to the focal length of the entire system of the zoom lens at the wide angle end, the variations in chromatic aberration during zooming and focusing are disadvantageously increased.

When the ratio falls below the lower limit of Conditional Expression (19) and the negative refractive power of the third lens unit L3 is decreased (absolute value of the negative refractive power is decreased) with respect to the focal length of the entire system of the zoom lens at the wide angle end, the amount of movement of the third lens unit L3 is increased during zooming and focusing, and hence the entire lens length is disadvantageously increased.

Conditional Expression (20) defines the focal length of the fourth lens unit L4. Conditional Expression (20) is an expression for reducing variations in lateral chromatic aberration during zooming. When a ratio exceeds the upper limit of Conditional Expression (20) and the focal length of the fourth lens unit L4 is increased with respect to the focal length of the entire system of the zoom lens at the wide angle end, the amount of movement during zooming is increased, and hence the entire lens length is disadvantageously increased. When the ratio falls below the lower limit of Conditional Expression (20) and the focal length of the fourth lens unit L4 is decreased with respect to the focal length of the entire system of the zoom lens at the wide angle end, the variations in lateral chromatic aberration during zooming are disadvantageously increased.

Conditional Expression (21) defines a ratio between the focal length of the second lens unit L2 and the focal length of one positive lens f2p (lens "α") included in the second lens unit L2. Conditional Expression (21) is an expression for reducing variations in axial chromatic aberration during zooming. When the ratio exceeds the upper limit of Conditional Expression (21) and the focal length of the positive lens f2p is increased with respect to the focal length of the second lens unit L2, the positive refractive power of the second lens unit L2 becomes insufficient, and the amount of movement during zooming is increased. Thus, it becomes difficult to downsize the entire system of the zoom lens.

When the ratio falls below the lower limit of Conditional Expression (21) and the focal length of the positive lens f2p is decreased with respect to the focal length of the second lens unit L2, the refractive power of the positive lens f2p is excessively increased, and a spherical aberration, a comatic aberration, and other aberrations disadvantageously occur greatly.

Conditional Expression (22) defines a ratio between the focal length of the third lens unit L3 and the focal length of one negative lens f3n (lens "α") included in the third lens unit L3. Conditional Expression (22) is an expression for reducing variations in axial chromatic aberration during focusing and zooming. When the ratio exceeds the upper limit of Conditional Expression (22) and the focal length of the negative lens f3n is increased with respect to the focal length of the third lens unit L3, the negative refractive power of the third lens unit L3 becomes insufficient, and the amount of movement during zooming is increased. Thus, it becomes difficult to downsize the entire system of the zoom lens.

When the ratio falls below the lower limit of Conditional Expression (22) and the focal length of the negative lens f3n is decreased with respect to the focal length of the third lens unit L3, the negative refractive power is increased. As a result, occurrence of a spherical aberration, a comatic aberration, or other aberrations is disadvantageously increased.

Conditional Expression (23) defines a ratio between the focal length of the fourth lens unit L4 and the focal length of one positive lens f4p (lens "α") included in the fourth lens unit L4. Conditional Expression (23) is an expression for reducing variations in lateral chromatic aberration during focusing and zooming. When the ratio exceeds the upper limit of Conditional Expression (23) and the focal length of the positive lens f4p is increased with respect to the focal length of the fourth lens unit L4, the positive refractive power of the fourth lens unit L4 becomes insufficient, and the amount of movement during zooming is increased. Thus, it becomes difficult to downsize the entire system of the zoom lens.

When the ratio falls below the lower limit of Conditional Expression (23) and the focal length of the positive lens f4p is decreased with respect to the focal length of the fourth lens unit L4, the positive refractive power is increased. As a result, occurrence of a spherical aberration, a comatic aberration, or other aberrations is disadvantageously increased.

Conditional Expression (24) defines a ratio of the lateral magnification of the second lens unit L2 at the telephoto end to the lateral magnification of the second lens unit L2 at the wide angle end. Conditional Expression (24) defines an appropriate condition for the second lens unit L2 to perform magnification varying. When the ratio exceeds the upper limit of Conditional Expression (24) and the magnification-varying share of the second lens unit L2 is excessively increased, the amount of movement for magnification varying is increased, and it becomes difficult to downsize the entire system of the zoom lens. When the ratio falls below the lower limit of Conditional Expression (24) and the magnification-varying share of the second lens unit L2 is excessively decreased, it becomes difficult to obtain a desired zoom ratio.

It is more preferred to set the numerical value ranges of Conditional Expressions (19) to (24) as follows.

$$1.5 < f2/fw < 2.7 \qquad (19a)$$

$$-5.0 < f3/fw < -2.0 \qquad (19a)$$

$$2.3 < f4/fw < 4.0 \qquad (20a)$$

$$0.7 < f2p/f2 < 1.5 \qquad (21a)$$

$$0.6 < f3n/f3 < 1.5 \qquad (22a)$$

$$0.6 < f4p/f4 < 1.5 \qquad (23a)$$

$$2.3 < \beta 2t/\beta 2w < 4.5 \qquad (24a)$$

As described above, according to each Example, it is possible to obtain a zoom lens having an half angle of view of 40 degrees or more, a zoom ratio of 3 or more, and an F-number at the wide angle end of less than 2.0, and being capable of sufficiently supporting an image pickup element having the number of pixels for 4K.

Now, lens structures of respective Examples are described.

EXAMPLE 1

The first lens unit L1 consists of a meniscus negative lens G11 having a convex surface on the object side, a negative lens G12 having a concave shape on the object side, and a meniscus positive lens G13 having a convex surface on the object side. The first lens unit is configured not to move during zooming.

The second lens unit L2 consists of a biconvex positive lens G21 having aspherical surfaces on both sides, a positive lens G22 (lens "α") having a convex shape on the object side, a negative lens G23 having a concave shape on the image side, a meniscus negative lens G24 having a convex surface on the object side and a concave surface on the image side, and a biconvex positive lens G25 (lens "α"). Both surfaces of the positive lens G21 are formed to have aspherical surface shapes, and hence a spherical aberration is suitably corrected. The positive lens G22 and the negative lens G23 form a cemented lens. The negative lens G24 and the positive lens G25 form a cemented lens. With those two cemented lenses, variations in axial chromatic aberration during zooming are suitably corrected.

An interval is secured between the negative lens G23 (lens 2a) and the negative lens G24 (lens 2b), and a curvature radius of the concave lens surface (R2a) on the image side of the negative lens G23 is set to be smaller than a curvature radius of the convex lens surface (R2b) on the object side of the negative lens G24. In this manner, a meniscus air lens is formed. With the formation of the meniscus air lens, a curvature of field and an astigmatism are suitably corrected.

The third lens unit L3 consists of a biconcave negative lens G31. The third lens unit L3 is the focusing lens unit. The third lens unit L3 has a configuration consisting of a single component (optical element), specifically, the negative lens G31 so that the size and the weight of the focusing lens unit are reduced. Further, in consideration of correction of a chromatic aberration, the negative lens G31 is made of a material having low dispersibility.

The fourth lens unit L4 consists of a positive lens G41 having a convex surface on the object side, a negative lens G42 having a convex surface on the object side and a concave surface on the image side, and a biconvex positive lens G43 (lens "α"). The positive lens G41 and the negative lens G42 form a cemented lens. A lens surface closest to the object side of the fourth lens unit L4 is a convex surface, and hence control of an incident angle of the off-axial beams caused to diverge by the third lens unit L3 to the surface of the image pickup element is facilitated.

An interval is secured between the negative lens G42 and the positive lens G43. A curvature radius of the lens surface (R4a) on the image side of the negative lens G42 (lens 4a) is set to be smaller than a curvature radius of the lens surface (R4b) on the object side of the positive lens G43 (lens 4b), and thus a meniscus air lens is formed.

With the formation of the meniscus air lens, variations in incident angle of the off-axial beams to the surface of the image pickup element during zooming are reduced while an astigmatism and a comatic aberration of the off-axial beams are suitably corrected.

EXAMPLE 2

The configuration of each lens unit in Example 2 is the same as that in Example 1.

EXAMPLE 3

The focusing lens unit is the fourth lens unit L4. Various aberrations of the rays entering the surface of the image pickup element from the fourth lens unit L4 are sufficiently corrected, and the incident angle to the surface of the image pickup element is sufficiently controlled. Therefore, the fourth lens unit L4 serves as the focusing lens unit. Other configurations are the same as those in Example 1.

EXAMPLE 4

The second lens unit L2 consists of a biconvex positive lens G21 having aspherical lens surfaces on both sides, a biconvex positive lens G22, a negative lens G23 having a concave lens surface on the image side, and a biconvex positive lens G24. Both surfaces of the positive lens G21 are formed to have aspherical surface shapes, and thus a spherical aberration is suitably corrected.

An interval is secured between the negative lens G23 (lens 2a) and the negative lens G24 (lens 2b), and a curvature radius of the lens surface (R2a) on the image side of the negative lens G23 is set to be smaller than a curvature radius of the lens surface (R2b) on the object side of the negative lens G24. In this manner, a meniscus air lens is formed. With the formation of the meniscus air lens, a curvature of field and an astigmatism are suitably corrected.

The third lens unit L3 is the focusing lens unit, and consists of a cemented lens obtained by cementing a biconcave negative lens G31 (lens "α") and a positive lens G32 to each other. The third lens unit L3 has a configuration consisting of a single component (optical element), specifically, a cemented lens so that the size and the weight of the third lens unit L3 are reduced. Further, with use of the cemented lens, a chromatic aberration is suitably corrected by the third lens unit L3, and variations in chromatic aberration due to focusing are reduced.

The fourth lens unit L4 consists of a biconvex positive lens G41, a biconcave negative lens G42, and a biconvex positive lens G43. The positive lens G41 and the negative lens G42 are cemented to each other to form a cemented lens. An interval secured between the negative lens G42 (lens 4a) and the positive lens G43 (lens 4b) forms an air lens. The effect obtained by the air lens is the same as that in Example 1.

The fifth lens unit L5 consists of a meniscus negative lens G51 having a concave lens surface on the object side and a convex lens surface on the image side. The fifth lens unit L5 having a negative refractive power is arranged so that the beam height of the off-axial beams exiting from the fourth lens unit L4 is efficiently increased. Thus, the upsizing of the image pickup element is coped with. The anomalous partial dispersion material is used for the fifth lens unit L5 so that variations in lateral chromatic aberration during zooming are sufficiently suppressed. The fifth lens unit L5 is configured to move during zooming.

EXAMPLE 5

The configuration of each lens unit in Example 5 is the same as that in Example 4.

EXAMPLE 6

The first lens unit L1 consists of a meniscus negative lens G11 having a convex surface on the object side, a biconcave negative lens G12, and a meniscus positive lens G13 having a convex surface on the object side. The lens configurations of other lens units are the same as those in Example 1.

EXAMPLE 7

The first lens unit L1 consists of a meniscus negative lens G11 having a convex surface on the object side, a biconcave negative lens G12, and a meniscus positive lens G13 having a convex surface on the object side. The first lens unit L1 is configured not to move during zooming.

The second lens unit L2 consists of a biconvex positive lens G21, a biconvex positive lens G22 (lens "α"), a meniscus negative lens G23 having a convex surface on the object side, and a biconvex positive lens G24 (lens "α"). Both surfaces of the positive lens G21 are aspherical surfaces, and thus a spherical aberration is satisfactorily corrected.

The anomalous partial dispersion material having low dispersibility is used for the positive lens G24 so that variations in axial chromatic aberration during zooming are satisfactorily corrected. Examples of the anomalous partial dispersion material having low dispersibility include the product name S-FPL51 (produced by OHARA INC.) and the product name S-FPL55 (produced by OHARA INC.).

The third lens unit L3 consists of a biconcave negative lens G31 (lens "α"). The third lens unit L3 is the focusing lens unit. In consideration of correction of a chromatic aberration, an anomalous partial dispersion material having low dispersibility is used.

The fourth lens unit L4 consists of a biconvex positive lens G41, a biconcave negative lens G42, and a biconvex positive lens G43 (lens "α"). The positive lens G41 and the negative lens G42 are cemented to each other to form a cemented lens. An interval is secured between the negative lens G42 and the positive lens G43, and has a meniscus shape having a convex surface on the object side to serve as an air lens. In this manner, a comatic aberration is satisfactorily corrected.

EXAMPLE 8

The fourth lens unit L4 consists of a meniscus positive lens G41 having a convex surface on the object side, a meniscus negative lens G42 having a convex surface on the object side, and a biconvex positive lens G43 (lens "α"). The positive lens G41 and the negative lens G42 are cemented to each other to form a cemented lens. An interval is secured between the negative lens G42 and the positive lens G43, and has a meniscus shape having a convex surface on the object side to serve as an air lens. In this manner, a comatic aberration is satisfactorily corrected. Configurations of other lens units are the same as those in Example 7.

EXAMPLE 9

The first lens unit L1 consists of a meniscus negative lens G11 having a convex surface on the object side, a biconcave negative lens G12, and a biconvex positive lens G13. The negative lens G12 and the positive lens G13 are cemented to each other to form a cemented lens. The first lens unit is configured not to move during zooming.

The fourth lens unit L4 consists of a biconvex positive lens G41, a meniscus negative lens G42 having a convex surface on the object side, and a biconvex positive lens G43 (lens "α"). Configurations of other lens units are the same as those in Example 7.

EXAMPLE 10

The third lens unit L3 consists of a biconcave negative lens G31 (lens "α") and a positive lens G32 having a convex shape on the object side. The negative lens G31 and the positive lens G32 are cemented to each other to form a cemented lens. The third lens unit L3 is the focusing lens unit.

The fifth lens unit L5 consists of a meniscus negative lens G51 having a convex surface on the image side. With use of an anomalous partial dispersion material, variations in lateral chromatic aberration during zooming are satisfactorily corrected. The fifth lens unit L5 is configured not to move during zooming. Configurations of other lens units are the same as those in Example 7.

FIG. 21A and FIG. 21B are cross-sectional views for illustrating a state in which a zoom lens 16 of Example 1 is used in a monitoring camera together with a dome cover 15 or a planar protection cover 17. The dome cover 15 and the protection cover 17 are each made of a plastic material, for example, polymethyl methacrylate (PMMA) or polycarbonate (PC), to have a thickness of about several millimeters. On the premise that the dome cover 15 or the protection cover 17 is to be mounted to the zoom lens, the zoom lens may be designed in consideration of effects (focal length and material) to each member.

Example of an image pickup apparatus (monitoring camera) in which the zoom lens according to an embodiment of the present invention is used as the image pickup optical system is described with reference to FIG. 22A and FIG. 22B. In FIG. 22A, there are illustrated a monitoring camera main body 11, and a solid-state image pickup element (photoelectric conversion element) 12 built into the camera main body, such as a CCD sensor or a CMOS sensor. The solid-state image pickup element 12 is configured to receive an object image formed by a lens portion 16.

There is further illustrated a memory portion 13 configured to store information corresponding to an object image subjected to photoelectric conversion by the solid-state image pickup element 12, and a network cable 14 for transmitting the object image subjected to photoelectric conversion by the solid-state image pickup element 12. Further, in FIG. 22B, there is illustrated an example in which the dome cover 15 is mounted to the image pickup apparatus, and the image pickup apparatus is used while being mounted on the ceiling. The image pickup apparatus is not limited to the monitoring camera, and can be used also in, for example, a video camera and a digital camera.

As described above, according to each Example, it is possible to obtain the zoom lens capable of achieving both of suppression of variations in optical performance due to focusing and suppression of variations in incident angle of off-axial rays to the image pickup element, which occur during magnification varying, while coping with the upsizing of the image pickup element. It is also possible to obtain the image pickup apparatus including the zoom lens.

In each Example, the following measures and configurations may be employed.

Specifically, the glass shape and the number of glasses are not limited to those described in Examples, and may be appropriately changed.

Further, a part of the lenses and the lens unit may be moved so as to have a component perpendicular to the optical axis so that an image blur accompanying vibration due to, for example, camera shake is corrected.

Moreover, an electric correction measure may be taken so that distortion, a chromatic aberration, or other aberrations are corrected.

For example, there may be configured an image pickup system (monitoring camera system) including the zoom lens of each Example and a controller configured to control the zoom lens. In this case, the controller may control the zoom lens so that each lens unit is moved as described above during zooming.

At this time, the controller is not required to be formed integrally with the zoom lens, and the controller may be formed separately from the zoom lens. For example, there may be employed a configuration in which a controller (control device) arranged distant from a driver configured to drive each lens of the zoom lens includes a transmitter configured to transmit a control signal (command) for controlling the zoom lens. With such a controller, the zoom lens can be operated remotely.

Further, there may be employed a configuration in which the controller includes an operation portion, for example, a controller portion and buttons, for remotely operating the zoom lens so that the zoom lens is controlled in accordance with the user's input to the operation portion. For example, as the operation portion, a zoom-in button and a zoom-out button may be provided so that the magnification of the zoom lens may be increased when the user depresses the zoom-in button. Further, the magnification of the zoom lens may be decreased when the user depresses the zoom-out button. The controller may be configured to transmit signals indicating such instructions to the driver of the zoom lens.

Further, the image pickup system may include a display, for example, a liquid crystal panel, configured to display information (moving state) related to the zooming of the zoom lens. Examples of the information related to the zooming of the zoom lens include a zoom magnification (zoom state) and an amount of movement (moving state) of each lens unit. In this case, the user can remotely operate the zoom lens via the operation portion while viewing the information related to zooming of the zoom lens displayed on the display. At this time, for example, a touch panel may be employed so that the display and the operation portion may be integrated.

Next, Numerical Examples 1 to 10 corresponding respectively to Examples 1 to 10 are described. In each Numerical Example, the order of an optical surface from the object side is represented by "i".

A curvature radius of the i-th optical surface (i-th surface) is represented by "ri", and an interval between the i-th surface and the (i+1)th surface is represented by "di". A refractive index and an Abbe number of a material of an optical member (optical medium) between the i-th surface and the (i+1)th surface with respect to the d-line are represented by "ndi" and "vdi", respectively. Further, two optical surfaces closest to the image side correspond to a glass member, for example, a face plate. A back focus (BF) represents an air-equivalent length of a distance from the last lens surface to a paraxial image plane. The total lens length is a value obtained by adding the back focus (BF) to a distance from the first lens surface to the last lens surface. In Numerical Examples 1, 4, and 7 to 10, the value of the partial dispersion ratio θgF of the material is also shown.

An asterisk (*) attached to the surface number indicates an aspherical surface. Further, the shape of the aspherical surface is expressed as follows:

$$x=(h^2/R)/[1+\{1-(1+k)(h/R)^2\}^{1/2}]+A4h^4+A6h^6+A8h^8+A10h^{10}+A12h^{12},$$

where "k" represents eccentricity, A4, A6, A8, A10, and A12 represent aspherical surface coefficients, and "x" represents displacement in the optical axis direction of a position having a height "h" from the optical axis with respect to a surface vertex. Further, the expression of "e-z" means "×10-z". R represents a paraxial curvature radius. Correspondences between each Numerical Example and the above-mentioned conditional expressions are shown in Tables 1, 2, and 3.

NUMERICAL EXAMPLE 1

| Unit: mm | | | | | |
|---|---|---|---|---|---|
| Surface data | | | | | |
| Surface number | r | d | nd | vd | θgF |
| 1 | 206.340 | 2.00 | 1.83481 | 42.7 | 0.5648 |
| 2 | 20.274 | 12.65 | | | |
| 3 | −36.422 | 1.50 | 1.48749 | 70.2 | 0.5300 |
| 4 | ∞ | 0.70 | | | |
| 5 | 60.762 | 2.50 | 1.89286 | 20.4 | 0.6393 |
| 6 | 302.776 | (Variable) | | | |
| 7 (Stop) | ∞ | 0.81 | | | |
| 8* | 44.891 | 6.60 | 1.58313 | 59.4 | 0.5423 |
| 9* | −47.024 | 0.81 | | | |
| 10 | 17.758 | 6.00 | 1.49700 | 81.5 | 0.5375 |
| 11 | 771.057 | 1.00 | 1.51742 | 52.4 | 0.5564 |
| 12 | 15.710 | 3.45 | | | |
| 13 | 74.624 | 0.90 | 1.90366 | 31.3 | 0.2910 |
| 14 | 22.377 | 5.30 | 1.49700 | 81.5 | 0.5375 |
| 15 | −29.313 | (Variable) | | | |
| 16 | −53.205 | 0.80 | 1.49700 | 81.5 | 0.5375 |
| 17 | 42.356 | (Variable) | | | |
| 18 | 23.122 | 6.80 | 1.83481 | 42.7 | 0.5648 |
| 19 | 122.738 | 1.20 | 1.68893 | 31.1 | 0.6004 |
| 20 | 16.917 | 1.79 | | | |
| 21 | 23.562 | 6.30 | 1.49700 | 81.5 | 0.5375 |
| 22 | −57.412 | (Variable) | | | |
| 23 | ∞ | 1.20 | 1.51633 | 64.1 | 0.5353 |
| 24 | ∞ | 5.35 | | | |
| Image plane | ∞ | | | | |

| Aspherical surface data |
|---|
| Eighth surface |

K = 0.00000e+000   A4 = −6.78351e−006   A6 = −2.57399e−009
A8 = 6.82474e−011   A10 = −4.18054e−013   A12 = 1.16584e−015

Ninth surface

K = 0.00000e+000   A4 = 4.46895e−006   A6 = −5.85355e−009
A8 = 8.33723e−011   A10 = −3.80119e−013   A12 = 9.88314e−016

| Various data | | | |
|---|---|---|---|
| Zoom ratio 3.90 | | | |
|  | Wide angle | Intermediate | Telephoto |
| Focal length | 12.16 | 23.45 | 47.44 |
| F-number | 1.75 | 2.92 | 4.09 |
| Half angle of view (degrees) | 41.48 | 24.63 | 12.77 |
| Image height | 10.75 | 10.75 | 10.75 |
| Total lens length | 127.97 | 127.97 | 127.97 |

-continued

Unit: mm

| | | | |
|---|---|---|---|
| BF | 13.60 | 8.77 | 9.59 |
| d6 | 46.87 | 24.97 | 3.07 |
| d15 | 2.71 | 11.27 | 38.58 |
| d17 | 3.68 | 21.85 | 15.61 |
| d22 | 7.46 | 2.63 | 3.45 |

Lens unit data

| Unit | First surface | Focal length | Lens unit structure length |
|---|---|---|---|
| 1 | 1 | −26.08 | 19.35 |
| 2 | 7 | 30.36 | 24.87 |
| 3 | 16 | −47.32 | 0.80 |
| 4 | 18 | 39.80 | 16.09 |

Unit focal length of each of lens G43 and cemented lenses "a" and "b"

| | |
|---|---|
| Lens G43 | 34.5 |
| First Cemented lens | −1,607.4 |
| Second Cemented lens | 88.8 |

NUMERICAL EXAMPLE 2

Unit: mm

Surface data

| Surface number | r | d | nd | vd |
|---|---|---|---|---|
| 1 | 200.063 | 2.00 | 1.83481 | 42.7 |
| 2 | 21.268 | 13.17 | | |
| 3 | −40.215 | 1.50 | 1.48749 | 70.2 |
| 4 | 682.578 | 2.46 | | |
| 5 | 69.659 | 2.54 | 1.89286 | 20.4 |
| 6 | 387.657 | (Variable) | | |
| 7 (Stop) | ∞ | 0.71 | | |
| 8* | 35.502 | 5.79 | 1.58313 | 59.4 |
| 9* | −57.306 | 1.00 | | |
| 10 | 16.439 | 5.07 | 1.48749 | 70.2 |
| 11 | 45.314 | 1.00 | 1.56732 | 42.8 |
| 12 | 14.436 | 3.82 | | |
| 13 | 83.340 | 1.00 | 1.90366 | 31.3 |
| 14 | 23.068 | 5.64 | 1.49700 | 81.5 |
| 15 | −31.390 | (Variable) | | |
| 16 | −46.384 | 1.00 | 1.49700 | 81.5 |
| 17 | 75.034 | (Variable) | | |
| 18 | 21.655 | 4.54 | 1.83481 | 42.7 |
| 19 | 66.936 | 1.20 | 1.68893 | 31.1 |
| 20 | 17.040 | 2.35 | | |
| 21 | 27.225 | 5.84 | 1.49700 | 81.5 |
| 22 | −64.216 | (Variable) | | |
| 23 | ∞ | 1.20 | 1.51633 | 64.1 |
| 24 | ∞ | 5.35 | | |
| Image plane | ∞ | | | |

Aspherical surface data

Eighth surface

K = 0.00000e+000  A4 = −7.26616e−006  A6 = 8.82597e−009
A8 = −3.76146e−011

Ninth surface

K = 0.00000e+000  A4 = 3.29007e−006   A6 = 1.07738e−008
A8 = −4.05256e−011  A10 = −9.62820e−014  A12 = 4.28769e−016

-continued

Unit: mm

Various data
Zoom ratio 3.90

| | Wide angle | Intermediate | Telephoto |
|---|---|---|---|
| Focal length | 12.21 | 24.27 | 47.63 |
| F-number | 1.75 | 2.87 | 4.00 |
| Half angle of view (degrees) | 41.36 | 23.89 | 12.72 |
| Image height | 10.75 | 10.75 | 10.75 |
| Total lens length | 130.53 | 130.53 | 130.53 |
| BF | 15.23 | 8.78 | 10.73 |
| d6 | 49.00 | 26.00 | 3.00 |
| d15 | 2.94 | 12.51 | 42.45 |
| d17 | 2.73 | 22.61 | 13.72 |
| d22 | 9.09 | 2.64 | 4.59 |

Lens unit data

| Unit | First surface | Focal length | Lens unit structure length |
|---|---|---|---|
| 1 | 1 | −27.42 | 21.66 |
| 2 | 7 | 32.28 | 24.03 |
| 3 | 16 | −57.52 | 1.00 |
| 4 | 18 | 42.89 | 13.92 |

Unit focal length of each of lens G43 and cemented lenses "a" and "b"

| | |
|---|---|
| Lens G43 | 39.3 |
| First Cemented lens | −302.7 |
| Second Cemented lens | 105.8 |

NUMERICAL EXAMPLE 3

Unit: mm

Surface data

| Surface number | r | d | nd | vd |
|---|---|---|---|---|
| 1 | 130.772 | 2.00 | 1.83481 | 42.7 |
| 2 | 19.945 | 13.31 | | |
| 3 | −38.918 | 1.50 | 1.48749 | 70.2 |
| 4 | 395.016 | 0.70 | | |
| 5 | 58.222 | 2.50 | 1.89286 | 20.4 |
| 6 | 225.656 | (Variable) | | |
| 7 (Stop) | ∞ | 1.49 | | |
| 8* | 66.349 | 5.80 | 1.58313 | 59.4 |
| 9* | −44.241 | 0.81 | | |
| 10 | 18.717 | 6.00 | 1.49700 | 81.5 |
| 11 | 181.863 | 1.00 | 1.51742 | 52.4 |
| 12 | 17.320 | 5.32 | | |
| 13 | 70.897 | 0.90 | 1.90366 | 31.3 |
| 14 | 23.983 | 5.80 | 1.49700 | 81.5 |
| 15 | −29.976 | (Variable) | | |
| 16 | −49.057 | 0.80 | 1.49700 | 81.5 |
| 17 | 61.321 | (Variable) | | |
| 18 | 24.244 | 6.80 | 1.83481 | 42.7 |
| 19 | 215.169 | 1.20 | 1.68893 | 31.1 |
| 20 | 17.656 | 1.73 | | |
| 21 | 25.470 | 7.30 | 1.49700 | 81.5 |
| 22 | −65.351 | (Variable) | | |
| 23 | ∞ | 1.20 | 1.51633 | 64.1 |
| 24 | ∞ | 5.35 | | |
| Image plane | ∞ | | | |

Aspherical surface data

Eighth surface

K = 3.43890e−001   A4 = −9.03806e−006   A6 = −2.30086e−009

Ninth surface

K = −2.45855e−001   A4 = 2.77086e−007   A6 = −1.22769e−008
A8 = 1.35106e−010   A10 = −7.26658e−013   A12 = 1.49286e−015

Various data
Zoom ratio 3.90

| | Wide angle | Intermediate | Telephoto |
|---|---|---|---|
| Focal length | 12.00 | 23.11 | 46.83 |
| F-number | 1.75 | 2.92 | 4.09 |
| Half angle of view (degrees) | 41.84 | 24.94 | 12.93 |
| Image height | 10.75 | 10.75 | 10.75 |
| Total lens length | 134.50 | 134.50 | 134.50 |
| BF | 13.99 | 8.74 | 8.74 |
| d6 | 49.25 | 26.25 | 3.25 |
| d15 | 2.84 | 11.75 | 41.36 |
| d17 | 3.45 | 22.79 | 16.18 |
| d22 | 7.85 | 2.60 | 2.60 |

Lens unit data

| Unit | First surface | Focal length | Lens unit structure length |
|---|---|---|---|
| 1 | 1 | −26.43 | 20.01 |
| 2 | 7 | 32.31 | 27.13 |
| 3 | 16 | −54.71 | 0.80 |
| 4 | 18 | 43.35 | 17.03 |

Unit focal length of each of lens G43 and cemented lenses "a" and "b"

| Lens G43 | 37.89 |
|---|---|
| First Cemented lens | 2,065.4 |
| Second Cemented lens | 79.1 |

NUMERICAL EXAMPLE 4

Unit: mm

Surface data

| Surface number | r | d | nd | vd | θgF |
|---|---|---|---|---|---|
| 1 | 107.430 | 2.00 | 1.83481 | 42.7 | 0.5648 |
| 2 | 20.329 | 12.15 | | | |
| 3 | −56.059 | 1.50 | 1.48749 | 70.2 | 0.5300 |
| 4 | 99.972 | 1.25 | | | |
| 5 | 52.095 | 3.18 | 1.89286 | 20.4 | 0.6393 |
| 6 | 158.838 | (Variable) | | | |
| 7 (Stop) | ∞ | 0.70 | | | |
| 8* | 47.544 | 6.25 | 1.58313 | 59.4 | 0.5423 |
| 9* | −70.350 | 4.00 | | | |
| 10 | 26.719 | 4.89 | 1.49700 | 81.5 | 0.5375 |
| 11 | −71.207 | 1.60 | | | |
| 12 | 130.892 | 0.90 | 1.90366 | 31.3 | 0.2910 |
| 13 | 21.914 | 1.79 | | | |
| 14 | 55.244 | 2.91 | 1.49700 | 81.5 | 0.5375 |
| 15 | −39.195 | (Variable) | | | |
| 16 | −33.133 | 0.80 | 1.49700 | 81.5 | 0.5375 |
| 17 | 47.935 | 2.44 | 1.68893 | 31.1 | 0.6004 |
| 18 | 116.359 | (Variable) | | | |
| 19 | 32.660 | 6.38 | 1.83481 | 42.7 | 0.5648 |
| 20 | −60.130 | 1.20 | 1.68893 | 31.1 | 0.6004 |
| 21 | 21.586 | 1.09 | | | |
| 22 | 26.117 | 5.17 | 1.49700 | 81.5 | 0.5375 |
| 23 | −40.854 | (Variable) | | | |
| 24 | −26.074 | 1.00 | 1.49700 | 81.5 | 0.5375 |
| 25 | −110.316 | (Variable) | | | |
| 26 | ∞ | 1.20 | 1.51633 | 64.1 | 0.5353 |
| 27 | ∞ | 4.00 | | | |
| Image plane | ∞ | | | | |

Aspherical surface data

Eighth surface

K = 0.00000e+000   A4 = −1.66569e−005   A6 = −1.28563e−008
A8 = −5.41482e−010   A10 = 3.44305e−012   A12 = −1.06396e−014

Ninth surface

K = 0.00000e+000   A4 = −6.10487e−006   A6 = −1.14451e−008
A8 = −4.37860e−010   A10 = 2.76154e−012   A12 = −8.14534e−015

Various data
Zoom ratio 4.00

| | Wide angle | Intermediate | Telephoto |
|---|---|---|---|
| Focal length | 12.35 | 24.78 | 49.40 |
| F-number | 1.75 | 2.80 | 4.30 |
| Half angle of view (degrees) | 41.04 | 23.46 | 12.28 |
| Image height | 10.75 | 10.75 | 10.75 |
| Total lens length | 127.93 | 127.93 | 127.93 |
| BF | 6.29 | 7.29 | 7.03 |
| d6 | 46.75 | 24.85 | 2.95 |
| d15 | 1.34 | 12.33 | 35.03 |
| d18 | 1.66 | 19.52 | 18.99 |
| d23 | 10.69 | 2.73 | 2.73 |
| d25 | 1.50 | 2.50 | 2.24 |

Lens unit data

| Unit | First surface | Focal length | Lens unit structure length |
|---|---|---|---|
| 1 | 1 | −28.57 | 20.08 |
| 2 | 7 | 31.24 | 23.05 |
| 3 | 16 | −58.73 | 3.24 |
| 4 | 19 | 37.78 | 13.84 |
| 5 | 24 | −68.97 | 1.00 |

NUMERICAL EXAMPLE 5

Unit: mm

Surface data

| Surface number | r | d | nd | vd |
|---|---|---|---|---|
| 1 | 112.811 | 2.00 | 1.83481 | 42.7 |
| 2 | 20.099 | 11.89 | | |
| 3 | −62.666 | 1.50 | 1.48749 | 70.2 |
| 4 | 77.366 | 1.74 | | |
| 5 | 54.454 | 2.91 | 1.89286 | 20.4 |
| 6 | 205.299 | (Variable) | | |
| 7 (Stop) | ∞ | 0.70 | | |
| 8* | 43.896 | 6.53 | 1.58313 | 59.4 |
| 9* | −69.739 | 4.00 | | |
| 10 | 26.400 | 4.70 | 1.49700 | 81.5 |
| 11 | −94.060 | 1.56 | | |
| 12 | 228.921 | 0.90 | 1.90366 | 31.3 |
| 13 | 22.739 | 1.76 | | |
| 14 | 54.004 | 3.13 | 1.49700 | 81.5 |
| 15 | −36.481 | (Variable) | | |
| 16 | −26.173 | 0.80 | 1.49700 | 81.5 |

-continued

Unit: mm

| 17 | 165.823 | 2.45 | 1.68893 | 31.1 |
| 18 | −167.600 | (Variable) | | |
| 19 | 38.603 | 5.05 | 1.83481 | 42.7 |
| 20 | −809.243 | 1.20 | 1.68893 | 31.1 |
| 21 | 22.712 | 0.63 | | |
| 22 | 23.639 | 6.30 | 1.49700 | 81.5 |
| 23 | −28.529 | (Variable) | | |
| 24 | −22.779 | 1.00 | 1.49700 | 81.5 |
| 25 | −617.158 | (Variable) | | |
| 26 | ∞ | 1.20 | 1.51633 | 64.1 |
| 27 | ∞ | 4.00 | | |
| Image plane | ∞ | | | |

Aspherical surface data

Eighth surface

K = 0.00000e+000  A4 = −1.37943e−005  A6 = 1.52797e−008
A8 = −3.30276e−010  A10 = 1.07445e−012  A12 = −3.19201e−015

Ninth surface

K = 0.00000e+000  A4 = −5.46849e−006  A6 = 8.57550e−009
A8 = −1.92760e−010  A10 = 2.46482e−013  A12 = −9.05382e−016

Various data
Zoom ratio 4.00

| | Wide angle | Intermediate | Telephoto |
|---|---|---|---|
| Focal length | 12.35 | 25.22 | 49.40 |
| F-number | 1.75 | 2.80 | 4.30 |
| Half angle of view (degrees) | 41.04 | 23.08 | 12.28 |
| Image height | 10.75 | 10.75 | 10.75 |
| Total lens length | 129.49 | 129.49 | 129.49 |
| BF | 9.14 | 7.29 | 7.30 |
| d6 | 47.29 | 24.70 | 2.12 |
| d15 | 1.32 | 11.75 | 37.68 |
| d18 | 3.04 | 22.55 | 17.99 |
| d23 | 7.96 | 2.45 | 3.65 |
| d25 | 4.35 | 2.50 | 2.51 |

Lens unit data

| Unit | First surface | Focal length | Lens unit structure length |
|---|---|---|---|
| 1 | 1 | −28.22 | 20.04 |
| 2 | 7 | 31.77 | 23.28 |
| 3 | 16 | −73.74 | 3.25 |
| 4 | 19 | 35.11 | 13.17 |
| 5 | 24 | −47.62 | 1.00 |

NUMERICAL EXAMPLE 6

Unit: mm

Surface data

| Surface number | r | d | nd | νd |
|---|---|---|---|---|
| 1 | 170.927 | 2.00 | 1.83481 | 42.7 |
| 2 | 20.21 | 12.74 | | |
| 3 | −37.896 | 1.50 | 1.48749 | 70.2 |
| 4 | 756.871 | 0.70 | | |
| 5 | 57.38 | 2.57 | 1.89286 | 20.4 |
| 6 | 232.102 | (Variable) | | |
| 7 (Stop) | ∞ | 0.92 | | |
| 8* | 46.046 | 5.96 | 1.58313 | 59.4 |
| 9* | −48.603 | 0.81 | | |
| 10 | 17.251 | 6.08 | 1.49700 | 81.5 |
| 11 | 140.072 | 1.00 | 1.51742 | 52.4 |

-continued

Unit: mm

| 12 | 15.187 | 2.83 | | |
| 13 | 77.238 | 0.90 | 1.90366 | 31.3 |
| 14 | 22.829 | 5.25 | 1.49700 | 81.5 |
| 15 | −28.874 | (Variable) | | |
| 16 | −54.799 | 0.80 | 1.49700 | 81.5 |
| 17 | 43.84 | (Variable) | | |
| 18 | 23.876 | 6.95 | 1.83481 | 42.7 |
| 19 | 191.056 | 1.20 | 1.68893 | 31.1 |
| 20 | 17.365 | 1.62 | | |
| 21 | 23.626 | 6.27 | 1.49700 | 81.5 |
| 22 | −60.902 | (Variable) | | |
| 23 | ∞ | 1.20 | 1.51633 | 64.1 |
| 24 | ∞ | 5.35 | | |
| Image plane | | | | |

Aspherical surface data

Eighth surface

K = 0.00000e+000  A4 = −7.99083e−006  A6 = 1.03604e−009

Ninth surface

K = 1.77314e+000  A4 = 5.12885e−006  A6 = −1.32177e−009
A8 = 7.51745e−011  A10 = −4.54528e−013  A12 = 1.11736e−015

Various data
Zoom ratio 3.90

| | Wide angle | Intermediate | Telephoto |
|---|---|---|---|
| Focal length | 12.11 | 23.53 | 47.24 |
| F-number | 1.75 | 2.69 | 4.09 |
| Half angle of view (degrees) | 41.60 | 24.55 | 12.82 |
| Image height | 10.75 | 10.75 | 10.75 |
| Total lens length | 127.99 | 127.99 | 127.99 |
| BF (in air) | 14.11 | 8.75 | 10.47 |
| d6 | 47.41 | 25.32 | 3.22 |
| d15 | 2.65 | 11.76 | 39.21 |
| d17 | 3.73 | 22.08 | 15 |
| d22 | 7.97 | 2.6 | 4.33 |

Focal length of each lens unit

| 1 | −26.38 |
| 2 | 30.43 |
| 3 | −48.87 |
| 4 | 40.33 |

Unit focal length of each of lens G43 and cemented lenses "a" and "b"

| Lens G43 | 35.12 |
| First Cemented lens | −2,019.3 |
| Second Cemented lens | 87.2 |

NUMERICAL EXAMPLE 7

Unit: mm

Surface data

| Surface number | r | d | nd | νd | θgF |
|---|---|---|---|---|---|
| 1 | 191.892 | 2.00 | 1.83481 | 42.7 | 0.5648 |
| 2 | 21.122 | 11.88 | | | |
| 3 | −48.942 | 1.50 | 1.48749 | 70.2 | 0.5300 |
| 4 | 176.773 | 2.00 | | | |
| 5 | 63.664 | 2.68 | 1.89286 | 20.4 | 0.6393 |
| 6 | 243.745 | (Variable) | | | |
| 7 (Stop) | ∞ | 2.11 | | | |
| 8* | 45.281 | 5.16 | 1.58313 | 59.4 | 0.5423 |
| 9* | −72.200 | 3.00 | | | |
| 10 | 22.298 | 6.06 | 1.49700 | 81.5 | 0.5375 |

-continued

Unit: mm

| | | | | | |
|---|---|---|---|---|---|
| 11 | −65.669 | 2.28 | | | |
| 12 | 68.647 | 0.90 | 1.90366 | 31.3 | 0.5947 |
| 13 | 17.579 | 2.45 | | | |
| 14 | 39.276 | 3.30 | 1.49700 | 81.5 | 0.5375 |
| 15 | −36.706 | (Variable) | | | |
| 16 | −50.271 | 0.80 | 1.49700 | 81.5 | 0.5375 |
| 17 | 27.179 | (Variable) | | | |
| 18 | 27.447 | 6.09 | 1.83481 | 42.7 | 0.5648 |
| 19 | −75.046 | 1.20 | 1.68893 | 31.1 | 0.6004 |
| 20 | 21.558 | 2.04 | | | |
| 21 | 34.199 | 4.14 | 1.49700 | 81.5 | 0.5375 |
| 22 | −85.407 | (Variable) | | | |
| 23 | ∞ | 1.20 | 1.51633 | 64.1 | 0.5353 |
| 24 | ∞ | 4.35 | | | |
| Image plane | ∞ | | | | |

Aspherical surface data

Eighth surface

K = 0.00000e+000    A4 = −1.30185e−005    A6 = 3.96680e−008
A8 = −2.25320e−010  A10 = 6.55663e−013    A12 = 5.58643e−015

Ninth surface

K = 0.00000e+000    A4 = 2.67549e−006     A6 = 2.76907e−008
A8 = 1.16606e−010   A10 = −1.77003e−012   A12 = 1.27104e−014

Various data
Zoom ratio 4.00

| | Wide angle | Intermediate | Telephoto |
|---|---|---|---|
| Focal length | 12.06 | 23.80 | 48.26 |
| F-number | 1.75 | 2.80 | 4.20 |
| Half angle of view (degrees) | 41.70 | 24.31 | 12.56 |
| Image height | 10.75 | 10.75 | 10.75 |
| Total lens length | 127.99 | 127.99 | 127.99 |
| BF | 16.58 | 6.75 | 6.14 |
| d6 | 49.34 | 27.44 | 5.54 |
| d15 | 0.92 | 5.94 | 14.83 |
| d17 | 1.58 | 28.29 | 41.91 |
| d22 | 11.44 | 1.61 | 1.00 |

Lens unit data

| Unit | First surface | Focal length |
|---|---|---|
| 1 | 1 | −27.03 |
| 2 | 7 | 27.16 |
| 3 | 16 | −35.37 |
| 4 | 18 | 46.40 |

NUMERICAL EXAMPLE 8

Unit: mm

Surface data

| Surface number | r | d | nd | vd | θgF |
|---|---|---|---|---|---|
| 1 | 215.778 | 2.00 | 1.83481 | 42.7 | 0.5648 |
| 2 | 21.390 | 11.45 | | | |
| 3 | −48.017 | 1.50 | 1.48749 | 70.2 | 0.5300 |
| 4 | 85.153 | 2.00 | | | |
| 5 | 52.905 | 2.86 | 1.89286 | 20.4 | 0.6393 |
| 6 | 176.248 | (Variable) | | | |
| 7 (Stop) | ∞ | 1.57 | | | |
| 8* | 71.848 | 5.41 | 1.58313 | 59.4 | 0.5423 |
| 9* | −47.799 | 2.21 | | | |
| 10 | 20.696 | 7.52 | 1.49700 | 81.5 | 0.5375 |
| 11 | −73.506 | 1.40 | | | |

-continued

Unit: mm

| | | | | | |
|---|---|---|---|---|---|
| 12 | 49.609 | 0.90 | 1.90366 | 31.3 | 0.5947 |
| 13 | 15.856 | 2.30 | | | |
| 14 | 35.756 | 3.12 | 1.49700 | 81.5 | 0.5375 |
| 15 | −49.242 | (Variable) | | | |
| 16 | −50.319 | 0.80 | 1.49700 | 81.5 | 0.5375 |
| 17 | 27.093 | (Variable) | | | |
| 18 | 27.112 | 4.26 | 1.83481 | 42.7 | 0.5648 |
| 19 | 188.985 | 1.20 | 1.68893 | 31.1 | 0.6004 |
| 20 | 21.977 | 2.16 | | | |
| 21 | 32.586 | 4.93 | 1.49700 | 81.5 | 0.5375 |
| 22 | −53.147 | (Variable) | | | |
| 23 | ∞ | 1.20 | 1.51633 | 64.1 | 0.5353 |
| 24 | ∞ | 4.35 | | | |
| Image plane | ∞ | | | | |

Aspherical surface data

Eighth surface

K = 0.00000e+000    A4 = −3.51294e−005    A6 = −7.19525e−008
A8 = −2.78685e−011  A10 = −2.80560e−012   A12 = 1.62205e−014

Ninth surface

K = 0.00000e+000    A4 = −1.96741e−005    A6 = −5.25613e−008
A8 = 1.31302e−011   A10 = −1.85017e−012   A12 = 1.00084e−014

Various data
Zoom ratio 3.30

| | Wide angle | Intermediate | Telephoto |
|---|---|---|---|
| Focal length | 12.00 | 24.12 | 39.60 |
| F-number | 1.75 | 2.80 | 4.10 |
| Half angle of view (degrees) | 41.86 | 24.02 | 15.19 |
| Image height | 10.75 | 10.75 | 10.75 |
| Total lens length | 127.99 | 127.99 | 127.99 |
| BF | 17.27 | 8.86 | 23.25 |
| d6 | 48.96 | 27.06 | 5.16 |
| d15 | 2.60 | 8.48 | 16.49 |
| d17 | 1.58 | 26.01 | 25.52 |
| d22 | 12.13 | 3.72 | 18.11 |

Lens unit data

| Unit | First surface | Focal length |
|---|---|---|
| 1 | 1 | −25.48 |
| 2 | 7 | 27.43 |
| 3 | 16 | −35.31 |
| 4 | 18 | 42.75 |

NUMERICAL EXAMPLE 9

Unit: mm

Surface data

| Surface number | r | d | nd | vd | θgF |
|---|---|---|---|---|---|
| 1 | 78.372 | 2.00 | 1.83481 | 42.7 | 0.5648 |
| 2 | 20.741 | 12.27 | | | |
| 3 | −30.190 | 1.50 | 1.59522 | 67.7 | 0.5442 |
| 4 | 74.369 | 2.42 | 1.92286 | 18.9 | 0.6495 |
| 5 | 1,067.731 | (Variable) | | | |
| 6 (Stop) | ∞ | 0.69 | | | |
| 7* | 25.875 | 6.21 | 1.58313 | 59.4 | 0.5423 |
| 8* | −157.352 | 0.70 | | | |
| 9 | 52.195 | 4.41 | 1.53775 | 74.7 | 0.5392 |
| 10 | −78.215 | 1.40 | | | |
| 11 | 50.077 | 1.10 | 1.90366 | 31.3 | 0.5947 |
| 12 | 19.789 | 0.78 | | | |

-continued

Unit: mm

| | | | | |
|---|---|---|---|---|
| 13 | 20.940 | 7.57 | 1.43875 | 94.7 | 0.5340 |
| 14 | −31.077 | (Variable) | | | |
| 15 | −108.848 | 0.80 | 1.49700 | 81.5 | 0.5375 |
| 16 | 16.182 | (Variable) | | | |
| 17 | 208.488 | 4.23 | 1.83481 | 42.7 | 0.5648 |
| 18 | −70.250 | 2.23 | | | |
| 19 | −40.013 | 1.20 | 1.78472 | 25.7 | 0.6161 |
| 20 | −659.355 | 0.49 | | | |
| 21 | 51.723 | 5.32 | 1.49700 | 81.5 | 0.5375 |
| 22 | −31.930 | (Variable) | | | |
| 23 | ∞ | 1.20 | 1.51633 | 64.1 | 0.5353 |
| 24 | ∞ | 4.35 | | | |
| Image plane | ∞ | | | | |

Aspherical surface data

Seventh surface

K = 0.00000e+000   A4 = −5.72822e−006   A6 = −5.53282e−008
A8 = 6.85585e−010   A10 = −2.83359e−012   A12 = 4.59793e−015

Eighth surface

K = 0.00000e+000   A4 = 1.87082e−005   A6 = −4.44276e−008
A8 = 5.91147e−010   A10 = −2.21901e−012   A12 = 3.46366e−015

Various data
Zoom ratio 6.00

| | Wide angle | Intermediate | Telephoto |
|---|---|---|---|
| Focal length | 12.00 | 22.77 | 72.00 |
| F-number | 1.75 | 3.20 | 5.00 |
| Half angle of view (degrees) | 41.86 | 25.27 | 8.49 |
| Image height | 10.75 | 10.75 | 10.75 |
| Total lens length | 127.17 | 127.17 | 127.17 |
| BF | 19.39 | 21.50 | 6.63 |
| d5 | 45.38 | 23.48 | 1.58 |
| d14 | 1.52 | 4.99 | 30.79 |
| d16 | 5.56 | 21.88 | 32.86 |
| d22 | 14.25 | 16.36 | 1.49 |

Lens unit data

| Unit | First surface | Focal length |
|---|---|---|
| 1 | 1 | −19.70 |
| 2 | 6 | 23.19 |
| 3 | 15 | −28.29 |
| 4 | 17 | 45.67 |

NUMERICAL EXAMPLE 10

Unit: mm

Surface data

| Surface number | r | d | nd | νd | θgF |
|---|---|---|---|---|---|
| 1 | 174.795 | 2.00 | 1.83481 | 42.7 | 0.5648 |
| 2 | 21.425 | 12.04 | | | |
| 3 | −48.088 | 1.50 | 1.48749 | 70.2 | 0.5300 |
| 4 | 149.952 | 0.70 | | | |
| 5 | 58.187 | 4.98 | 1.89286 | 20.4 | 0.6393 |
| 6 | 259.762 | (Variable) | | | |
| 7 (Stop) | ∞ | 0.70 | | | |
| 8* | 40.966 | 6.23 | 1.58313 | 59.4 | 0.5423 |
| 9* | −97.306 | 4.00 | | | |
| 10 | 30.041 | 4.73 | 1.49700 | 81.5 | 0.5375 |
| 11 | −64.147 | 1.40 | | | |
| 12 | 117.409 | 0.90 | 1.90366 | 31.3 | 0.2910 |
| 13 | 22.675 | 1.65 | | | |
| 14 | 49.824 | 3.00 | 1.49700 | 81.5 | 0.5375 |
| 15 | −40.815 | (Variable) | | | |
| 16 | −38.456 | 0.80 | 1.49700 | 81.5 | 0.5375 |
| 17 | 44.379 | 1.88 | 1.68893 | 31.1 | 0.6004 |
| 18 | 80.193 | (Variable) | | | |
| 19 | 29.709 | 6.08 | 1.83481 | 42.7 | 0.5648 |
| 20 | −101.500 | 1.20 | 1.68893 | 31.1 | 0.6004 |
| 21 | 20.465 | 1.34 | | | |
| 22 | 27.558 | 4.62 | 1.49700 | 81.5 | 0.5375 |
| 23 | −44.485 | (Variable) | | | |
| 24 | −25.132 | 1.00 | 1.49700 | 81.5 | 0.5375 |
| 25 | −67.081 | 1.50 | | | |
| 26 | ∞ | 1.20 | 1.51633 | 64.1 | 0.5353 |
| 27 | ∞ | 4.00 | | | |
| Image plane | ∞ | | | | |

Aspherical surface data

Eighth surface

K = 0.00000e+000   A4 = −1.47811e−005   A6 = −5.54400e−008
A8 = 7.77209e−011   A10 = −7.02865e−013   A12 = −1.67398e−015

Ninth surface

K = 0.00000e+000   A4 = −3.42729e−006   A6 = −5.24578e−008
A8 = 1.20213e−010   A10 = −9.58136e−013   A12 = −6.66911e−018

Various data
Zoom ratio 4.00

| | Wide angle | Intermediate | Telephoto |
|---|---|---|---|
| Focal length | 12.35 | 24.76 | 49.40 |
| F-number | 1.75 | 2.80 | 4.30 |
| Half angle of view (degrees) | 41.04 | 23.47 | 12.28 |
| Image height | 10.75 | 10.75 | 10.75 |
| Total lens length | 127.99 | 127.99 | 127.99 |
| BF | 6.29 | 6.29 | 6.29 |
| d6 | 46.26 | 24.36 | 2.46 |
| d15 | 1.35 | 13.28 | 35.50 |
| d18 | 1.65 | 20.45 | 20.12 |
| d23 | 11.69 | 2.87 | 2.87 |

Lens unit data

| Unit | First surface | Focal length |
|---|---|---|
| 1 | 1 | −28.19 |
| 2 | 7 | 31.11 |
| 3 | 16 | −57.80 |
| 4 | 19 | 40.11 |
| 5 | 24 | −81.51 |

TABLE 1

| Conditional Expression | Example | | | | |
|---|---|---|---|---|---|
| | 1 | 2 | 3 | 4 | 5 |
| (1) \|f3/f4\| | 1.19 | 1.34 | 1.26 | 1.55 | 2.10 |
| (2) \|f3/L34t\| | 3.03 | 4.19 | 3.38 | 3.09 | 4.10 |
| (3) f4/L34t | 2.55 | 3.13 | 2.68 | 1.99 | 1.95 |
| (4) \|f3/f1\| | 1.81 | 2.10 | 2.07 | 2.06 | 2.61 |
| (5) \|f4/f1\| | 1.53 | 1.56 | 1.64 | 1.32 | 1.24 |
| (6) f4/D4 | 2.47 | 3.08 | 2.55 | 2.73 | 2.67 |
| (7) \|f1/D1\| | 1.35 | 1.27 | 1.32 | 1.42 | 1.41 |

TABLE 2

| Conditional Expression | Example 1 | Example 2 | Example 3 | Example 6 |
|---|---|---|---|---|
| (8) f2/fw | 2.5 | 2.64 | 2.69 | 2.51 |
| (9) M2/M4 | −10.94 | −10.23 | −8.75 | −12.14 |
| (10) f4p/f4 | 0.87 | 0.92 | 0.87 | 0.87 |
| (11) f2/f4 | 0.76 | 0.75 | 0.75 | 0.75 |
| (12) f3/D34wt | −4.22 | −5.7 | −4.57 | −4.65 |
| (13) (Ra − Rb)/(Ra + Rb) | −0.16 | −0.23 | −0.18 | −0.15 |
| (14) ν3d | 81.54 | 81.54 | 81.54 | 81.54 |
| (15) \|f2b/f2a\| | 0.06 | 0.35 | 0.04 | 0.04 |
| (16) (tanωw/tanωT)/(β2t/β2w) | 0.75 | 0.77 | 0.75 | 0.74 |

TABLE 3

| Conditional Expression | Example 1 | Example 4 | Example 7 | Example 8 | Example 9 | Example 10 |
|---|---|---|---|---|---|---|
| f2 | 30.36 | 31.24 | 27.16 | 27.43 | 23.19 | 31.11 |
| f3 | −47.32 | −58.73 | −35.37 | −35.31 | −28.29 | −57.8 |
| f4 | 39.8 | 37.78 | 46.4 | 42.75 | 45.67 | 40.11 |
| f2p | 26.43 | 39.75 | 34.28 | 33.38 | 29.84 | 41.86 |
| f3n | −47.32 | −39.29 | −35.37 | −35.31 | −28.29 | −41.32 |
| f4p | 34.5 | 32.9 | 49.71 | 41.44 | 40.58 | 34.98 |
| β2w | −0.49 | −0.48 | −0.37 | −0.4 | −0.4 | −0.48 |
| β2t | −1.66 | −1.47 | −0.94 | −1.13 | −1.67 | −1.46 |
| fw | 12.16 | 12.35 | 12.06 | 12 | 12 | 12.35 |
| (8) f2/fw | 2.5 | 2.53 | 2.25 | 2.29 | 1.93 | 2.52 |
| (17) νd (Second lens unit) | 81.5 | 81.5 | 81.5 | 81.5 | 74.7 | 81.5 |
| νd (Second lens unit) | 81.5 | 81.5 | 81.5 | 81.5 | 94.7 | 81.5 |
| νd (Third lens unit) | 81.5 | 81.5 | 81.5 | 81.5 | 81.5 | 81.5 |
| νd (Fourth lens unit) | 81.5 | 81.5 | 81.5 | 81.5 | 81.5 | 81.5 |
| νd (Fifth lens unit) | — | — | — | — | — | 81.5 |
| (18) θgF (Second lens unit) | 0.5375 | 0.5375 | 0.5375 | 0.5375 | 0.5392 | 0.5375 |
| θgF (Second lens unit) | 0.5375 | 0.5375 | 0.5375 | 0.5375 | 0.534 | 0.5375 |
| θgF (Third lens unit) | 0.5375 | 0.5375 | 0.5375 | 0.5375 | 0.5375 | 0.5375 |
| θgF (Fourth lens unit) | 0.5375 | 0.5375 | 0.5375 | 0.5375 | 0.5375 | 0.5375 |
| θgF (Fifth lens unit) | — | — | — | — | — | 0.5375 |
| (19) f3/fw | −3.89 | −4.76 | −2.93 | −2.94 | −2.36 | −4.68 |
| (20) f4/fw | 3.27 | 3.06 | 3.85 | 3.56 | 3.81 | 3.25 |
| (21) f2p/f2 | 0.87 | 1.27 | 1.26 | 1.22 | 1.29 | 1.35 |
| (22) f3n/f3 | 1 | 0.67 | 1 | 1 | 1 | 0.71 |
| (23) f4p/f4 | 0.87 | 0.87 | 1.07 | 0.97 | 0.89 | 0.87 |
| (24) β2t/β2w | 3.4 | 3.06 | 2.51 | 2.81 | 4.15 | 3.05 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-001102, filed Jan. 9, 2018, Japanese Patent Application No. 2018-001101, filed Jan. 9, 2018, and Japanese Patent Application No. 2018-001103, filed Jan. 9, 2018 which are hereby incorporated by reference herein in their entirety.

What is claimed is:

1. A zoom lens comprising a plurality of lens units, the plurality of lens units including, in order from an object side to an image side, a first lens unit having a negative refractive power, a second lens unit having a positive refractive power, a third lens unit having a negative refractive power, and a fourth lens unit having a positive refractive power, wherein the second lens unit is configured to move toward the object side for zooming from a wide angle end to a telephoto end, wherein the third lens unit is configured to move for zooming, wherein an interval between each pair of adjacent lens units is changed for zooming from the wide angle end to the telephoto end, wherein, at the telephoto end as compared to the wide angle end, the interval between the first lens unit and the second lens unit is smaller, the interval between the second lens unit and the third lens unit is larger, the interval between the third lens unit and the fourth lens unit is larger, and the fourth lens unit is positioned closer to the image side, wherein the third lens unit consists of a single optical element, wherein the fourth lens unit includes a plurality of lenses arranged at intervals, and wherein the following conditional expressions are satisfied:

$$0.8 < |f3/f4| < 3.0;$$

$$2.5 < |f3/L34t| < 5.0, \text{ and}$$

$$1.2 < |f1/D1| < 2.0,$$

where f3 represents a focal length of the third lens unit, f4 represents a focal length of the fourth lens unit, and L34t represents the interval between the third lens unit and the fourth lens unit at the telephoto end, D1 represents a distance on an optical axis from a lens surface closest to the object side to a lens surface closest to the image side in the first lens unit, and f1 represents a focal length of the first lens unit.

2. The zoom lens according to claim 1, wherein the fourth lens unit includes at least two positive lenses and at least one negative lens.

3. The zoom lens according to claim 1, wherein the following conditional expression is satisfied:

$$1.5 < f4/L34t < 5.0.$$

4. The zoom lens according to claim 1, wherein the following conditional expressions are satisfied:

$$1.5 < f3/f1 < 3.0; \text{ and}$$

$$1.0 < |f4/f1| < 2.0.$$

5. The zoom lens according to claim 1, wherein the following conditional expression is satisfied:

$$2.0 < f4/D4 < 4.0,$$

where D4 represents a distance on the optical axis from a lens surface closest to the object side to a lens surface closest to the image side in the fourth lens unit.

6. An image pickup apparatus comprising:
the zoom lens according to claim 1; and
an image pickup element configured to receive an image formed by the zoom lens.

7. An image pickup system comprising:
the zoom lens according to claim 1; and
a controller configured to control the zoom lens for zooming.

8. A zoom lens comprising a plurality of lens units,
the plurality of lens units consisting of, in order from an object side to an image side, a first lens unit having a negative refractive power, a second lens unit having a positive refractive power, a third lens unit having a negative refractive power, and a fourth lens unit having a positive refractive power,
wherein the first lens unit is configured not to move for zooming,
wherein the second lens unit, the third lens unit, and the fourth lens unit are configured to move for zooming,
wherein an interval between each pair of adjacent lens units is changed for zooming,
wherein the fourth lens unit includes at least two lenses, and
wherein the following conditional expressions are satisfied:

$$1.0 < f2/fw < 3.5; \text{ and}$$

$$-20.0 < M2/M4 < -5.0,$$

where f2 represents a focal length of the second lens unit, fw represents a focal length of the zoom lens at a wide angle end, M2 represents an amount of movement of the second lens unit for zooming from the wide angle end to a telephoto end, and M4 represents an amount of movement of the fourth lens unit for zooming from the wide angle end to the telephoto end.

9. The zoom lens according to claim 8,
wherein the fourth lens unit consists of, in order from the object side to the image side, a positive lens, a negative lens, and a positive lens, and
wherein the following conditional expression is satisfied:

$$0.65 < f4p/f4 < 1.30,$$

where f4p represents a focal length of the positive lens arranged closest to the image side of the fourth lens unit, and f4 represents a focal length of the fourth lens unit.

10. The zoom lens according to claim 8, wherein the following conditional expression is satisfied:

$$0.45 < f2/f4 < 1.00,$$

where f4 represents a focal length of the fourth lens unit.

11. The zoom lens according to claim 8, wherein the following conditional expression is satisfied:

$$-7.0 < f3/D34wt < -3.0,$$

where D34wt represents a difference in the interval between the third lens unit and the fourth lens unit at the wide angle end and the telephoto end, and f3 represents a focal length of the third lens unit.

12. The zoom lens according to claim 8,
wherein, among the at least two lenses included in the fourth lens unit, a lens G4b arranged closest to the image side of the fourth lens unit and a lens G4a adjacent to the lens G4b are arranged at the interval therebetween, and
wherein the following conditional expression is satisfied:

$$-0.40 < (Ra-Rb)/(Ra+Rb) < -0.05,$$

where Ra represents a curvature radius of a lens surface on the image side of the lens G4a, and Rb represents a curvature radius of a lens surface on the object side of the lens G4b.

13. The zoom lens according to claim 8,
wherein the third lens unit consists of one negative lens,
wherein the third lens unit is configured to move along a locus convex toward the object side for zooming from the wide angle end to the telephoto end, and
wherein the following conditional expression is satisfied:

$$73 < v3d < 100,$$

where v3d represents an Abbe number of a material of the one negative lens of the third lens unit.

14. The zoom lens according to claim 8,
wherein the second lens unit includes, in order from the object side to the image side, a positive lens having an aspherical surface, a first cemented lens consisting of a positive lens and a negative lens that are made of materials different from each other, and a second cemented lens consisting of a positive lens and a negative lens that are made of materials different from each other, and
wherein the following conditional expression is satisfied:

$$0.001 \leq |f2b/f2a| < 0.60,$$

where f2a represents a focal length of the first cemented lens, and f2b represents a focal length of the second cemented lens.

15. An image pickup apparatus comprising:
the zoom lens of claim 8; and
an image pickup element configured to receive an image formed by the zoom lens,
wherein the following conditional expression is satisfied:

$$0.60 < (\tan \omega w / \tan \omega t))/(\beta 2t/\beta 2w) < 0.90,$$

where ωw represents a maximum value of a half angle of view at a wide angle end, ωt represents a maximum value of a half angle of view at a telephoto end, β2w represents a lateral magnification of the second lens unit at the wide angle end, and β2t represents a lateral magnification of the second lens unit at the telephoto end.

16. A zoom lens comprising a plurality of lens units,
the plurality of lens units including, in order from an object side to an image side, a first lens unit having a negative refractive power, a second lens unit, a third lens unit, and a fourth lens unit, wherein the first lens unit is configured not to move for zooming, wherein the second lens unit, the third lens unit, and the fourth lens unit are configured to independently move along loci that are different from each other for zooming, wherein an interval between each pair of adjacent lens units is changed for zooming, and wherein each of the second lens unit, the third lens unit, and the fourth lens unit includes a lens a made of a material satisfying the following conditional expressions:

$$65 < vd < 100; \text{ and}$$

$$0.52 < \theta gF < 0.56,$$

where vd represents an Abbe number of the material, and θgF represents a partial dispersion ratio of the material.

17. The zoom lens according to claim 16, wherein a sign of a refractive power of the lens a included in the second lens unit is the same as a sign of a refractive power of the second lens unit, wherein a sign of a refractive power of the lens a included in the third lens unit is the same as a sign of a refractive power of the third lens unit, and wherein a sign of a refractive power of the lens a included in the fourth lens unit is the same as a sign of a refractive power of the fourth lens unit.

18. The zoom lens according to claim 16, wherein the second lens unit has a positive refractive power, wherein the third lens unit has a negative refractive power, and wherein the fourth lens unit has a positive refractive power.

19. The zoom lens according to claim 16, wherein the following conditional expression is satisfied:

$$-5.5 < f3/fw < -1.0,$$

where f3 represents a focal length of the third lens unit, and fw represents a focal length of the zoom lens at a wide angle end.

20. The zoom lens according to claim 16, wherein the following conditional expression is satisfied:

$$2.0 < f4/fw < 5.0,$$

where f4 represents a focal length of the fourth lens unit, and fw represents a focal length of the zoom lens at a wide angle end.

21. The zoom lens according to claim 16, wherein at least one lens a included in the second lens unit consists of a positive lens, and wherein the following conditional expression is satisfied:

$$0.4 < f2p/f2 < 2.0,$$

where f2p represents a focal length of the positive lens, and f2 represents a focal length of the second lens unit.

22. The zoom lens according to claim 16, wherein at least one lens a included in the third lens unit consists of a negative lens, and wherein the following conditional expression is satisfied:

$$0.5 < f3n/f3 < 2.0,$$

where f3n represents a focal length of the negative lens, and f3 represents a focal length of the third lens unit.

23. The zoom lens according to claim 16, wherein at least one lens a included in the fourth lens unit consists of a positive lens, and wherein the following conditional expression is satisfied:

$$0.4 < f4p/f4 < 2.0,$$

where f4p represents a focal length of the positive lens, and f4 represents a focal length of the fourth lens unit.

24. The zoom lens according to claim 16, wherein the following conditional expression is satisfied:

$$2.0 < \beta 2t/\beta 2w < 6.0,$$

where $\beta 2w$ represents a lateral magnification of the second lens unit at a wide angle end, and $\beta 2t$ represents a lateral magnification of the second lens unit at a telephoto end.

* * * * *